United States Patent
He et al.

(10) Patent No.: US 10,949,643 B2
(45) Date of Patent: *Mar. 16, 2021

(54) ON-LCD SCREEN OPTICAL FINGERPRINT SENSING BASED ON OPTICAL IMAGING WITH LENS-PINHOLE MODULE AND OTHER OPTICAL DESIGNS

(71) Applicant: SHENZHEN GOODIX TECHNOLOGY CO., LTD., Shenzhen (CN)

(72) Inventors: Yi He, San Diego, CA (US); Bo Pi, San Diego, CA (US)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 41 days.

This patent is subject to a terminal disclaimer.

(21) Appl. No.: 16/379,752

(22) Filed: Apr. 9, 2019

(65) Prior Publication Data

US 2019/0266376 A1 Aug. 29, 2019

Related U.S. Application Data

(63) Continuation of application No. 16/032,048, filed on Jul. 10, 2018, now Pat. No. 10,303,921.
(Continued)

(51) Int. Cl.
*G06K 9/00* (2006.01)
*G02F 1/1333* (2006.01)
(Continued)

(52) U.S. Cl.
CPC ......... *G06K 9/0004* (2013.01); *G02B 6/0055* (2013.01); *G02F 1/13338* (2013.01);
(Continued)

(58) Field of Classification Search
CPC .............. G06F 21/32; G06K 9/0004; G06K 2009/0006; G06K 9/00006; G06K 9/00046

See application file for complete search history.

(56) References Cited

U.S. PATENT DOCUMENTS 6,185,319 B1 2/2001 Fujiwara
6,463,166 B1 10/2002 Fujiwara
(Continued)

FOREIGN PATENT DOCUMENTS

CN 102445754 A 5/2012
CN 107430294 A 12/2017
(Continued)

OTHER PUBLICATIONS

Shu, Chaolian "Modern Optics Manufacturing Technology," National Defense Industry Press, 2008-08-31, p. 204.

*Primary Examiner* — Utpal D Shah

(57) ABSTRACT

Devices and optical sensor modules are provided for provide on-screen optical sensing of fingerprints by using an under-screen optical sensor module that captures and detects light from a fiber on top of the screen. Various implementations of the under-LCD optical sensor modules are provided, including different optical imaging module designs for under-LCD optical sensing, invisible under-LCD optical sensor modules based on concealing optical transmissive features or regions under the LCD opaque borders and optical sensing of topographical features associated with inner tissues of a finger.

20 Claims, 46 Drawing Sheets

Related U.S. Application Data

(60) Provisional application No. 62/654,525, filed on Apr. 8, 2018, provisional application No. 62/635,538, filed on Feb. 26, 2018.

(51) Int. Cl.
    *G02F 1/1335*      (2006.01)
    *F21V 8/00*      (2006.01)
    *G06K 9/20*      (2006.01)

(52) U.S. Cl.
    CPC .. *G02F 1/133504* (2013.01); *G02F 1/133526* (2013.01); *G06K 9/00046* (2013.01); *G06K 9/209* (2013.01); *G02B 6/0051* (2013.01); *G06K 9/00053* (2013.01); *G06K 9/00906* (2013.01)

(56) References Cited

U.S. PATENT DOCUMENTS

| | | |
|---|---|---|
| 10,216,975 B1 | 2/2019 | He et al. |
| 2002/0083329 A1 | 6/2002 | Kiyomoto |
| 2007/0109438 A1* | 5/2007 | Duparre ............... H04N 5/2254 348/335 |
| 2010/0067757 A1* | 3/2010 | Arai ..................... G06K 9/0004 382/128 |
| 2016/0254312 A1* | 9/2016 | Lee .................. H01L 27/14687 382/125 |
| 2017/0017824 A1* | 1/2017 | Smith .................... G02B 5/005 |
| 2017/0124372 A1 | 5/2017 | Evans et al. |
| 2017/0193270 A1 | 7/2017 | Zhang |
| 2017/0220838 A1 | 8/2017 | He et al. |
| 2017/0270335 A1 | 9/2017 | Evans et al. |
| 2017/0270342 A1 | 9/2017 | He et al. |
| 2017/0308731 A1 | 10/2017 | Evans et al. |
| 2018/0012069 A1* | 1/2018 | Chung ................. G06K 9/0012 |
| 2018/0357462 A1* | 12/2018 | Mackey ................ G06F 1/1684 |

FOREIGN PATENT DOCUMENTS

| | | |
|---|---|---|
| CN | 107437055 A | 12/2017 |
| EP | 0847024 A2 | 6/1998 |
| WO | 2016205832 A1 | 12/2016 |
| WO | 2019/164646 A1 | 8/2019 |

* cited by examiner

Transmission modification filter

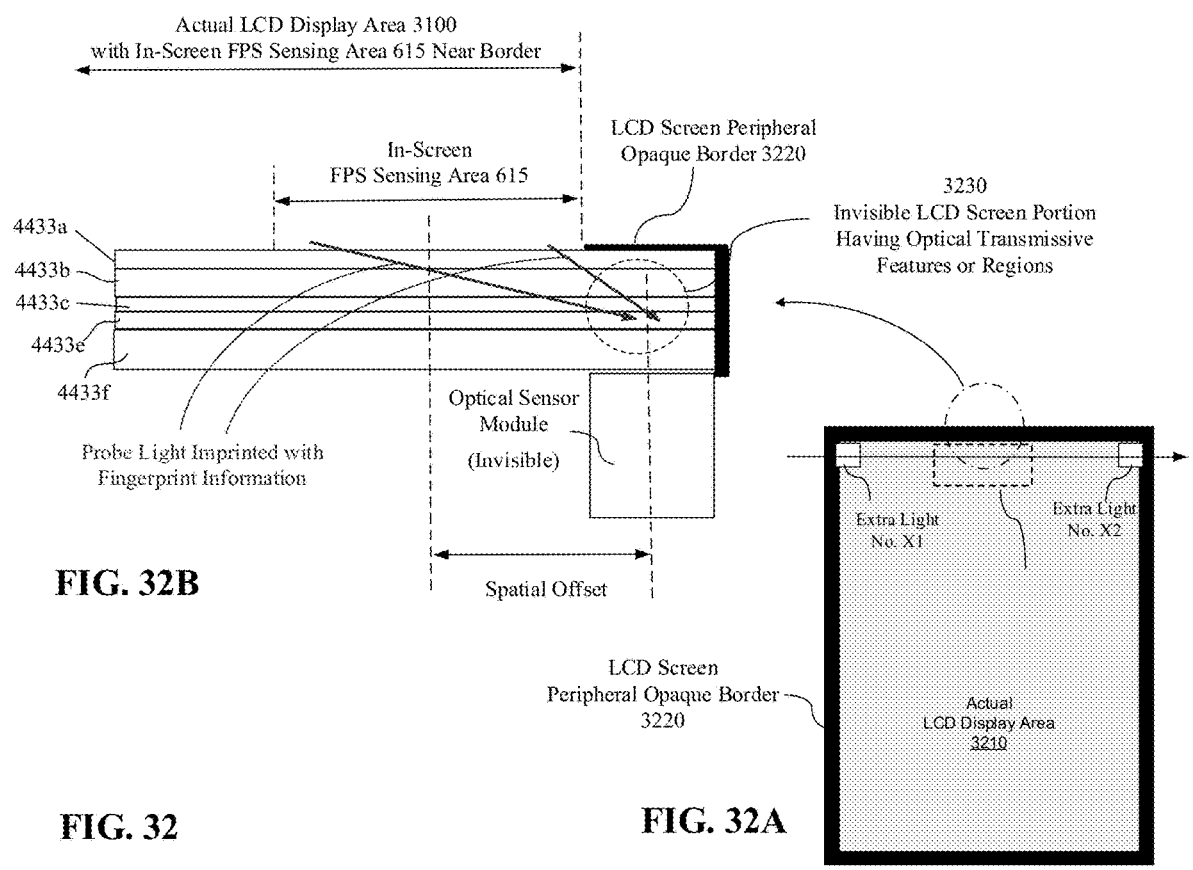

Control the extra illumination light sources outside the optical sensor module to sequentially produce different illumination probe light beams to illuminate a finger, one extra illumination light source at a time, from different directions, respectively, so that the probe light in each illumination probe light beam enters the finger and is scattered by internal tissues of the finger to cause a transmission of a portion of the scattered probe light inside the finger to through internal tissues of ridges and valleys of the finger to carry both (1) a first 2-dimensional transmissive pattern representing a fingerprint pattern formed by bridges and valleys of the finger, and (2) a first fingerprint tomographic pattern that is associated with the illumination of internal tissues of ridges and valleys of the finger in the first illumination direction and is embedded within the first 2-dimensional transmissive pattern

Operate the optical sensor module to capture fingerprint images carried by scattered probe light from scattering of the different illumination probe light beams inside the finger, respectively

Process the captured fingerprint images caused by the different illumination probe light beams, respectively, to extract spatial shifts in the captured fingerprint images associated with the different directions of the different illumination probe light beams and a 3-D tomographic profile of the fingerprint pattern that is superimposed on the scattered probe light from inside the finger

Process the extracted spatial shifts in the captured fingerprint images associated with the different directions of the different illumination probe light beams in determining whether the captured fingerprint images are from a person's finger

FIG. 41B

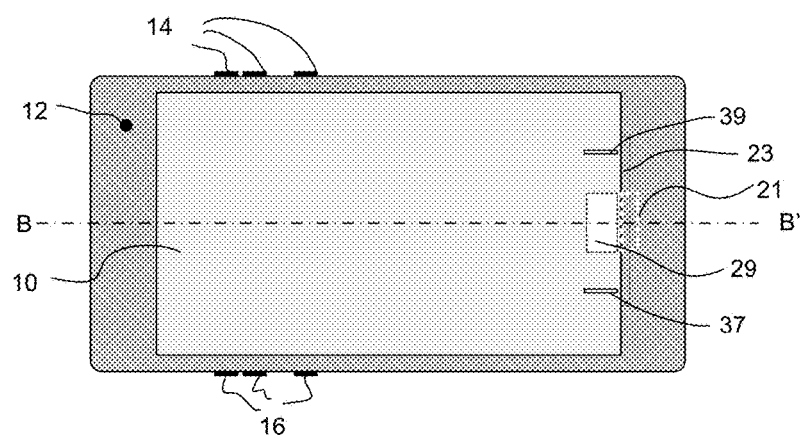
FIG. 42A
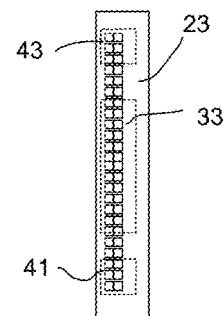
FIG. 42C
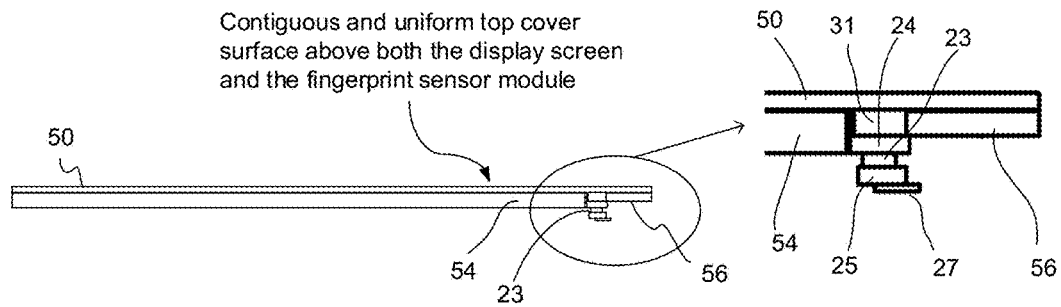
FIG. 42
FIG. 42B

ON-LCD SCREEN OPTICAL FINGERPRINT SENSING BASED ON OPTICAL IMAGING WITH LENS-PINHOLE MODULE AND OTHER OPTICAL DESIGNS

CROSS REFERENCE TO RELATED APPLICATIONS

This application is a continuation of U.S. patent application Ser. No. 16/032,048, filed on Jul. 10, 2018, which claims priority to (1) U.S. Provisional Patent Application No. 62/635,538 entitled "OPTICAL IMAGING VIA IMAGING LENS AND IMAGING PINHOLE IN UNDER-LCD SCREEN OPTICAL SENSOR MODULE FOR ON-SCREEN FINGERPRINT SENSING" filed Feb. 26, 2018 by Shenzhen Goodix Technology Co., Ltd., and (2) U.S. Provisional Patent Application No. 62/654,525 entitled "INVISIBLE UNDER-LCD SCREEN OPTICAL SENSOR WITH IMAGING LENS AND IMAGING PINHOLE FOR ON-SCREEN FINGERPRINT SENSING AND 3-DIMENSIONAL OPTICAL TOPOGRAPHICAL SENSING" filed Apr. 8, 2018 by Shenzhen Goodix Technology Co., Ltd. The entire contents of the before-mentioned patent applications are incorporated by reference as part of the disclosure of this patent document. All of the aforementioned patent applications are hereby incorporated by reference in their entireties.

TECHNICAL FIELD

This patent document relates to sensing of fingerprints and performing one or more sensing operations of other parameter measurements in electronic devices or systems, including portable devices such as a mobile device or a wearable device and larger systems.

BACKGROUND

Various sensors can be implemented in electronic devices or systems to provide certain desired functions. A sensor that enables user authentication is one example of sensors to protect personal data and prevent unauthorized access in various devices and systems including portable or mobile computing devices (e.g., laptops, tablets, smartphones), gaming systems, various databases, information systems or larger computer-controlled systems.

User authentication on an electronic device or system can be carried out through one or multiple forms of biometric identifiers, which can be used alone or in addition to conventional password authentication methods. A popular form of biometric identifiers is a person's fingerprint pattern. A fingerprint sensor can be built into the electronic device to read a user's fingerprint pattern so that the device can only be unlocked by an authorized user of the device through authentication of the authorized user's fingerprint pattern. Another example of sensors for electronic devices or systems is a biomedical sensor that detects a biological property of a user, e.g., a property of a user's blood, the heartbeat, in wearable devices like wrist band devices or watches. In general, different sensors can be provided in electronic devices to achieve different sensing operations and functions.

Fingerprints can be used to authenticate users for accessing electronic devices, computer-controlled systems, electronic databases or information systems, either used as a stand-alone authentication method or in combination with one or more other authentication methods such as a password authentication method. For example, electronic devices including portable or mobile computing devices, such as laptops, tablets, smartphones, and gaming systems can employ user authentication mechanisms to protect personal data and prevent unauthorized access. In another example, a computer or a computer-controlled device or system for an organization or enterprise should be secured to allow only authorized personnel to access in order to protect the information or the use of the device or system for the organization or enterprise. The information stored in portable devices and computer-controlled databases, devices or systems, may be personal in nature, such as personal contacts or phonebook, personal photos, personal health information or other personal information, or confidential information for proprietary use by an organization or enterprise, such as business financial information, employee data, trade secrets and other proprietary information. If the security of the access to the electronic device or system is compromised, these data may be accessed by others, causing loss of privacy of individuals or loss of valuable confidential information. Beyond security of information, securing access to computers and computer-controlled devices or systems also allow safeguard the use of devices or systems that are controlled by computers or computer processors such as computer-controlled automobiles and other systems such as ATMs.

Secured access to a device (e.g., a mobile device) or a system (e.g., an electronic database and a computer-controlled system) can be achieved in different ways such as the use of user passwords. A password, however, may be easily to be spread or obtained and this nature of passwords can reduce the level of the security of passwords. Moreover, since a user needs to remember a password in accessing password-protected electronic devices or systems, in the event that the user forgets the password, the user needs to undertake certain password recovery procedures to get authenticated or otherwise to regain the access to the device or system. Such processes may be burdensome to users and have various practical limitations and inconveniences. The personal fingerprint identification can be utilized to achieve the user authentication for enhancing the data security while mitigating certain undesired effects associated with passwords.

Electronic devices or systems, including portable or mobile computing devices, may employ user authentication through one or multiple forms of biometric identifiers to protect personal or other confidential data and prevent unauthorized access. A biometric identifier can be used alone or in combination with a password authentication method to provide user authentication. One form of biometric identifiers is a person's fingerprint pattern. A fingerprint sensor can be built into an electronic device or an information system to read a user's fingerprint pattern so that the device can only be unlocked by an authorized user of the device through authentication of the authorized user's fingerprint pattern.

SUMMARY

Devices and optical sensor modules are provided for provide on-screen optical sensing of fingerprints by using an under-(liquid crystal display) LCD screen optical sensor module that captures and detects light from a fiber on top of the LCD screen. Various implementations of the under-LCD optical sensor modules are provided, including invisible under-LCD optical sensor modules based on concealing optical transmissive features or regions under the LCD opaque borders and optical collection based on a lens-pinhole assembly. In some implementations, optical sensing is provided for determining whether an object in contact is from a live person.

In one aspect, the disclosed technology can be used to construct an electronic device capable of detecting a fingerprint by optical sensing to include a liquid crystal display (LCD) screen that provides touch sensing operations and includes a LCD display panel structure to display images, wherein the LCD display panel includes backlighting module to produce backlight for displaying the images; a top transparent layer formed over the LCD screen as an interface for being touched by a user for the touch sensing operations and for transmitting the light from the display structure to display images to a user and for transmitting the probe light for optical sensing; an illumination probe light source that produces probe light to illuminate a sensing area of the top transparent layer for optical sensing; and an optical sensor module located below the LCD display panel structure to receive returned probe light that passes through the LCD screen for optical sensing. The optical sensor module includes an optical sensor array of optical detectors to convert the received probe light from the LCD screen that carries a fingerprint pattern of the user into detector signals representing the fingerprint pattern, a pinhole layer located between the LCD screen and the optical sensor array and structured to include a pinhole that is structured to produce a large optical field of view in collecting the returned probe light and to transmit the collected probe light towards the optical sensor array, and a lens located between the pinhole layer and the optical sensor array to receive the transmitted probe light from the pinhole and to focus the received probe light onto the optical sensor array for optical imaging at an enhanced spatial imaging resolution at the optical sensor array when compared to a lower spatial imaging resolution when using the pinhole to project light onto the optical sensor array without the lens.

In another aspect, the disclosed technology can be implemented to provide an electronic device capable of detecting a fingerprint by optical sensing to include a liquid crystal display (LCD) screen that provides touch sensing operations and includes a LCD display panel structure to display images and a peripheral opaque border surrounding a central area of the LCD display panel structure and covering a narrow peripheral border of the LCD display panel structure. The LCD display panel structure includes backlighting module to produce backlight for displaying the images in the central area of the LCD display panel structure within the peripheral opaque border. A top transparent layer is formed over the LCD screen as an interface for being touched by a user for the touch sensing operations and for transmitting the light from the display structure to display images to a user and for transmitting the probe light for optical sensing. This device includes an illumination probe light source that produces probe light to illuminate a sensing area of the top transparent layer for optical sensing; and an optical sensor module located below the LCD screen and positioned underneath the peripheral opaque border to be spatially offset from central area of the LCD display panel structure to receive returned probe light that passes through the LCD screen for optical sensing. The LCD display panel structure includes one or more extra transmission holes or regions within an area that is at least partially covered by the peripheral border and is positioned above the optical sensor module to allow probe light to pass through the LCD display panel structure to reach the optical sensor module for optical sensing.

In yet another aspect, the disclosed technology can be implemented to provide an electronic device capable of detecting a fingerprint by optical sensing to include a liquid crystal display (LCD) display panel that includes a backlighting module to produce backlight for displaying the images; and a top transparent layer formed over the LCD display panel as an interface for user touch operations and for transmitting the light from the display panel to display images. The top transparent layer includes a designated fingerprint sensing area for a user to place a finger for fingerprint sensing. An optical sensor module is located below the LCD display panel and underneath the designated fingerprint sensing area on the top transparent layer to receive light from the top transparent layer to detect a fingerprint and to include an optical sensor array of optical detectors to convert the received light that carries a fingerprint pattern of the user into detector signals representing the fingerprint pattern. This device includes illumination light sources located outside the optical sensor module at different locations to produce different illumination probe beams to illuminate the designated fingerprint sensing area on the top transparent layer in different illumination directions and each illumination light source is structured to produce probe light in an optical spectral range with respect to which tissues of a human finger exhibit optical transmission to allow probe light in each illumination probe beam to enter a user finger over the designated fingerprint sensing area on the top transparent layer to produce scattered probe light by scattering of tissues inside the finger that propagates towards and passes the top transparent layer to carry both (1) fingerprint pattern information and (2) different fingerprint topographical information associated with the different illumination directions, respectively, caused by transmission through internal tissues of ridges and valleys of the finger. A probe illumination control circuit is coupled to control the extra illumination light sources to sequentially turn on and off in generating the different illumination probe beams at different times, one beam at a time, so that the optical sensor module located below the display panel is operable to sequentially detect the scattered probe light from the different illumination probe beams to capture both (1) the fingerprint pattern information and (2) the different fingerprint topographical information associated with the different illumination directions, respectively.

The drawings, the description and the claims below provide a more detailed description of the above and other aspects, their implementations and features of the disclosed technology.

BRIEF DESCRIPTION OF THE DRAWINGS

FIGS. 32 (including 32A and 32B), 33A, 33B, 33C, 34 and 35 show examples of the invisible under-LCD optical sensor module design by placing optical transmissive features or regions under the opaque border frame of the LCD screen.

FIGS. 36A, 36B, 37A, 37B, 38, 39, 40, 41A and 41B illustrate examples for obtaining both optical reflective and transmissive patterns to improve the optical fingerprint sensing.

FIGS. 42 (including 42A-42C), 43, 44 and 45 show additional optical sensor designs for fingerprint sensing and other optical sensing operations.

DETAILED DESCRIPTION

Figure 1:
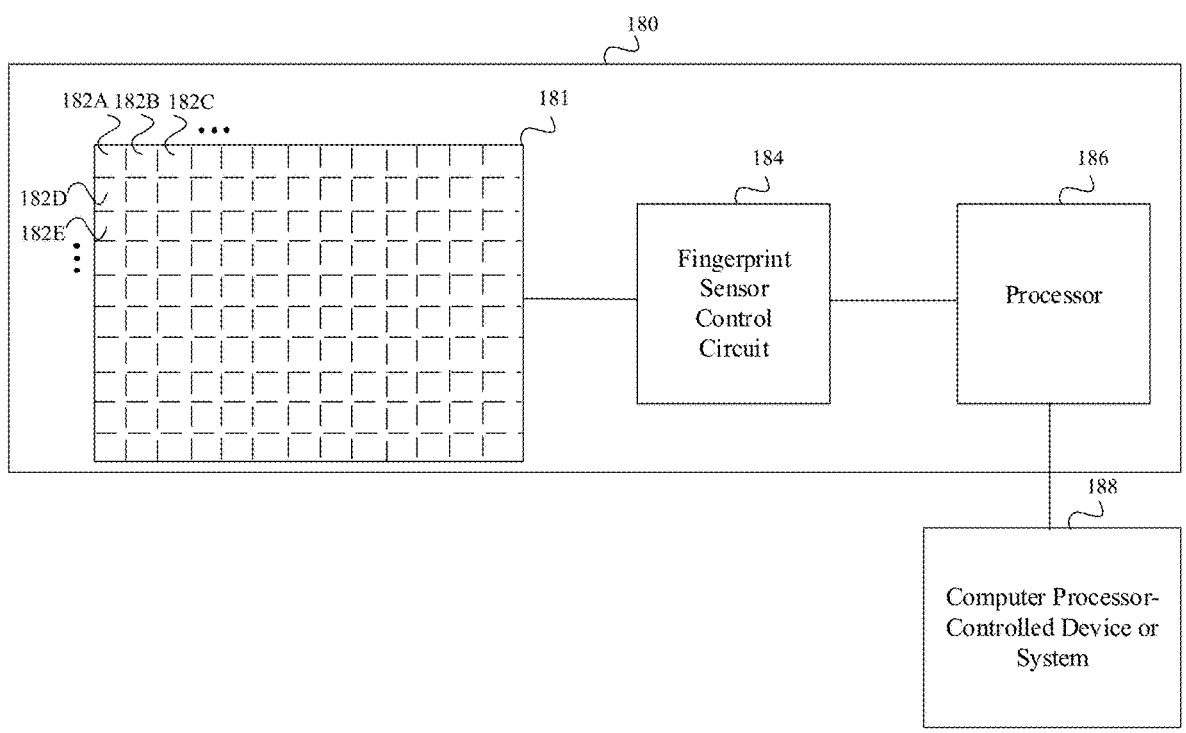
FIG. 1 is a block diagram of an example of a system with a fingerprint sensing module which can be implemented to include an optical fingerprint sensor disclosed in this document.

The optical sensing technology disclosed in this patent document is presented below in several sections. (I) Introduction to Optical Fingerprint Sensing; (II) Overview of Disclosed Under-Display Optical Sensing Modules; (III) Design Examples of Disclosed Under-Display Optical Sensing Modules; (IV) Lens-Pinhole Imaging Designs for Under-Display Optical Sensing; (V) Sensing of Topographical Features under Finger Skin in Fingerprint Sensing with Under-LCD Optical Fingerprint Sensor; (VI) Sensing of Topographical Features under Finger Skin in Fingerprint Sensing with Under-LCD Optical Fingerprint Sensor; and (VII) Optical Fingerprint Sensors on One Side of LCD Displays.

I. Introduction to Optical Fingerprint Sensing

Electronic devices or systems may be equipped with fingerprint authentication mechanisms to improve the security for accessing the devices. Such electronic devices or system may include, portable or mobile computing devices, e.g., smartphones, tablet computers, wrist-worn devices and other wearable or portable devices, larger electronic devices or systems, e.g., personal computers in portable forms or desktop forms, ATMs, various terminals to various electronic systems, databases, or information systems for commercial or governmental uses, motorized transportation systems including automobiles, boats, trains, aircraft and others.

Fingerprint sensing is useful in mobile applications and other applications that use or require secure access. For example, fingerprint sensing can be used to provide secure access to a mobile device and secure financial transactions including online purchases. It is desirable to include robust and reliable fingerprint sensing suitable for mobile devices and other applications. In mobile, portable or wearable devices, it is desirable for fingerprint sensors to minimize or eliminate the footprint for fingerprint sensing given the limited space on those devices, especially considering the demands for a maximum display area on a given device. Many implementations of capacitive fingerprint sensors must be implemented on the top surface of a device due to the near-field interaction requirement of capacitive sensing.

Optical sensing modules can be designed to mitigate the above and other limitations in the capacitive fingerprint sensors and to achieve additional technical advantages. For example, in implementing an optical fingerprint sensing device, the light carrying fingerprint imagining information can be directed over distance to an optical detector array of optical detectors for detecting the fingerprint without being limited to the near-field sensing in a capacitive sensor. In particular, light carrying fingerprint imagining information can be directed to transmit through the top cover glass commonly used in many display screens such as touch sensing screens and other structures and may be directed through folded or complex optical paths to reach the optical detector array, thus allowing for flexibility in placing an optical fingerprint sensor in a device that is not available for a capacitive fingerprint sensor. Optical sensor modules based on the disclosed technology in this patent document can be an under-screen optical sensor module that is placed below a display screen to capture and detect light from a finger placed on or above the top sensing surface of the screen. As disclosed in this patent document, optical sensing can also be used to, in addition to detecting and sensing a fingerprint pattern, optically detect other parameters associated with a user or a user action, such as whether a detected fingerprint is from a finger of a live person and to provide anti-spoofing mechanism, or certain biological parameters of the user.

II. Overview of Disclosed Under-Display Optical Sensing Modules

The optical sensing technology and examples of implementations described in this patent document provide an optical sensor module that uses, at least in part, the light from a display screen as the illumination probe light to illuminate a fingerprint sensing area on the touch sensing surface of the display screen to perform one or more sensing operations based on optical sensing of such light. A suitable display screen for implementing the disclosed optical sensor technology can be based on various display technologies or configurations, including, a liquid crystal display (LCD) screen using a backlight to provide white light illumination to the LCD pixels and matched optical filters to effectuate colored LCD pixels, or a display screen having light emitting display pixels without using backlight where each individual pixel generates light for forming a display image on the screen such as an organic light emitting diode (OLED) display screens, or electroluminescent display screens. The specific examples provided below are directed to integration of under-screen optical sensing modules with LCD screens and thus contain certain technical details associated with LCD screens although various aspects of the disclosed technology are applicable to OLED screens and other display screens.

A portion of the light produced by a display screen for displaying images necessarily passes through the top surface of the display screen in order to be viewed by a user. A finger in touch with or near the top surface interacts with the light at the top surface to cause the reflected or scattered light at the surface area of the touch to carry spatial image information of the finger. Such reflected or scattered light carrying the spatial image information of the finger returns to the display panel underneath the top surface. In touch sensing display devices, for example, the top surface is the touch sensing interface with the user and this interaction between the light for displaying images and the user finger or hand constantly occurs but such information-carrying light returning back to the display panel is largely wasted and is not used in various touch sensing devices. In various mobile or portable devices with touch sensing displays and fingerprint sensing functions, a fingerprint sensor tends to be a separate device from the display screen, either placed on the same surface of the display screen at a location outside the display screen area such as in some models of Apple iPhones and Samsung smartphones, or placed on the backside of a smartphone, such as some models of smart phones by Huawei, Lenovo, Xiaomi or Google, to avoid taking up valuable space for placing a large display screen on the front side. Those fingerprint sensors are separate devices from the display screens and thus need to be compact to save space for the display screens and other functions while still providing reliable and fast fingerprint sensing with a spatial image resolution above a certain acceptable level. However, the need to be compact and small for designing a fingerprint sensor and the need to provide a high spatial image resolution in capturing a fingerprint pattern are in direct conflict with each other in many fingerprint sensors because a high spatial image resolution in capturing a fingerprint pattern in based on various suitable fingerprint sensing technologies (e.g., capacitive touch sensing or optical imaging) requires a large sensor area with a large number of sensing pixels.

The sensor technology and examples of implementations of the sensor technology described in this patent document provide an optical sensor module that uses, at least in part, the light from a display screen as the illumination probe light to illuminate a fingerprint sensing area on the touch sensing surface of the display screen to perform one or more sensing operations based on optical sensing of such light in some implementations, or designated illumination or probe light for optical sensing from one or more designated illumination light sources separate from the display light for optical sensing in other implementations, or background light for optical sensing in certain implementations.

In the disclosed examples for integrating an optical sensing module to a LCD screen based on the disclosed optical sensor technology, the under LCD optical sensor can be used to detect a portion of the light that is used for displaying images in a LCD screen where such a portion of the light for the display screen may be the scattered light, reflected light or some stray light. For example, in some implementations, the image light of the LCD screen based on backlighting may be reflected or scattered back into the LCD display screen as returned light when encountering an object such as a user finger or palm, or a user pointer device like a stylus. Such returned light can be captured for performing one or more optical sensing operations using the disclosed optical sensor technology. Due to the use of the light from LCD screen for optical sensing, an optical sensor module based on the disclosed optical sensor technology is specially designed to be integrated to the LCD display screen in a way that maintains the display operations and functions of the LCD display screen without interference while providing optical sensing operations and functions to enhance overall functionality, device integration and user experience of an electronic device or system such as a smart phone, a tablet, or a mobile/wearable device.

In addition, in various implementations of the disclosed optical sensing technology, one or more designated probe light sources may be provided to produce additional illumination probe light for the optical sensing operations by the under-LCD screen optical sensing module. In such applications, the light from the backlighting of the LCD screen and the probe light from the one or more designated probe light sources collectively form the illumination light for optical sensing operations.

Regarding the additional optical sensing functions beyond fingerprint detection, the optical sensing may be used to measure other parameters. For example, the disclosed optical sensor technology can measure a pattern of a palm of a person given the large touch area available over the entire LCD display screen (in contrast, some designated fingerprint sensors such as the fingerprint sensor in the home button of Apple's iPhone/iPad devices have a rather small and designated off-screen fingerprint sensing area that is highly limited in the sensing area size that may not be suitable for sensing large patterns). For yet another example, the disclosed optical sensor technology can be used not only to use optical sensing to capture and detect a pattern of a finger or palm that is associated with a person, but also to use optical sensing or other sensing mechanisms to detect whether the captured or detected pattern of a fingerprint or palm is from a live person's hand by a "live finger" detection mechanism, which may be based on, for example, the different optical absorption behaviors of the blood at different optical wavelengths, the fact that a live person's finger tends to be moving or stretching due to the person's natural movement or motion (either intended or unintended) or pulsing when the blood flows through the person's body in connection with the heartbeat. In one implementation, the optical sensor module can detect a change in the returned light from a finger or palm due to the heartbeat/blood flow change and thus to detect whether there is a live heartbeat in the object presented as a finger or palm. The user authentication can be based on the combination of the both the optical sensing of the fingerprint/palm pattern and the positive determination of the presence of a live person to enhance the access control. For yet another example, the optical sensor module may include a sensing function for measuring a glucose level or a degree of oxygen saturation based on optical sensing in the returned light from a finger or palm. As yet another example, as a person touches the LCD display screen, a change in the touching force can be reflected in one or more ways, including fingerprint pattern deforming, a change in the contacting area between the finger and the screen surface, fingerprint ridge widening, or a change in the blood flow dynamics. Those and other changes can be measured by optical sensing based on the disclosed optical sensor technology and can be used to calculate the touch force. This touch force sensing can be used to add more functions to the optical sensor module beyond the fingerprint sensing.

With respect to useful operations or control features in connection with the touch sensing aspect of the LCD display screen, the disclosed optical sensor technology can provide triggering functions or additional functions based on one or more sensing results from the optical sensor module to perform certain operations in connection with the touch sensing control over the LCD display screen. For example, the optical property of a finger skin (e.g., the index of refraction) tends to be different from other artificial objects. Based on this, the optical sensor module may be designed to selectively receive and detect returned light that is caused by a finger in touch with the surface of the LCD display screen while returned light caused by other objects would not be detected by the optical sensor module. This object-selective optical detection can be used to provide useful user controls by touch sensing, such as waking up the smartphone or device only by a touch via a person's finger or palm while touches by other objects would not cause the device to wake up for energy efficient operations and to prolong the battery use. This operation can be implemented by a control based on the output of the optical sensor module to control the waking up circuitry operation of the LCD display screen which, the LCD pixels are put in a "sleep" mode by being turned off (and the LCD backlighting is also turned off) while one or more illumination light sources (e.g., LEDs) for the under-LCD panel optical sensor module are turned on in a flash mode to intermittently emit flash light to the screen surface for sensing any touch by a person's finger or palm. Under this design, the optical sensor module operates the one or more illumination light sources to produce the "sleep" mode wake-up sensing light flashes so that the optical sensor module can detect returned light of such wake-up sensing light caused by the finger touch on the LCD display screen and, upon a positive detection, the LCD backlighting and the LCD display screen are turned on or "woken up". In some implementations, the wake-up sensing light can be in the infrared invisible spectral range so a user will not experience any visual of a flash light. The LCD display screen operation can be controlled to provide an improved fingerprint sensing by eliminating background light for optical sensing of the fingerprint. In one implementation, for example, each display scan frame generates a frame of fingerprint signals. If, two frames of fingerprint signals with the display are generated in one frame when the LCD display screen is turned on and in the other frame when the LCD display screen is turned off, the subtraction between those two frames of signals can be used to reduce the ambient background light influence. By operating the fingerprint sensing frame rate is at one half of the display frame rate in some implementations, the background light noise in fingerprint sensing can be reduced.

An optical sensor module based on the disclosed optical sensor technology can be coupled to the backside of the LCD display screen without requiring creation of a designated area on the surface side of the LCD display screen that would occupy a valuable device surface real estate in some electronic devices such as a smartphone, a tablet or a wearable device. This aspect of the disclosed technology can be used to provide certain advantages or benefits in both device designs and product integration or manufacturing.

In some implementations, an optical sensor module based on the disclosed optical sensor technology can be configured as a non-invasive module that can be easily integrated to a display screen without requiring changing the design of the LCD display screen for providing a desired optical sensing function such as fingerprint sensing. In this regard, an optical sensor module based on the disclosed optical sensor technology can be independent from the design of a particular LCD display screen design due to the nature of the optical sensor module: the optical sensing of such an optical sensor module is by detecting the light that is emitted by the one or more illumination light sources of the optical sensor module and is returned from the top surface of the display area, and the disclosed optical sensor module is coupled to the backside of the LCD display screen as a under-screen optical sensor module for receiving the returned light from the top surface of the display area and thus does not require a special sensing port or sensing area that is separate from the display screen area. Accordingly, such an under-screen optical sensor module can be used to combine with a LCD display screen to provide optical fingerprint sensing and other sensor functions on an LCD display screen without using a specially designed LCD display screen with hardware especially designed for providing such optical sensing. This aspect of the disclosed optical sensor technology enables a wide range of LCD display screens in smartphones, tablets or other electronic devices with enhanced functions from the optical sensing of the disclosed optical sensor technology.

For example, for an existing phone assembly design that does not provide a separate fingerprint sensor as in certain Apple iPhones or Samsung Galaxy smartphones, such an existing phone assembly design can integrate the under-screen optical sensor module as disclosed herein without changing the touch sensing-display screen assembly to provide an added on-screen fingerprint sensing function. Because the disclosed optical sensing does not require a separate designated sensing area or port as in the case of certain Apple iPhones/Samsung Galaxy phones with a front fingerprint sensor outside the display screen area, or some smartphones with a designated rear fingerprint sensor on the backside like in some models by Huawei, Xiaomi, Google or Lenovo, the integration of the on-screen fingerprint sensing disclosed herein does not require a substantial change to the existing phone assembly design or the touch sensing display module that has both the touch sensing layers and the display layers. Based on the disclosed optical sensing technology in this document, no external sensing port and no extern hardware button are needed on the exterior of a device are needed for adding the disclosed optical sensor module for fingerprint sensing. The added optical sensor module and the related circuitry are under the display screen inside the phone housing and the fingerprint sensing can be conveniently performed on the same touch sensing surface for the touch screen.

For another example, due to the above described nature of the optical sensor module for fingerprint sensing, a smartphone that integrates such an optical sensor module can be updated with improved designs, functions and integration mechanism without affecting or burdening the design or manufacturing of the LCD display screens to provide desired flexibility to device manufacturing and improvements/upgrades in product cycles while maintaining the availability of newer versions of optical sensing functions to smartphones, tablets or other electronic devices using LCD display screens. Specifically, the touch sensing layers or the LCD display layers may be updated in the next product release without adding any significant hardware change for the fingerprint sensing feature using the disclosed under-screen optical sensor module. Also, improved on-screen optical sensing for fingerprint sensing or other optical sensing functions by such an optical sensor module can be added to a new product release by using a new version of the under-screen optical sensor module without requiring significant changes to the phone assembly designs, including adding additional optical sensing functions.

The above and other features of the disclosed optical sensor technology can be implemented to provide a new generation of electronic devices with improved fingerprint sensing and other sensing functions, especially for smartphones, tablets and other electronic devices with LCD display screens to provide various touch sensing operations and functions and to enhance the user experience in such devices. The features for optical sensor modules disclosed in this patent document may be applicable to various display panels based on different technologies including both LCD and OLED displays. The specific examples below are directed to LCD display panels and optical sensor modules placed under LCD display panels.

In implementations of the disclosed technical features, additional sensing functions or sensing modules, such as a biomedical sensor, e.g., a heartbeat sensor in wearable devices like wrist band devices or watches, may be provided. In general, different sensors can be provided in electronic devices or systems to achieve different sensing operations and functions.

The disclosed technology can be implemented to provide devices, systems, and techniques that perform optical sensing of human fingerprints and authentication for authenticating an access attempt to a locked computer-controlled device such as a mobile device or a computer-controlled system, that is equipped with a fingerprint detection module. The disclosed technology can be used for securing access to various electronic devices and systems, including portable or mobile computing devices such as laptops, tablets, smartphones, and gaming devices, and other electronic devices or systems such as electronic databases, automobiles, bank ATMs, etc.

III. Design Examples of Disclosed Under-Display Optical Sensing Modules

In the following sections, examples of various designs for an under-screen optical sensor module for collecting an optical signal to the optical detectors and providing desired optical imaging such as a sufficient imaging resolution. Specific examples of optical imaging designs for the under-screen optical sensing modules are provided below, including optical imaging designs without an imaging lens, optical imaging designs with at least one imaging lens and optical imaging designs based on combining a pinhole and an imaging lens in a pinhole-lens assembly for improved optical imaging and compact optical sensor module packaging.

FIG. 1 is a block diagram of an example of a system 180 with a fingerprint sensing module 180 including a fingerprint sensor 181 which can be implemented to include an optical fingerprint sensor based on the optical sensing of fingerprints as disclosed in this document. The system 180 includes a fingerprint sensor control circuit 184, and a digital processor 186 which may include one or more processors for processing fingerprint patterns and determining whether an input fingerprint pattern is one for an authorized user. The fingerprint sensing system 180 uses the fingerprint sensor 181 to obtain a fingerprint and compares the obtained fingerprint to a stored fingerprint to enable or disable functionality in a device or system 188 that is secured by the fingerprint sensing system 180. In operation, the access to the device 188 is controlled by the fingerprint processing processor 186 based on whether the captured user fingerprint is from an authorized user. As illustrated, the fingerprint sensor 181 may include multiple fingerprint sensing pixels such as pixels 182A-182E that collectively represent at least a portion of a fingerprint. For example, the fingerprint sensing system 180 may be implemented at an ATM as the system 188 to determine the fingerprint of a customer requesting to access funds or other transactions. Based on a comparison of the customer's fingerprint obtained from the fingerprint sensor 181 to one or more stored fingerprints, the fingerprint sensing system 180 may, upon a positive identification, cause the ATM system 188 to grant the requested access to the user account, or, upon a negative identification, may deny the access. For another example, the device or system 188 may be a smartphone or a portable device and the fingerprint sensing system 180 is a module integrated to the device 188. For another example, the device or system 188 may be a gate or secured entrance to a facility or home that uses the fingerprint sensor 181 to grant or deny entrance. For yet another example, the device or system 188 may be an automobile or other vehicle that uses the fingerprint sensor 181 to link to the start of the engine and to identify whether a person is authorized to operate the automobile or vehicle.

Figure 2A:
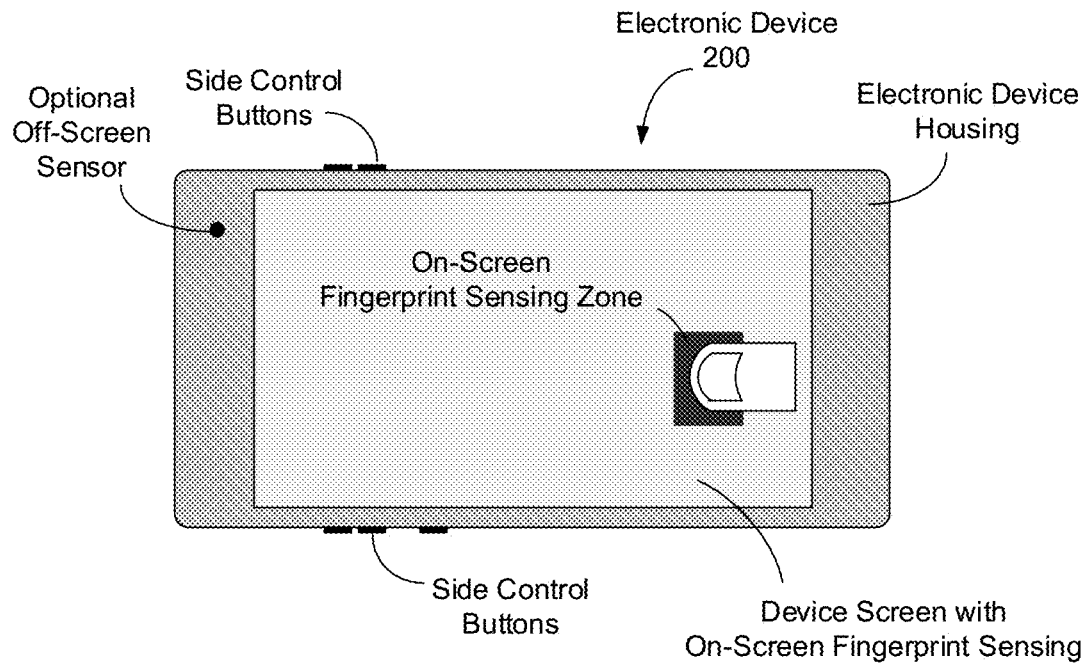
FIGS. 2A and 2B illustrate one exemplary implementation of an electronic device 200 having a touch sensing display screen assembly and an optical sensor module positioned underneath the touch sensing display screen assembly.
Figure 2B:
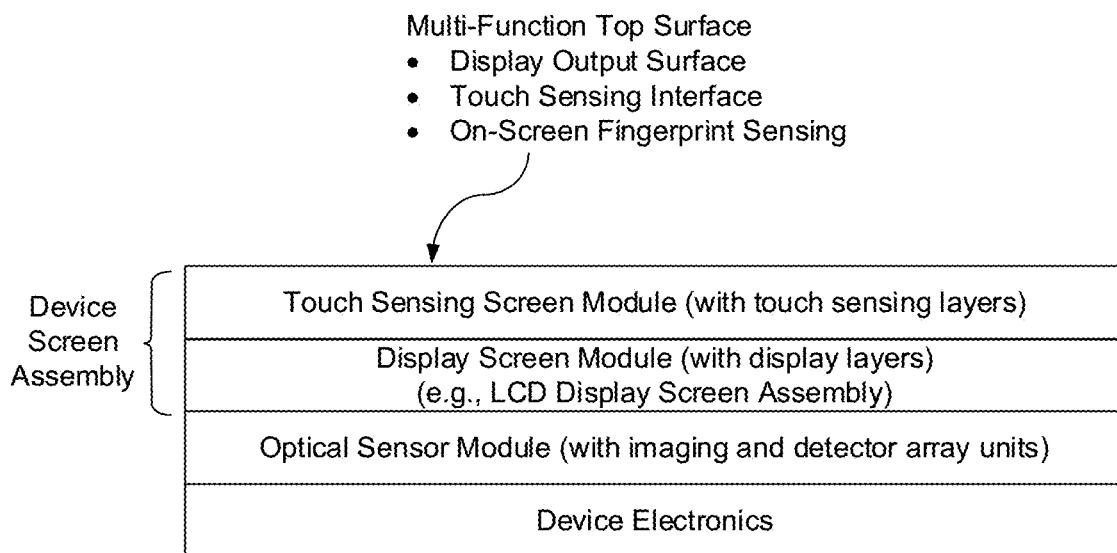

As a specific example, FIGS. 2A and 2B illustrate one exemplary implementation of an electronic device 200 having a touch sensing display screen assembly and an optical sensor module positioned underneath the touch sensing display screen assembly. In this particular example, the display technology can be implemented by a LCD display screen with backlight for optically illuminating the LCD pixels or another display screen having light emitting display pixels without using backlight (e.g., an OLED display screen). The electronic device 200 can be a portable device such as a smartphone or a tablet and can be the device 188 as shown in FIG. 1.

FIG. 2A shows the front side of the device 200 which may resemble some features in some existing smartphones or tablets. The device screen is on the front side of the device 200 occupying either entirety, a majority or a significant portion of the front side space and the fingerprint sensing function is provided on the device screen, e.g., one or more sensing areas for receiving a finger on the device screen. As an example, FIG. 2A shows a fingerprint sensing zone in the device screen for a finger to touch which may be illuminated as a visibly identifiable zone or area for a user to place a finger for fingerprint sensing. Such a fingerprint sensing zone can function like the rest of the device screen for displaying images. As illustrated, the device housing of the device 200 may have, in various implementations, side facets that support side control buttons that are common in various smartphones on the market today. Also, one or more optional sensors may be provided on the front side of the device 200 outside the device screen as illustrated by one example on the left upper corner of the device housing in FIG. 2A.

FIG. 2B shows an example of the structural construction of the modules in the device 200 relevant to the optical fingerprint sensing disclosed in this document. The device screen assembly shown in FIG. 2B includes, e.g., the touch sensing screen module with touch sensing layers on the top, and a display screen module with display layers located underneath the touch sensing screen module. An optical sensor module is coupled to, and located underneath, the display screen assembly module to receive and capture the returned light from the top surface of the touch sensing screen module and to guide and image the returned light onto an optical sensor array of optical sensing pixels or photodetectors which convert the optical image in the returned light into pixel signals for further processing. Underneath the optical sensor module is the device electronics structure containing certain electronic circuits for the optical sensor module and other parts in the device 200. The device electronics may be arranged inside the device housing and may include a part that is under the optical sensor module as shown in FIG. 2B.

In implementations, the top surface of the device screen assembly can be a surface of an optically transparent layer serving as a user touch sensing surface to provide multiple functions, such as (1) a display output surface through which the light carrying the display images passes through to reach a viewer's eyes, (2) a touch sensing interface to receive a user's touches for the touch sensing operations by the touch sensing screen module, and (3) an optical interface for on-screen fingerprint sensing (and possibly one or more other optical sensing functions). This optically transparent layer can be a rigid layer such as a glass or crystal layer or a flexible layer.

One example of a display screen is an LCD display having LCD layers and a thin film transistor (TFT) structure or substrate. A LCD display panel is a multi-layer liquid crystal display (LCD) module that includes LCD display backlighting light sources (e.g., LED lights) emitting LCD illumination light for LCD pixels, a light waveguide layer to guide the backlighting light, and LCD structure layers which can include, e.g., a layer of liquid crystal (LC) cells, LCD electrodes, transparent conductive ITO layer, an optical polarizer layer, a color filter layer, and a touch sensing layer. The LCD module also includes a backlighting diffuser underneath the LCD structure layers and above the light waveguide layer to spatially spread the backlighting light for illuminating the LCD display pixels, and an optical reflector film layer underneath the light waveguide layer to recycle backlighting light towards the LCD structure layers for improved light use efficiency and the display brightness. For optical sensing, one or more separate illumination light sources are provided and are operated independently from the backlighting light sources of the LCD display module.

Referring to FIG. 2B, the optical sensor module in this example is placed under the LCD display panel to capture the returned light from the top touch sensing surface and to acquire high resolution images of fingerprint patterns when user's finger is in touch with a sensing area on the top surface. In other implementations, the disclosed under-screen optical sensor module for fingerprint sensing may be implemented on a device without the touch sensing feature.

Figure 3A:
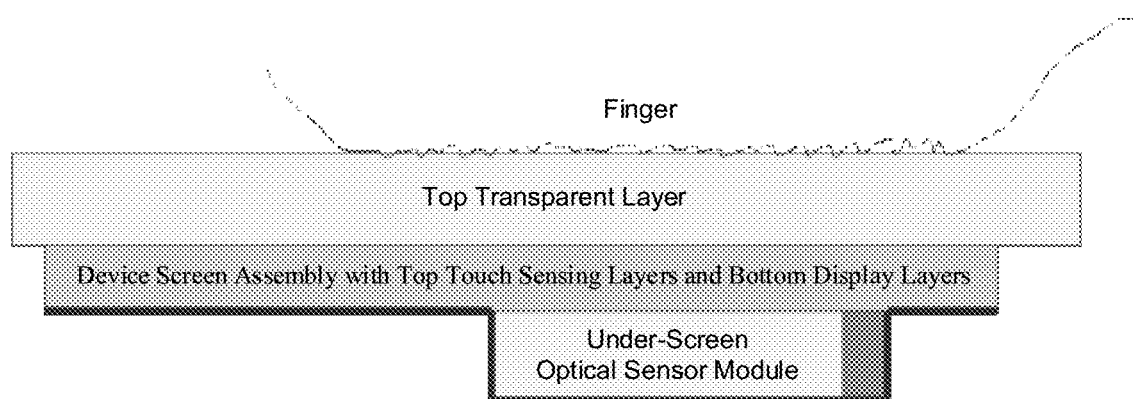
FIGS. 3A and 3B illustrate an example of a device that implements the optical sensor module in FIGS. 2A and 2B.
Figure 3B:
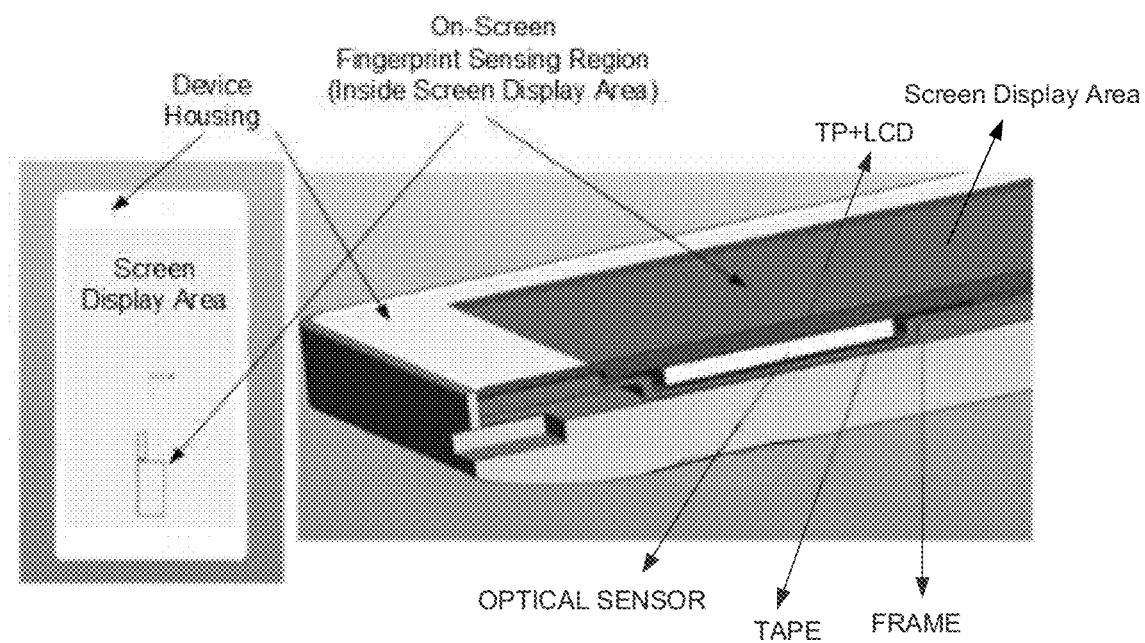

FIGS. 3A and 3B illustrate an example of a device that implements the optical sensor module in FIGS. 2A and 2B. FIG. 3A shows a cross sectional view of a portion of the device containing the under-screen optical sensor module. FIG. 3B shows, on the left, a view of the front side of the device with the touch sensing display indicating a fingerprint sensing area on the lower part of the display screen, and on the right, a perspective view of a part of the device containing the optical sensor module that is under the device display screen assembly. FIG. 3B also shows an example of the layout of the flexible tape with circuit elements.

In the design examples in FIGS. 2A, 2B, 3A and 3B, the optical fingerprint sensor design is different from some other fingerprint sensor designs using a separate fingerprint sensor structure from the display screen with a physical demarcation between the display screen and the fingerprint sensor (e.g., a button like structure in an opening of the top glass cover in some mobile phone designs) on the surface of the mobile device. In the illustrated designs here, the optical fingerprint sensor for detecting fingerprint sensing and other optical signals are located under the top cover glass or layer (e.g., FIG. 3A) so that the top surface of the cover glass serves as the top surface of the mobile device as a contiguous and uniform glass surface across both the display screen layers and the optical detector sensor that are vertically stacked and vertically overlap. This design example for integrating optical fingerprint sensing and the touch sensitive display screen under a common and uniform surface provides benefits, including improved device integration, enhanced device packaging, enhanced device resistance to exterior elements, failure and wear and tear, and enhanced user experience over the ownership period of the device.

Referring back to FIGS. 2A and 2B, the illustrated under-screen optical sensor module for on-screen fingerprint sensing may be implemented in various configurations.

In one implementation, a device based on the above design can be structured to include a device screen a that provides touch sensing operations and includes a LCD display panel structure for forming a display image, a top transparent layer formed over the device screen as an interface for being touched by a user for the touch sensing operations and for transmitting the light from the display structure to display images to a user, and an optical sensor module located below the display panel structure to receive light that returns from the top transparent layer to detect a fingerprint.

This device and other devices disclosed in this document can be further configured to include various features.

For example, a device electronic control module can be included in the device to grant a user's access to the device if a detected fingerprint matches a fingerprint an authorized user. In addition, the optical sensor module is configured to, in addition to detecting fingerprints, also detect a biometric parameter different form a fingerprint by optical sensing to indicate whether a touch at the top transparent layer associated with a detected fingerprint is from a live person, and the device electronic control module is configured to grant a user's access to the device if both (1) a detected fingerprint matches a fingerprint an authorized user and (2) the detected biometric parameter indicates the detected fingerprint is from a live person. The biometric parameter can include, e.g., whether the finger contains a blood flow, or a heartbeat of a person.

For example, the device can include a device electronic control module coupled to the display panel structure to supply power to the light emitting display pixels and to control image display by the display panel structure, and, in a fingerprint sensing operation, the device electronic control module operates to turn off the light emitting display pixels in one frame to and turn on the light emitting display pixels in a next frame to allow the optical sensor array to capture two fingerprint images with and without the illumination by the light emitting display pixels to reduce background light in fingerprint sensing.

For another example, a device electronic control module may be coupled to the display panel structure to supply power to the LCD display panel and to turn off power to the backlighting of the LCD display panel in a sleep mode, and the device electronic control module may be configured to wake up the display panel structure from the sleep mode when the optical sensor module detects the presence of a person's skin at the designated fingerprint sensing region of the top transparent layer. More specifically, in some implementations, the device electronic control module can be configured to operate one or more illumination light sources in the optical sensor module to intermittently emit light, while turning off power to the LCD display panel (in the sleep mode), to direct the intermittently emitted illumination light to the designated fingerprint sensing region of the top transparent layer for monitoring whether there is a person's skin in contact with the designated fingerprint sensing region for waking up the device from the sleep mode.

For another example, the device can include a device electronic control module coupled to the optical sensor module to receive information on multiple detected fingerprints obtained from sensing a touch of a finger and the device electronic control module is operated to measure a change in the multiple detected fingerprints and determines a touch force that causes the measured change. For instance, the change may include a change in the fingerprint image due to the touch force, a change in the touch area due to the touch force, or a change in spacing of fingerprint ridges.

For another example, the top transparent layer can include a designated fingerprint sensing region for a user to touch with a finger for fingerprint sensing and the optical sensor module below the display panel structure can include a transparent block in contact with the display panel substrate to receive light that is emitted from the display panel structure and returned from the top transparent layer, an optical sensor array that receives the light and an optical imaging module that images the received light in the transparent block onto the optical sensor array. The optical sensor module can be positioned relative to the designated fingerprint sensing region and structured to selectively receive returned light via total internal reflection at the top surface of the top transparent layer when in contact with a person's skin while not receiving the returned light from the designated fingerprint sensing region in absence of a contact by a person's skin.

For yet another example, the optical sensor module can be structured to include an optical wedge located below the display panel structure to modify a total reflection condition on a bottom surface of the display panel structure that interfaces with the optical wedge to permit extraction of light out of the display panel structure through the bottom surface, an optical sensor array that receives the light from the optical wedge extracted from the display panel structure, and an optical imaging module located between the optical wedge and the optical sensor array to image the light from the optical wedge onto the optical sensor array.

Specific examples of under-screen optical sensor modules for on-screen fingerprint sensing are provided below.

Figure 4A:
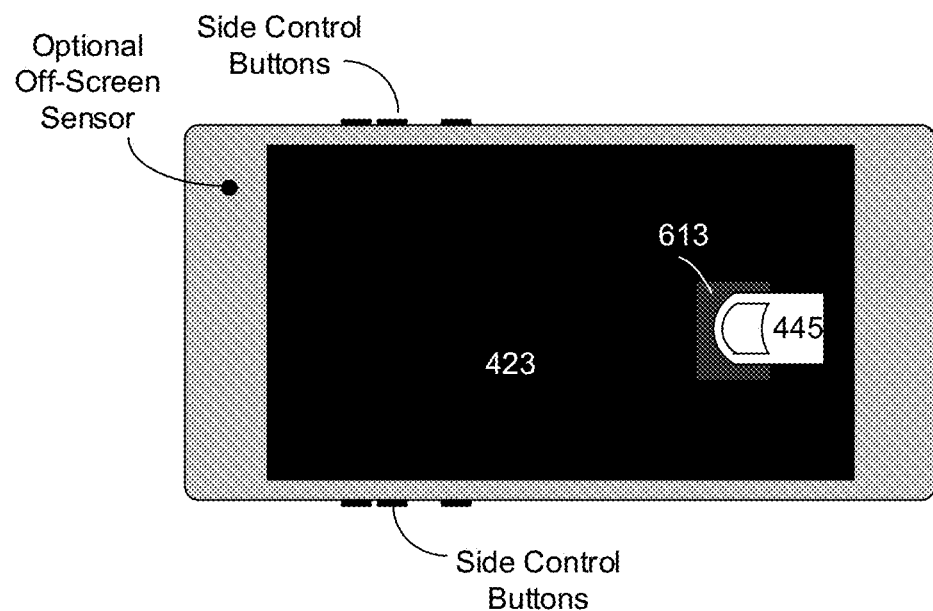
FIGS. 4A and 4B show an example of one implementation of an optical sensor module under the display screen assembly for implementing the design in FIGS. 2A and 2B.
Figure 4B:
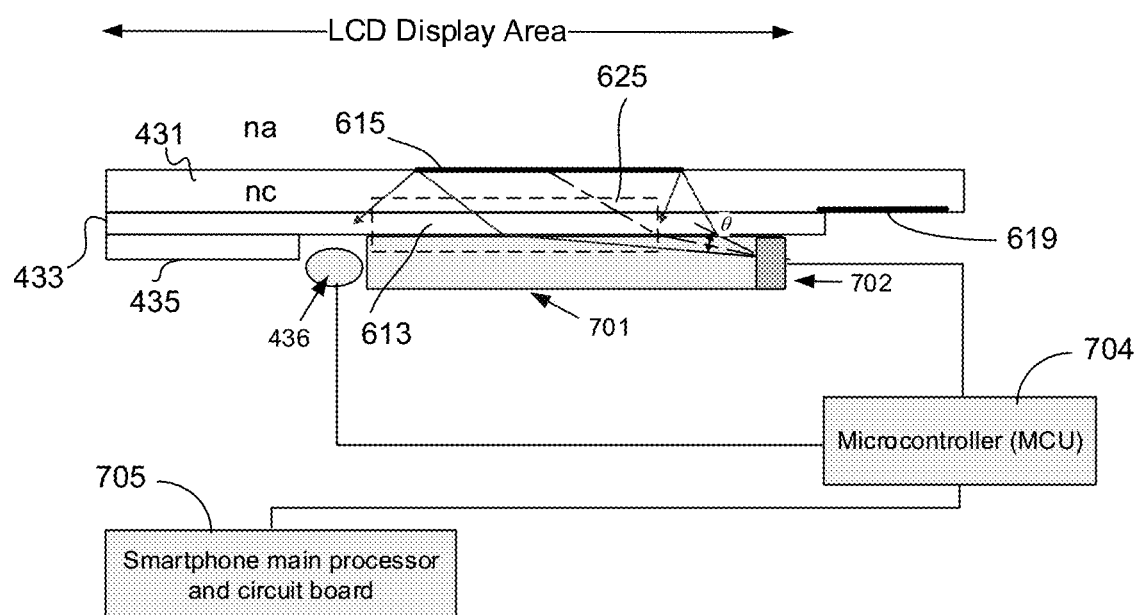

FIG. 4A and FIG. 4B show an example of one implementation of an optical sensor module under the display screen assembly for implementing the design in FIGS. 2A and 2B. The device in FIGS. 4A-4B includes a display assembly 423 with a top transparent layer 431 formed over the device screen assembly 423 as an interface for being touched by a user for the touch sensing operations and for transmitting the light from the display structure to display images to a user. This top transparent layer 431 can be a cover glass or a crystal material in some implementations. The device screen assembly 423 can include a LCD display module 433 under the top transparent layer 431. The LCD display layers allow partial optical transmission so light from the top surface can partially transmit through the LCD display layers to reach the under-LCD optical sensor module. For example, LCD display layers include electrodes and wiring structure optically acting as an array of holes and light scattering objects. A device circuit module 435 may be provided under the LCD display panel to control operations of the device and perform functions for the user to operate the device.

The optical sensor module 702 in this particular implementation example is placed under LCD display module 433. One or more illumination light sources, e.g., an illumination light source 436 under the LCD display module 433 or/and another one or more illumination light sources located under the top cover glass 431, are provided for providing the illumination light or probe light for the optical sensing by the optical sensor module 702 and can be controlled to emit light to at least partially pass through the LCD display module 433 to illuminate the fingerprint sensing zone 615 on the top transparent layer 431 within the device screen area for a user to place a finger therein for fingerprint identification. The illumination light from the one or more illumination light sources 436 can be directed to the fingerprint sensing area 615 on the top surface as if such illumination light is from a fingerprint illumination light zone 613. Another one or more illumination light sources may be located under the top cover glass 431 and may be placed adjacent to the fingerprint sensing area 615 on the top surface to direct produced illumination light to reach the top cover glass 431 without passing through the LCD display module 433. In some designs, one or more illumination light sources may be located above the bottom surface of the top cover glass 431 to direct produced illumination light to reach the fingerprint sensing region above the top surface of the top cover glass 431 without necessarily passing through the top cover glass 431, e.g., directing illuminating the finger above the top cover glass 431.

As illustrated in FIG. 4A, a finger 445 is placed in the illuminated fingerprint sensing zone 615 as the effective sensing zone for fingerprint sensing. A portion of the reflected or scattered light in the zone 615 is directed into the optical sensor module underneath the LCD display module 433 and a photodetector sensing array inside the optical sensor module receives such light and captures the fingerprint pattern information carried by the received light. The one or more illumination light sources 436 are separate from the backlighting sources for the LCD display module and are operated independently from the backlighting light sources of the LCD display module.

In this design of using one or more illumination light sources 436 to provide the illumination light for optical fingerprint sensing, each illumination light source 436 maybe controlled in some implementations to turn on intermittently with a relatively low cycle to reduce the power used for the optical sensing operations. The fingerprint sensing operation can be implemented in a 2-step process in some implementations: first, the one or more illumination light sources 436 are turned on in a flashing mode without turning on the LCD display panel to use the flashing light to sense whether a finger touches the sensing zone 615 and, once a touch in the zone 615 is detected, the optical sensing module is operated to perform the fingerprint sensing based on optical sensing and the LCD display panel may be turned on.

In the example in FIG. 4B, the under-screen optical sensor module includes a transparent block 701 that is coupled to the display panel to receive the returned light from the top surface of the device assembly, and an optical imaging block 702 that performs the optical imaging and imaging capturing. Light from the one or more illumination light sources 436, after reaching the cover top surface, e.g., the cover top surface at the sensing area 615 where a user finger touches or is located without touching the cover top surface, is reflected or scattered back from the cover top surface in a design in which the illumination light source 436 is located to direct the illumination light to first transmit through the top cover glass 431 to reach the finger. When fingerprint ridges in contact of the cover top surface in the sensing area 615, the light reflection under the fingerprint ridges is different, due to the presence of the skin or tissue of the finger in contact at that location, from the light reflection at another location under the fingerprint valley, where the skin or tissue of the finger is absent. This difference in light reflection conditions at the locations of the ridges and valleys in the touched finger area on the cover top surface forms an image representing an image or spatial distribution of the ridges and valleys of the touched section of the finger. The reflection light is directed back towards the LCD display module 433, and, after passing through the small holes of the LCD display module 433, reaches the interface with the low index optically transparent block 701 of the optical sensor module. The low index optically transparent block 701 is constructed to have a refractive index less than a refractive index of the LCD display panel so that the returned light can be extracted out of the LCD display panel into the optically transparent block 701. Once the returned light is received inside the optically transparent block 701, such received light enters the optical imaging unit as part of the imaging sensing block 702 and is imaged onto the photodetector sensing array or optical sensing array inside the block 702. The light reflection differences between fingerprint ridges and valleys create the contrast of the fingerprint image. As shown in FIG. 4B, a control circuit 704 (e.g., a microcontroller or MCU) is coupled to the imaging sensing block 702 and to other circuitry such as the device main processor 705 on a main circuit board.

In this particular example, the optical light path design is structured so that the illumination light enters the cover top surface within the total reflection angles on the top surface between the substrate and air interface and, therefore, the reflected light is collected most effectively by the imaging optics and imaging sensor array in the block 702. In this design, the image of the fingerprint ridge/valley area exhibits a maximum contrast due to the total internal reflection condition at each finger valley location where the finger tissue does not touch the top cover surface of the top cover glass 431. Some implementations of such an imaging system may have undesired optical distortions that would adversely affect the fingerprint sensing. Accordingly, the acquired image may be further corrected by a distortion correction during the imaging reconstruction in processing the output signals of the optical sensor array in the block 702 based on the optical distortion profile along the light paths of the returned light at the optical sensor array. The distortion correction coefficients can be generated by images captured at each photodetector pixel by scanning a test image pattern one line pixel at a time, through the whole sensing area in both X direction lines and Y direction lines. This correction process can also use images from tuning each individual pixel on one at a time, and scanning through the whole image area of the photodetector array. This correction coefficients only need to be generated one time after assembly of the sensor.

The background light from environment (e.g., sunlight or room illumination light) may enter the image sensor through the LCD panel top surface, and through holes in the LCD display assembly 433. Such background light can create a background baseline in the interested images from a finger and thus may undesirably degrade the contrast of a captured image. Different methods can be used to reduce this undesired baseline intensity caused by the background light. One example is to tune on and off the illumination light source 436 at a certain illumination modulation frequency f and the image sensor accordingly acquires the received images at the same illumination modulation frequency by phase synchronizing the light source driving pulse and image sensor frame. Under this operation, only one of the image phases contain light from the light source. In implementing this technique, the imaging capturing can be timed to capture images with the illumination light on at even (or odd) frames while turning off the illumination light at odd (or even) frames and, accordingly, subtracting even and odd frames can be used to obtain an image which is mostly formed by light emitted from the modulated illumination light source with significantly reduced background light. Based on this design, each display scan frame generates a frame of fingerprint signals and two sequential frames of signals are obtained by turning on the illumination light in one frame and off in the other frame. The subtraction of adjacent frames can be used to minimize or substantially reduce the ambient background light influence. In implementations, the fingerprint sensing frame rate can be one half of the display frame rate.

In the example in FIG. 4B, a portion of the light from the one or more illumination light sources 436 may also go through the cover top surface and enter the finger tissues. This part of the illumination light is scattered around and a part of this scattered light may be eventually collected by the imaging sensor array in the optical sensor module 702. The light intensity of this scattered light is a result of interacting with the inner tissues of the finger and thus depends on the finger's skin color, the blood concentration in the finger tissue or the inner finger tissues. Such information of the finger is carried by this scattered light on the finger, is useful for fingerprint sensing, and can be detected as part of the fingerprint sensing operation. For example, the intensity of a region of user's finger image can be integrated in detection for measuring or observing in increase or decrease in the blood concentration that is associated with or depends on the phase of the user's heart-beat. This signature can be used to determine the user's heart beat rate, to determine if the user's finger is a live finger, or to provide a spoof device with a fabricated fingerprint pattern. Additional examples of using information in light carrying information on the inner tissues of a finger are provided in later sections of this patent document.

The one or more illumination light sources 436 in FIG. 4B can be designed to emit illumination light of different colors or wavelengths in some designs and the optical sensor module can capture returned light from a person's finger at the different colors or wavelengths. By recording the corresponding measured intensity of the returned light at the different colors or wavelengths, information associated with the user's skin color, the blood flow or inner tissue structures inside the finger can be measured or determined. As an example, when a user registers a finger for fingerprint authentication operation, the optical fingerprint sensor can be operated to measure the intensity of the scatter light from the finger at two different colors or illumination light wavelengths associated with light color A and light color B, as intensities Ia and Ib, respectively. The ratio of Ia/Ib could be recorded to compare with later measurement when the user's finger is placed on the sensing area on the top sensing surface to measure the fingerprint. This method can be used as part of the device's anti spoofing system to reject a spoof device that is fabricated with a fingerprint emulating or being identical to a user's fingerprint but may not match user's skin color or other biological information of the user.

The one or more illumination light sources 436 can be controlled by the same electronics 704 (e.g., MCU) for controlling the image sensor array in the block 702. The one or more illumination light sources 436 can be pulsed for a short time (e.g., at a low duty cycle) to emit light intermittently and to provide pulse light for image sensing. The image sensor array can be operated to monitor the light pattern at the same pulse duty cycle. If there is a human finger touching the sensing area 615 on the screen, the image that is captured at the imaging sensing array in the block 702 can be used to detect the touching event. The control electronics or MCU 704 connected to the image sensor array in the block 702 can be operated to determine if the touch is by a human finger touch. If it is confirmed that it is a human finger touch event, the MCU 704 can be operated to wake up the smartphone system, turn on the one or more illumination light sources 436 for performing the optical fingerprint sensing), and use the normal mode to acquire a full fingerprint image. The image sensor array in the block 702 sends the acquired fingerprint image to the smartphone main processor 705 which can be operated to match the captured fingerprint image to the registered fingerprint database. If there is a match, the smartphone unlocks the phone to allow a user to access the phone and start the normal operation. If the captured image is not matched, the smartphone produces a feedback to user that the authentication is failed and maintains the locking status of the phone. The user may try to go through the fingerprint sensing again, or may input a passcode as an alternative way to unlock the phone.

In the example in FIGS. 4A and 4B, the under-screen optical sensor module uses the optically transparent block 701 and the imaging sensing block 702 with the photodetector sensing array to optically image the fingerprint pattern of a touching finger in contact with the top surface of the display screen onto the photodetector sensing array. The optical imaging axis or detection axis 625 from the sensing zone 615 to the photodetector array in the block 702 is illustrated in FIG. 4B for the illustrated example. The optically transparent block 701 and the front end of the imaging sensing block 702 before the photodetector sensing array form a bulk imaging module to achieve proper imaging for the optical fingerprint sensing. Due to the optical distortions in this imaging process, a distortion correction can be used to achieve the desired imaging operation.

In the optical sensing by the under-screen optical sensor module in FIGS. 4A and 4B and other designs disclosed herein, the optical signal from the sensing zone 615 on the top transparent layer 431 to the under-screen optical sensor module include different light components. FIGS. 5A, 5B, 5C, 35, 36A and 36B illustrate signal generation for the returned light from the sensing zone 615 under different optical conditions to facilitate the understanding of the operation of the under-screen optical sensor module. The light that enters into the finger, either from the illumination light source or from other light sources (e.g., background light) can generate internally scattered light in tissues below the finger surface, such as the scattered light 191 in FIGS. 5A-5C and the scattered light 5561b and 5662a in FIG. 35. Such internally scattered light in tissues below the finger surface can propagate through the internal tissues of the finger and subsequently transmits through the finger skin to enter the top transparent layer 431 carrying certain information is not carried by light that is scattered, refracted or reflected by the finger surface, e.g., information on finger skin color, the blood concentration or flow characteristics inside the finger, or an optical transmissive pattern of the finger that contains both (1) a 2-dimensional spatial pattern of external ridges and valleys of a fingerprint (2) an internal fingerprint pattern associated with internal finger tissue structures that give rise to the external ridges and valleys of a finger.

Figure 5A:
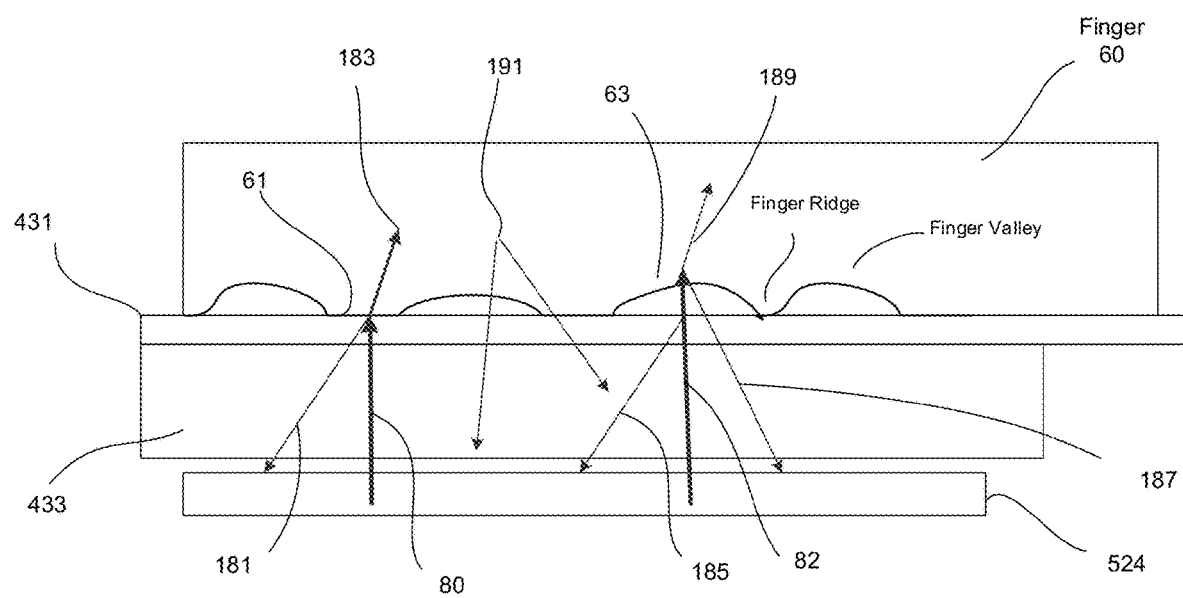
FIGS. 5A, 5B and 5C illustrate signal generation for the returned light from the sensing zone on the top sensing surface under two different optical conditions to facilitate the understanding of the operation of the under-screen optical sensor module.

FIG. 5A shows an example of how illumination light from the one or more illumination light sources 436 propagates through the OLED display module 433, after transmitting through the top transparent layer 431, and generates different returned light signals including light signals that carry fingerprint pattern information to the under-screen optical sensor module. For simplicity, two illumination rays 80 and 82 at two different locations are directed to the top transparent layer 431 without experiencing total reflection at the interfaces of the top transparent layer 431. Specifically, the illumination light rays 80 and 82 are perpendicular or nearly perpendicular to the top layer 431. A finger 60 is in contact with the sensing zone 615 on the e top transparent layer 431. As illustrated, the illumination light beam 80 reaches to a finger ridge in contact with the top transparent layer 431 after transmitting through the top transparent layer 431 to generate the light beam 183 in the finger tissue and another light beam 181 back towards the LCD display module 433. The illumination light beam 82 reaches to a finger valley located above the top transparent layer 431 after transmitting through the top transparent layer 431 to generate the reflected light beam 185 from the interface with the top transparent layer 431 back towards the LCD display module 433, a second light beam 189 that enters the finger tissue and a third light beam 187 reflected by the finger valley.

In the example in FIG. 5A, it is assumed that the finger skin's equivalent index of refraction is about 1.44 at 550 nm and the cover glass index of refraction is about 1.51 for the top transparent layer 431. The finger ridge-cover glass interface reflects part of the beam 80 as reflected light 181 to bottom layers 524 below the LCD display module 433. The reflectance can be low, e.g., about 0.1% in some LCD panels. The majority of the light beam 80 becomes the beam 183 that transmits into the finger tissue 60 which causes scattering of the light 183 to produce the returned scattered light 191 towards the LCD display module 433 and the bottom layers 524. The scattering of the transmitted light beam 189 from the LCD pixel 73 in the finger tissue also contributes to the returned scattered light 191.

The beam 82 at the finger skin valley location 63 is reflected by the cover glass surface. In some designs, for example, the reflection may be about 3.5% as the reflected light 185 towards bottom layers 524, and the finger valley surface may reflect about 3.3% of the incident light power (light 187) to bottom layers 524 so that the total reflection may be about 6.8%. The majority light 189 is transmitted into the finger tissues 60. Part of the light power in the transmitted light 189 in the figure tissue is scattered by the tissue to contribute to the scattered light 191 towards and into the bottom layers 524.

Therefore, in the example in FIG. 5A, the light reflections from various interface or surfaces at finger valleys and finger ridges of a touching finger are different and the reflection ratio difference carries the fingerprint map information and can be measured to extract the fingerprint pattern of the portion that is in contact with the top transparent layer 431 and is illuminated the OLED light.

Figure 5B:
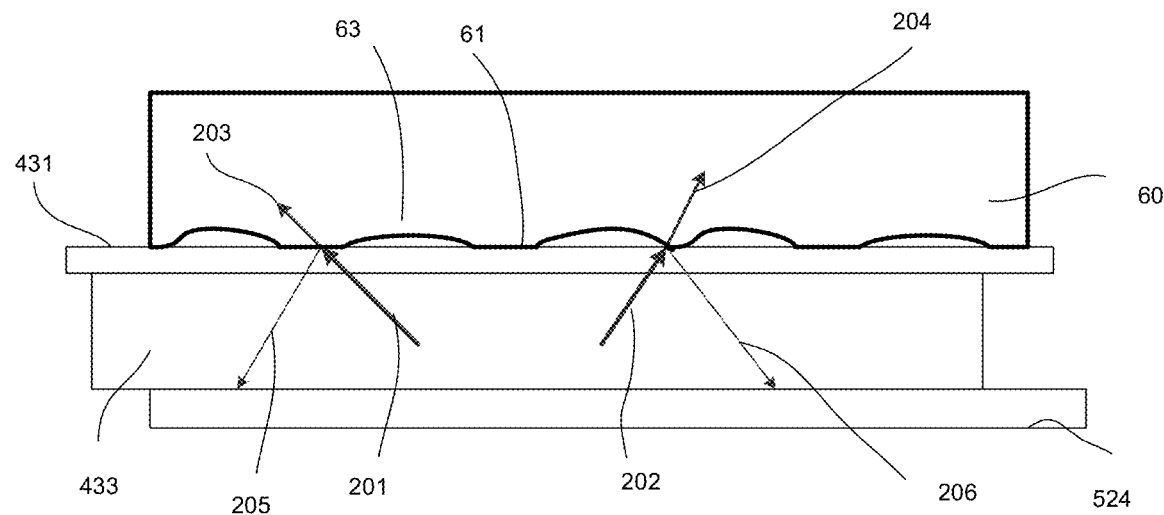
Figure 5C:
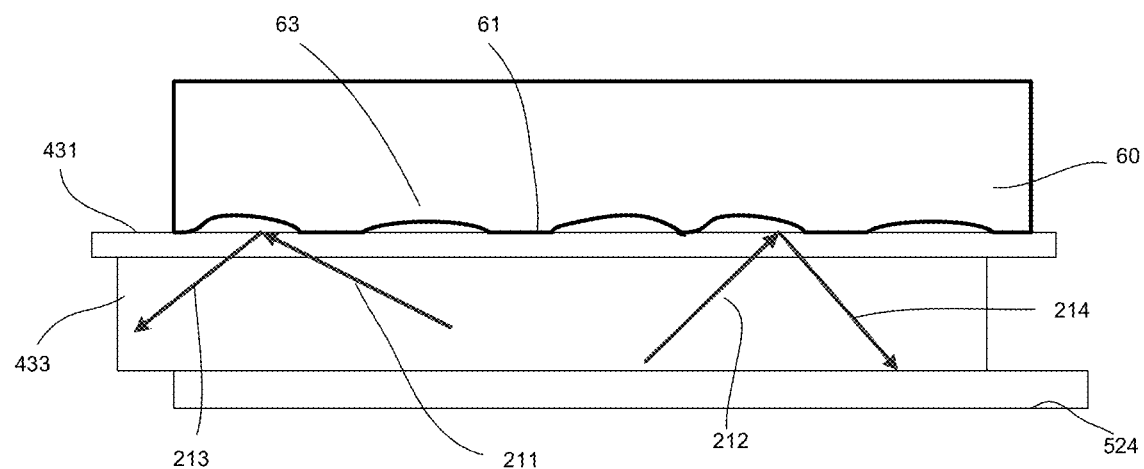

FIGS. 5B and 5C illustrate optical paths of two additional types of illumination light rays at the top surface under different conditions and at different positions relative to valleys or ridges of a finger, including under a total reflection condition at the interface with the top transparent layer 431. The illustrated illumination light rays generate different returned light signals including light signals that carry fingerprint pattern information to the under-screen optical sensor module. It is assumed that the cover glass 431 and the LCD display module 433 are glued together without any air gap in between so that illumination light with a large incident angle to the cover glass 431 will be totally reflected at the cover glass-air interface. FIGS. 5A, 5B and 5C illustrate examples of three different groups divergent light beams: (1) central beams 82 with small incident angles to the cover glass 431 without the total reflection (FIG. 5A), (2) high contrast beams 201, 202, 211, 212 that are totally reflected at the cover glass 431 when nothing touches the cover glass surface and can be coupled into finger tissues when a finger touches the cover glass 431 (FIGS. 5B and 5C), and (3) escaping beams having very large incident angles that are totally reflected at the cover glass 431 even at a location where the finger issue is in contact.

For the central light beams 82, the cover glass surface in some designs may reflect about 0.1%~3.5% to light beam 185 that is transmitted into bottom layers 524, the finger skin may reflect about 0.1%~3.3% to light beam 187 that is also transmitted into bottom layers 524. The reflection difference is dependent on whether the light beams 82 meet with finger skin ridge 61 or valley 63. The rest light beam 189 is coupled into the finger tissues 60.

For high contrast light beams 201 and 202 meeting the local totally internal reflection condition, the cover glass surface reflects nearly 100% to light beams 205 and 206 respectively if nothing touches the cover glass surface. When the finger skin ridges touch the cover glass surface and at light beams 201 and 202 positions, most of the light power may be coupled into the finger tissues 60 by light beams 203 and 204.

For high contrast light beams 211 and 212 meeting the local totally internal reflection condition, the cover glass surface reflects nearly 100% to light beams 213 and 214 respectively if nothing touches the cover glass surface. When the finger touches the cover glass surface and the finger skin valleys happen to be at light beams 211 and 212 positions, no light power is coupled into finger tissues 60.

As illustrated in FIG. 5A, a portion of the illumination light that is coupled into finger tissues 60 tends to experience random scattering by the inner finger tissues to form low-contrast light 191 and part of such low-contrast light 191 can pass through the LCD display module 433 to reach to the optical sensor module. This portion of light captured by optical sensor module contains additional information on the finger skin color, blood characteristics and the finger inner tissue structures associated with the fingerprint. Additional features for using internally scattered light in tissues below the finger surface in optical sensing will be explained in later part of this patent document, such as obtaining an optical transmissive pattern of the finger that contains both (1) a 2-dimensional spatial pattern of external ridges and valleys of a fingerprint (2) an internal fingerprint pattern associated with internal finger tissue structures that give rise to the external ridges and valleys of a finger.

Therefore, in high contrast light beams illuminated area, finger skin ridges and valleys cause different optical reflections and the reflection difference pattern carries the fingerprint pattern information. The high contrast fingerprint signals can be achieved by comparing the difference.

The disclosed under-screen optical sensing technology can be in various configurations to optically capture fingerprints based on the design in FIGS. 2A and 2B.

For example, the specific implementation in FIG. 4B based on optical imaging by using a bulk imaging module in the optical sensing module can be implemented in various configurations. FIGS. 6A-6C, 7, 8A-8B, 9, 10A-10B, 11 and 12 illustrate examples of various implementations and additional features and operations of the under-screen optical sensor module designs for optical fingerprint sensing.

Figure 6A:
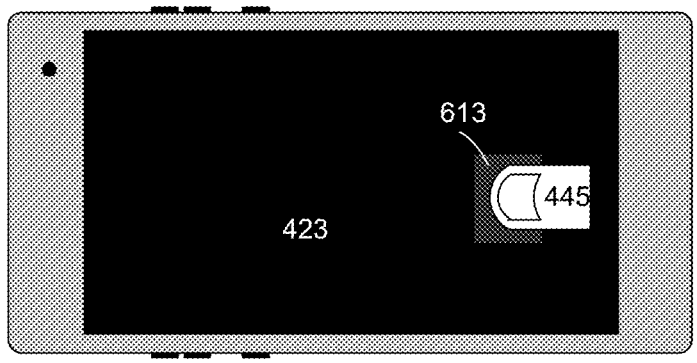
FIGS. 6A-6C, 7, 8A-8B, 9, and 10A-10B show example designs of under-screen optical sensor modules.
Figure 6B:
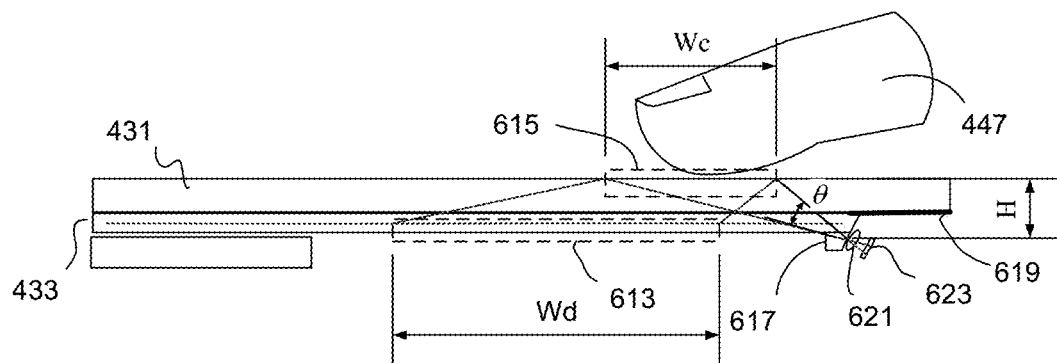
Figure 6C:
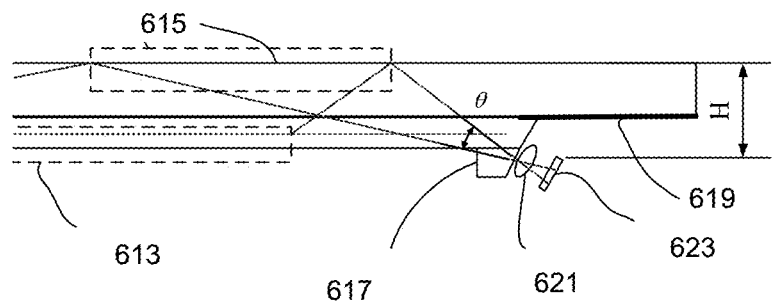

FIG. 6A, FIG. 6B and FIG. 6C show an example of an under-screen optical sensor module based on optical imaging via a lens for capturing a fingerprint from a finger 447 pressing on the display cover glass 423. FIG. 6C is an enlarged view of the optical sensor module part shown in FIG. 6B. The under-screen optical sensor module as shown in FIG. 6B is placed under the LCD display module 433 includes an optically transparent spacer 617 that is engaged to the bottom surface of the LCD display module 433 to receive the returned light from the sensing zone 615 on the top surface of the top transparent layer 431, an imaging lens 621 that is located between and spacer 617 and the photodetector array 623 to image the received returned light from the sensing zone 615 onto the photodetector array 623. Different from FIG. 4B showing an example of an optical projection imaging system without a lens, the example of the imaging design in FIG. 6B used the imaging lens 621 to capture the fingerprint image at the photodetector array 623 and enables an image reduction by the design of the imaging lens 621. Similar to the imaging system in the example in FIG. 4B to some extent, this imaging system in FIG. 6B for the optical sensor module can experience image distortions and a suitable optical correction calibration can be used to reduce such distortions, e.g., the distortion correction methods described for the system in FIG. 4B.

Similar to the assumptions in FIGS. 5A, 5B and 5C, it is assumed that the finger skin's equivalent index of refraction to be about 1.44 at 550 nm and a bare cover glass index of refraction to be about 1.51 for the cover glass 423. When the OLED display module 433 is glued onto the cover glass 431 without any air gap, the total inner reflection happens in large angles at or larger than the critical incident angle for the interface. The total reflection incident angle is about 41.8° if nothing is in contact with the cover glass top surface, and the total reflection angle is about 73.7° if the finger skin touches the cover glass top surface. The corresponding total reflection angle difference is about 31.9°.

In this design, the micro lens 621 and the photodiode array 623 define a viewing angle θ for capturing the image of a contact finger in the sensing zone 615. This viewing angle can be aligned properly by controlling the physical parameters or configurations in order to detect a desired part of the cover glass surface in the sensing zone 615. For example, the viewing angle may be aligned to detect the total inner reflection of the LCD display assembly. Specifically, the viewing angle θ is aligned to sense the effective sensing zone 615 on the cover glass surface. The effective sensing cover glass surface 615 may be viewed as a mirror so that the photodetector array effectively detects an image of the fingerprint illumination light zone 613 in the LCD display that is projected by the sensing cover glass surface 615 onto the photodetector array. The photodiode/photodetector array 623 can receive the image of the zone 613 that is reflected by the sensing cover glass surface 615. When a finger touches the sensing zone 615, some of the light can be coupled into the fingerprint's ridges and this will cause the photodetector array to receive light from the location of the ridges to appear as a darker image of the fingerprint. Because the geometrics of the optical detection path are known, the fingerprint image distortion caused in the optical path in the optical sensor module can be corrected.

Consider, as a specific example, that the distance H in FIG. 6B from the detection module central axis to the cover glass top surface is 2 mm. This design can directly cover 5 mm of an effective sensing zone 615 with a width Wc on the cover glass. Adjusting the spacer 617 thickness can adjust the detector position parameter H, and the effective sensing zone width Wc can be optimized. Because H includes the thickness of the cover glass 431 and the display module 433, the application design should take these layers into account. The spacer 617, the micro lens 621, and the photodiode array 623 can be integrated under the color coating 619 on the bottom surface of the top transparent layer 431.

Figure 7:
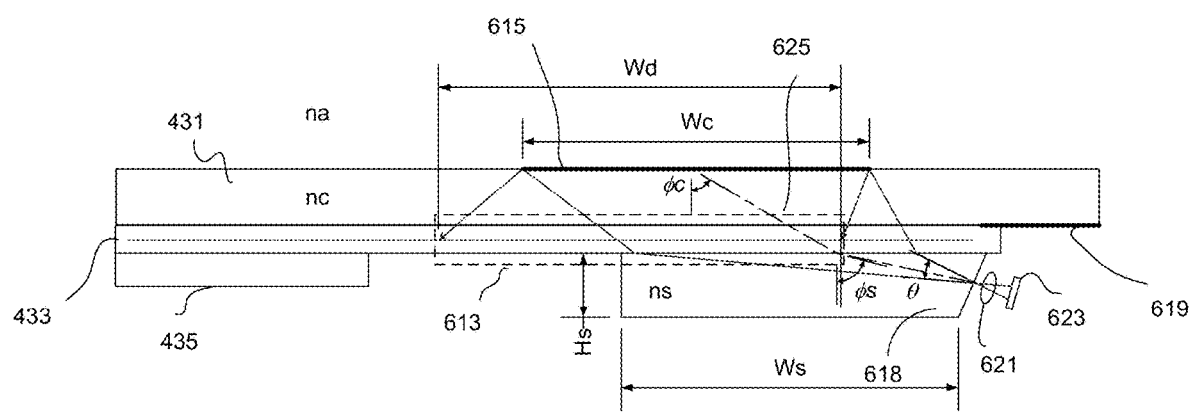

FIG. 7 shows an example of further design considerations of the optical imaging design for the optical sensor module shown in FIGS. 6A-6C by using a special spacer 618 to replace the spacer 617 in FIGS. 6B-6C to increase the size of the sensing area 615. The spacer 618 is designed with a width Ws and thickness is Hs to have a low refraction index (RI) ns, and is placed under the LCD display module 433, e.g., being attached (e.g., glued) to the bottom surface the LCD display module 433. The end facet of the spacer 618 is an angled or slanted facet that interfaces with the micro lens 621. This relative position of the spacer and the lens is different from FIGS. 6B-6C where the lens is placed underneath the spacer 617. The micro lens 621 and a photodiode array 623 are assembled into the optical detection module with a detection angle width θ. The detection axis 625 is bent due to optical refraction at the interface between the spacer 618 and display module 433 and at the interface between the cover glass 431 and the air. The local incident angle $\phi 1$ and $\phi 2$ are decided by the refractive indices RIs, ns, nc, and na of the materials for the components.

If nc is greater than ns, $\phi 1$ is greater than $\phi 2$. Thus, the refraction enlarges the sensing width Wc. For example, assuming the finger skin's equivalent RI is about 1.44 at 550 nm and the cover glass index RI is about 1.51, the total reflection incident angle is estimated to be about 41.8° if nothing touches the cover glass top surface, and the total reflection angle is about 73.7° if the finger skin touches the cover glass top surface. The corresponding total reflection angle difference is about 31.9°. If the spacer 618 is made of same material of the cover glass, and the distance from the detection module center to the cover glass top surface is 2 mm, if detection angle width is θ=31.9°, the effective sensing area width Wc is about 5 mm. The corresponding central axis's local incident angle is $\phi 1 = \phi 2 = 57.75°$. If the material for the special spacer 618 has a refractive index ns about 1.4, and Hs is 1.2 mm and the detection module is tilted at $\phi 1 = 70°$. The effective sensing area width is increased to be greater than 6.5 mm. Under those parameters, the detection angle width in the cover glass is reduced to 19°. Therefore, the imaging system for the optical sensor module can be designed to desirably enlarge the size of the sensing area 615 on the top transparent layer 431.

When the refractive index RI of the special spacer 618 is designed to be sufficiently low (e.g., to use $MgF_2$, $CaF_2$, or even air to form the spacer), the width Wc of the effective sensing area 615 is no longer limited by the thickness of the cover glass 431 and the display module 433. This property provides desired design flexibility. In principle, if the detection module has a sufficient resolution, the effective sensing area may even be increased to cover the entire display screen.

Since the disclosed optical sensor technology can be used to provide a large sensing area for capturing a pattern, the disclosed under-screen optical sensor modules may be used to capture and detect not only a pattern of a finger but a larger size patter such a person's palm that is associated with a person for user authentication.

Figure 8A:
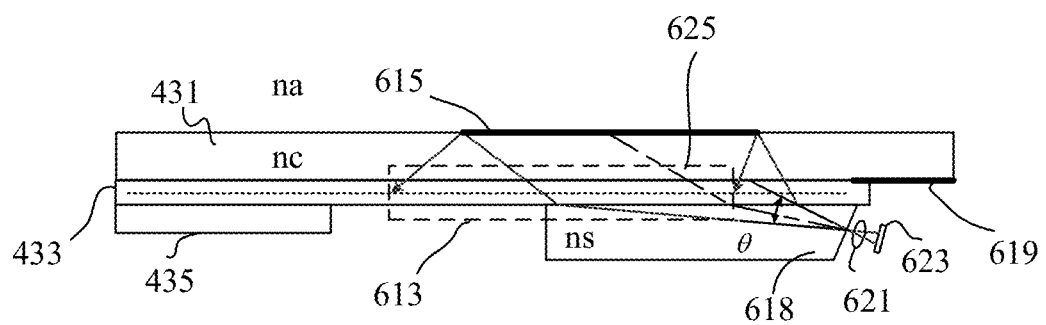
Figure 8B:
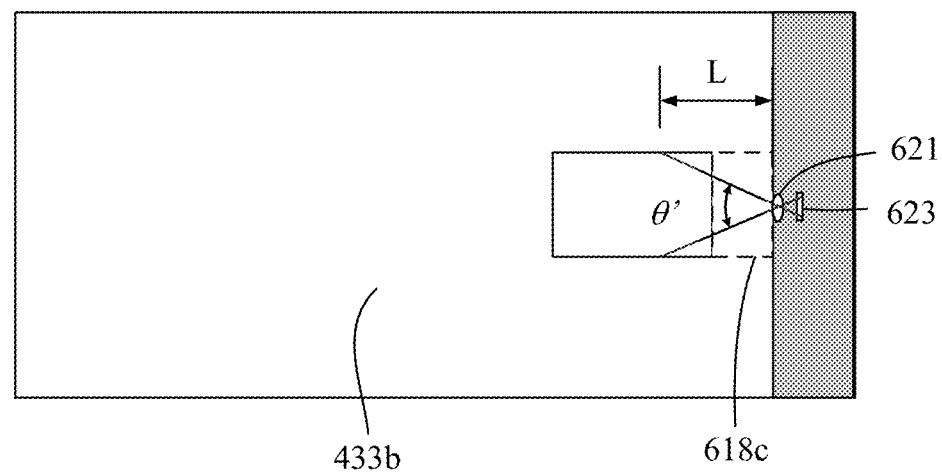

FIGS. 8A-8B show an example of further design considerations of the optical imaging design for the optical sensor module shown in FIG. 7 by setting the detection angle θ' of the photodetector array relative in the display screen surface and the distance L between the lens 621 and the spacer 618. FIG. 8A shows a cross-sectional view along the direction perpendicular to the display screen surface and FIG. 8B shows a view of the device from either the bottom or top of the displace screen. A filling material 618c can be used to fill the space between the lens 621 and the photodetector array 623. For example, the filling material 618c can be same material of the special spacer 618 or another different material. In some designs, the filling material 618c may the air space.

Figure 9:
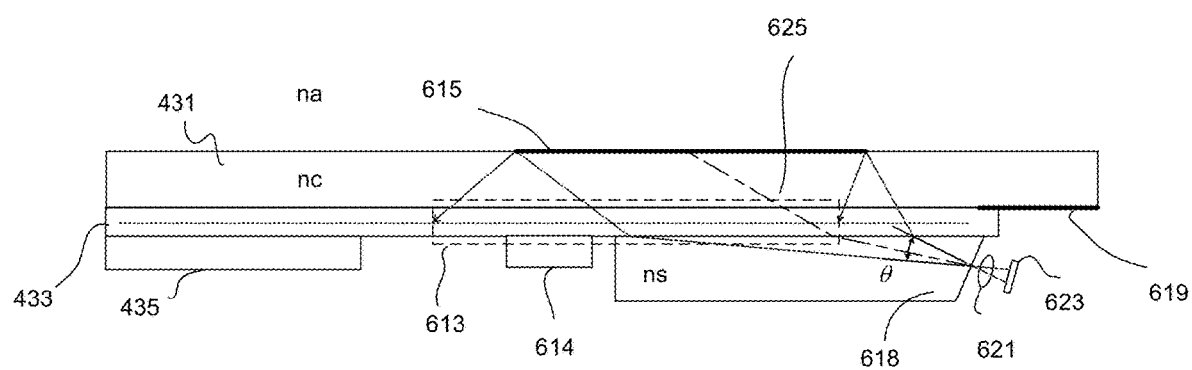

FIG. 9 shows another example of an under-screen optical sensor module based on the design in FIG. 7 where one or more illumination light sources 614 are provided to illuminate the top surface sensing zone 615 for optical fingerprint sensing. The illumination light sources 614 may be of an expanded type, or be a collimated type so that all the points within the effective sensing zone 615 is illuminated. The illumination light sources 614 may be a single element light source or an array of light sources.

Figure 10A:
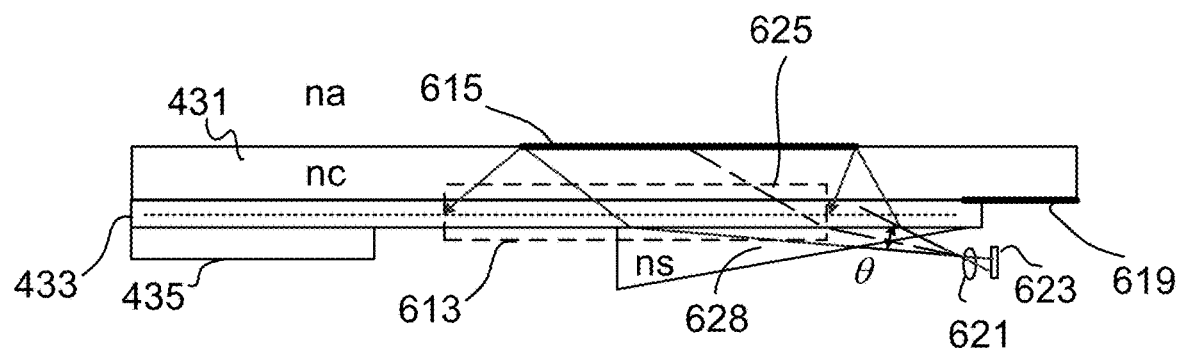
Figure 10B:
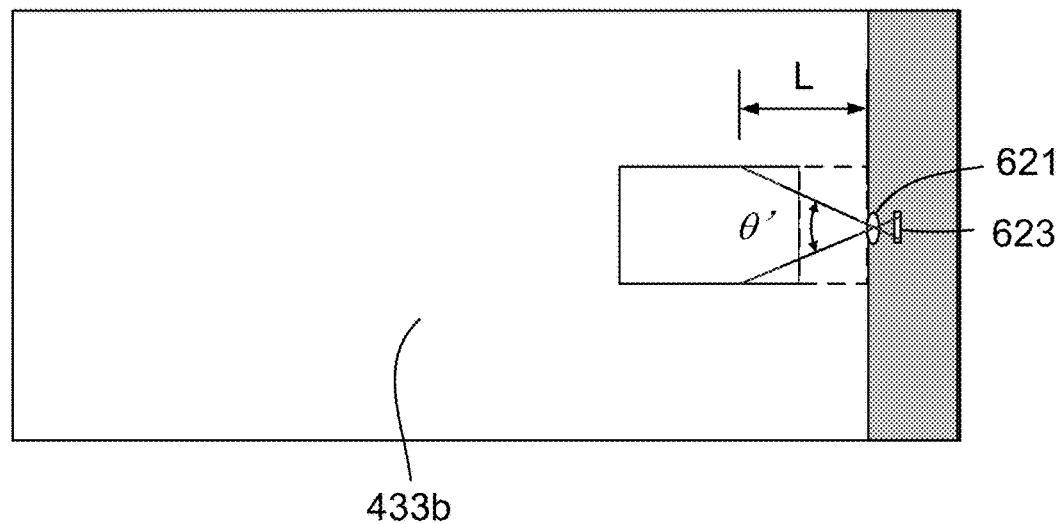

FIGS. 10A-10B show an example of an under-screen optical sensor module that uses an optical coupler 628 shaped as a thin wedge to improve the optical detection at the optical sensor array 623. FIG. 10A shows a cross section of the device structure with an under-screen optical sensor module for fingerprint sensing and FIG. 10B shows a top view of the device screen. The optical wedge 628 (with a refractive index $n_s$) is located below the display panel structure to modify a total reflection condition on a bottom surface of the display panel structure that interfaces with the optical wedge 628 to permit extraction of light out of the display panel structure through the bottom surface. The optical sensor array 623 receives the light from the optical wedge 628 extracted from the display panel structure and the optical imaging module 621 is located between the optical wedge 628 and the optical sensor array 623 to image the light from the optical wedge 628 onto the optical sensor array 623. In the illustrated example, the optical wedge 628 includes a slanted optical wedge surface facing the optical imaging module and the optical sensing array 623. Also, as shown, there is a free space between the optical wedge 628 and the optical imaging module 621.

If the light is totally reflected at the sensing surface of the cover glass 431, the reflectance is 100%, of the highest efficiency. However, the light will also be totally reflected at the LCD bottom surface 433b if it is parallel to the cover glass surfaces. The wedge coupler 628 is used to modify the local surface angle so that the light can be coupled out for the detection at the optical sensor array 623. The micro holes in the LCD display module 433 provide the desired light propagation path for light to transmit through the LCD display module 433 for the under-screen optical sensing. The actual light transmission efficiency may gradually be reduced if the light transmission angle becomes too large or when the TFT layer becomes too thick. When the angle is close to the total reflection angle, namely about 41.8° when the cover glass refractive index is 1.5, the fingerprint image looks good. Accordingly, the wedge angle of the wedge coupler 628 may be adjusted to be of a couple of degrees so that the detection efficiency can be increased or optimized. If the cover glass' refractive index is selected to be higher, the total reflection angle becomes smaller. For example, if the cover glass is made of Sapphire which refractive index is about 1.76, the total reflection angle is about 34.62°. The detection light transmission efficiency in the display is also improved. Therefore, this design of using a thin wedge to set the detection angle to be higher than the total reflection angle, and/or to use high refractive index cover glass material to improve the detection efficiency.

In the under-screen optical sensor module designs in FIGS. 6A-10B, the sensing area 615 on the top transparent surface is not vertical or perpendicular to the detection axis 625 of the optical sensor module so that the image plane of the sensing area is also not vertical or perpendicular to the detection axis 625. Accordingly, the plane of the photodetector array 523 can be tilted relative the detection axis 625 to achieve high quality imaging at the photodetector array 623.

Figure 11:
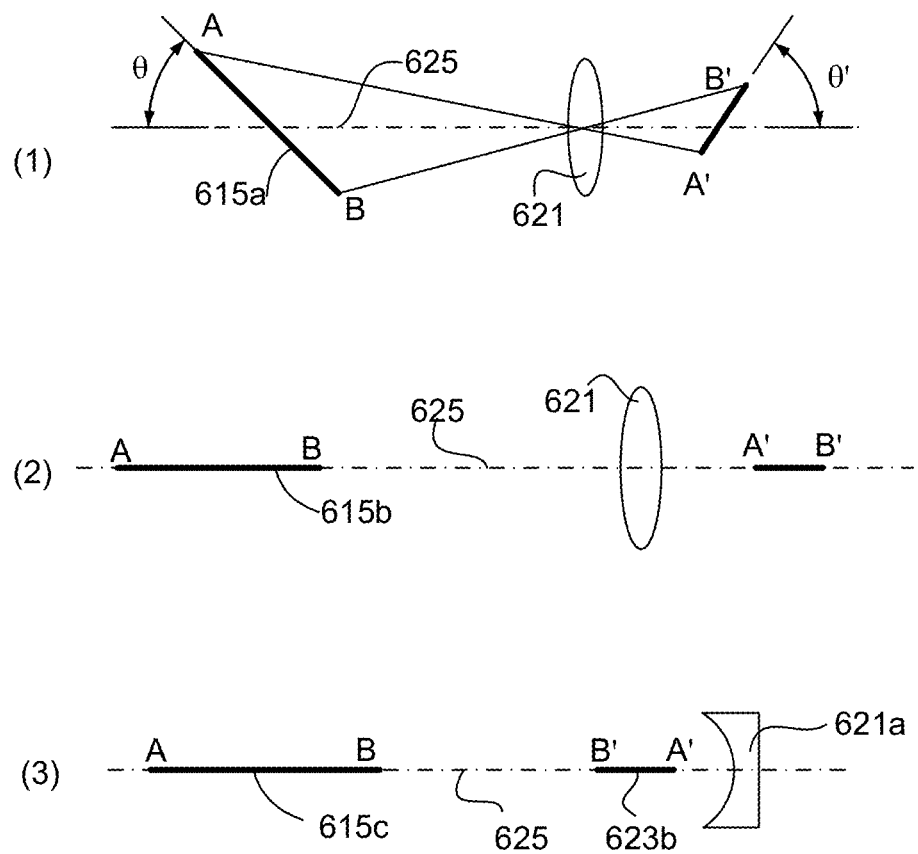
FIG. 11 shows imaging of the fingerprint sensing area on the top transparent layer via an imaging module under different tiling conditions where an imaging device images the fingerprint sensing area onto an optical sensor array and the imaging device may be optically transmissive or optically reflective.

FIG. 11 shows three example configurations for this tiling. FIG. 11 (1) shows the sensing area 615*a* is tilted and is not perpendicular the detection axis 625. In a specified case shown in (2), the sensing area 615*b* is aligned to be on the detection axis 625, its image plane will also be located on the detection axis 625. In practice, the lens 621 can be partially cut off so as to simplify the package. In various implementations, the micro lens 621 can also be of transmission type or reflection type. For example, a specified approach is illustrated in (3). The sensing area 615*c* is imaged by an imaging mirror 621*a*. A photodiode array 623*b* is aligned to detect the signals.

In the above designs where the lens 621 is used, the lens 621 can be designed to have an effective aperture that is larger than the aperture of the holes in the LCD display layers that allow transmission of light through the LCD display module for optical fingerprint sensing. This design can reduce the undesired influence of the wiring structures and other scattering objects in the LCD display module.

Figure 12:
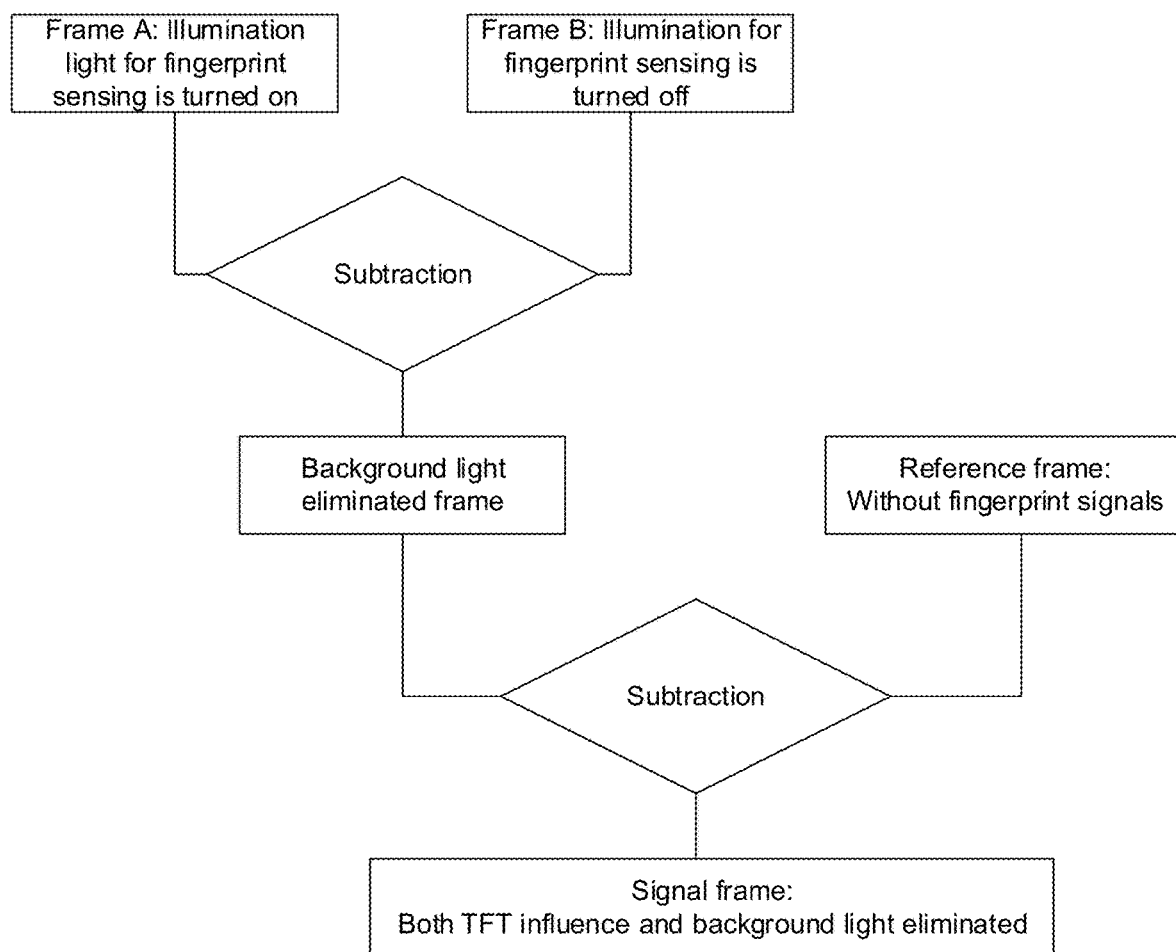
FIG. 12 shows an example of an operation of the fingerprint sensor for reducing or eliminating undesired contributions from the background light in fingerprint sensing.

FIG. 12 shows an example of an operation of the fingerprint sensor for reducing or eliminating undesired contributions from the background light in fingerprint sensing. The optical sensor array can be used to capture various frames and the captured frames can be used to perform differential and averaging operations among multiple frames to reduce the influence of the background light. For example, in frame A, the illumination light source for optical fingerprint sensing is turned on to illuminate the finger touching area, in frame B the illumination is changed or is turned off. Subtraction of the signals of frame B from the signals of frame A can be used in the image processing to reduce the undesired background light influence.

The undesired background light in the fingerprint sensing may also be reduced by providing proper optical filtering in the light path. One or more optical filters may be used to reject the environment light wavelengths, such as near IR and partial of the red light etc. In some implementation, such optical filter coatings may be made on the surfaces of the optical parts, including the display bottom surface, prism surfaces, sensor surface etc. For example, human fingers absorb most of the energy of the wavelengths under ~580 nm, if one or more optical filters or optical filtering coatings can be designed to reject light in wavelengths from 580 nm to infrared, undesired contributions to the optical detection in fingerprint sensing from the environment light may be greatly reduced.

Figure 13:
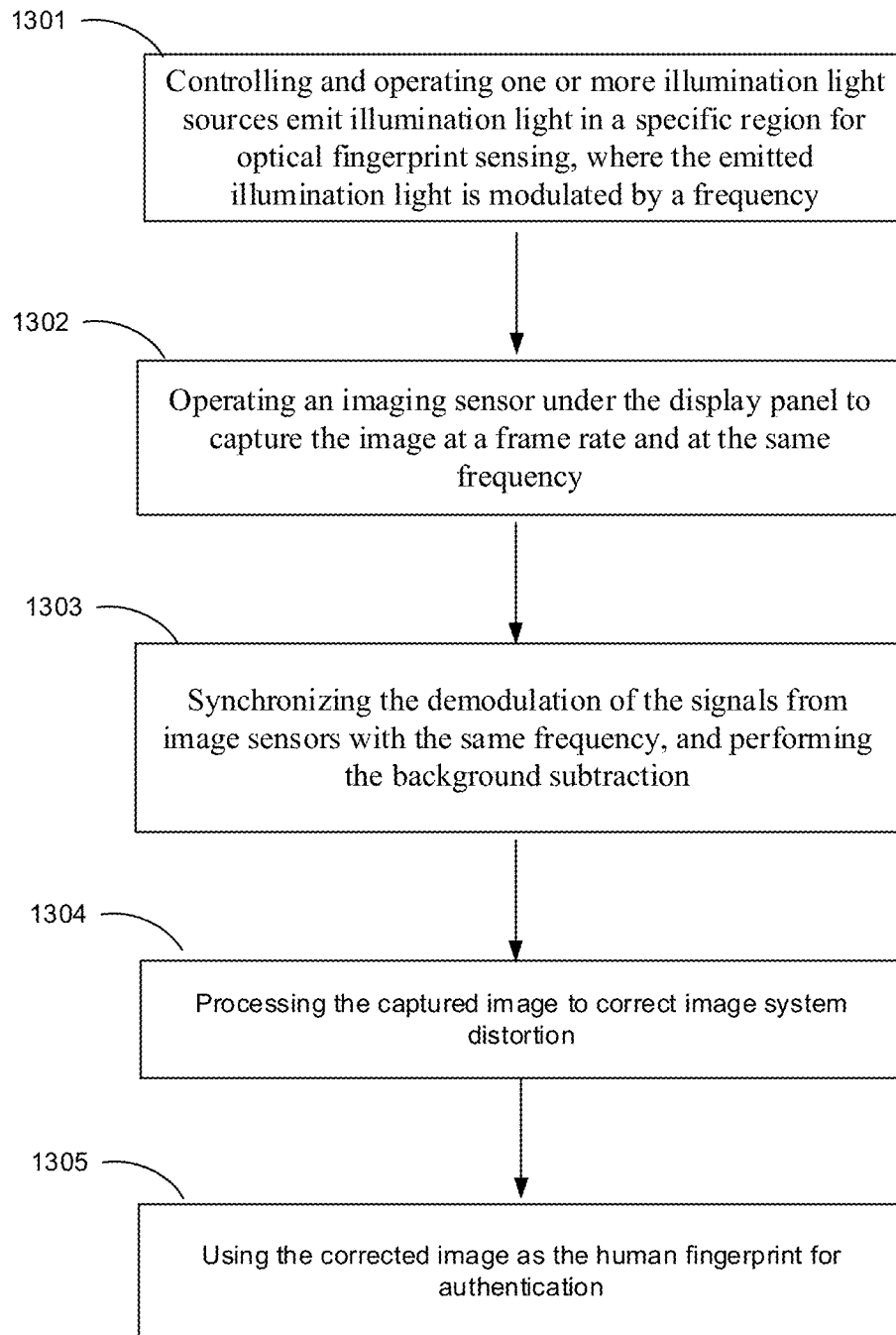
FIG. 13 shows a process for operating an under-screen optical sensor module for capturing a fingerprint pattern.

FIG. 13 shows an example of an operation process for correcting the image distortion in the optical sensor module. At step 1301, the one or more illumination light sources are controlled and operated to emit light in a specific region, and the light emission of such pixels is modulated by a frequency F. At step 1302, an imaging sensor under the display panel is operated to capture the image at frame rate at same frequency F. In the optical fingerprint sensing operation, a finger is placed on top of the display panel cover substrate and the presence of the finger modulates the light reflection intensity of the display panel cover substrate top surface. The imaging sensor under the display captures the fingerprint modulated reflection light pattern. At step 1303, the demodulation of the signals from image sensors is synchronized with the frequency F, and the background subtraction is performed. The resultant image has a reduced background light effect and includes images from pixel emitting lights. At step 1304, the capture image is processed and calibrated to correct image system distortions. At step 1305, the corrected image is used as a human fingerprint image for user authentication.

The same optical sensors used for capturing the fingerprint of a user can be used also to capture the scattered light from the illuminated finger as shown by the back scattered light 191 in FIG. 5A. The detector signals from the back scattered light 191 in FIG. 5A in a region of interest can be integrated to produce an intensity signal. The intensity variation of this intensity signal is evaluated to determine other parameters beyond the fingerprint pattern, e.g., the heart rate of the user or inner topological tissues of a finger associated with the external fingerprint pattern.

The above fingerprint sensor may be hacked by malicious individuals who can obtain the authorized user's fingerprint, and copy the stolen fingerprint pattern on a carrier object that resembles a human finger. Such unauthorized fingerprint patterns may be used on the fingerprint sensor to unlock the targeted device. Hence, a fingerprint pattern, although a unique biometric identifier, may not be by itself a completely reliable or secure identification. The under-screen optical sensor module can also be used to as an optical anti-spoofing sensor for sensing whether an input object with fingerprint patterns is a finger from a living person and for determining whether a fingerprint input is a fingerprint spoofing attack. This optical anti-spoofing sensing function can be provided without using a separate optical sensor. The optical anti-spoofing can provide high-speed responses without compromising the overall response speed of the fingerprint sensing operation.

Figure 14:
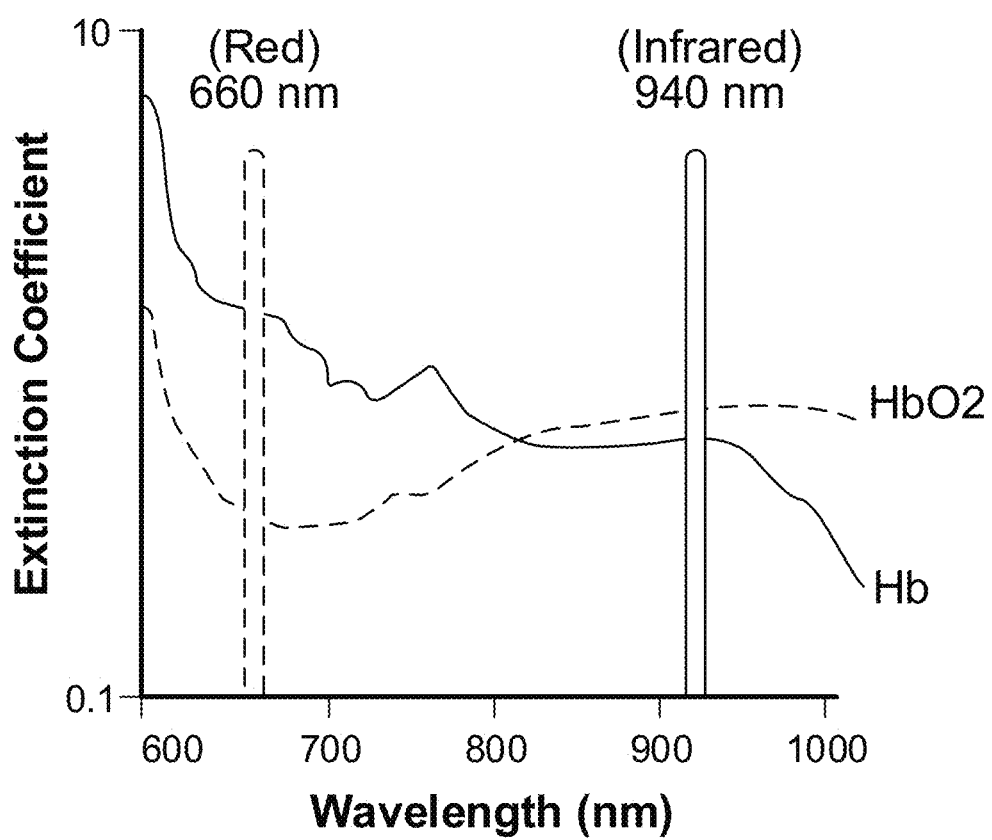
FIGS. 14, 15 and 16 show examples of an operation process for determining whether an object in contact with the LCD display screen is part of a finger of a live person by illuminating the finger with light in two different light colors.

FIG. 14 shows exemplary optical extinction coefficients of materials being monitored in blood where the optical absorptions are different between the visible spectral range e.g., red light at 660 nm and the infrared range, e.g., IR light at 940 nm. By using probe light to illuminate a finger at a first visible wavelength (Color A) and a second different wavelength such as an infrared (IR) wavelength (Color B), the differences in the optical absorption of the input object can be captured determine whether the touched object is a finger from a live person. The one or more illumination light sources for providing the illumination for optical sensing can be used to emit light of different colors to emit probe or illumination light at least two different optical wavelengths to use the different optical absorption behaviors of the blood for live finger detection. When a person' heart beats, the pulse pressure pumps the blood to flow in the arteries, so the extinction ratio of the materials being monitored in the blood changes with the pulse. The received signal carries the pulse signals. These properties of the blood can be used to detect whether the monitored material is a live-fingerprint or a fake fingerprint.

Figure 15:
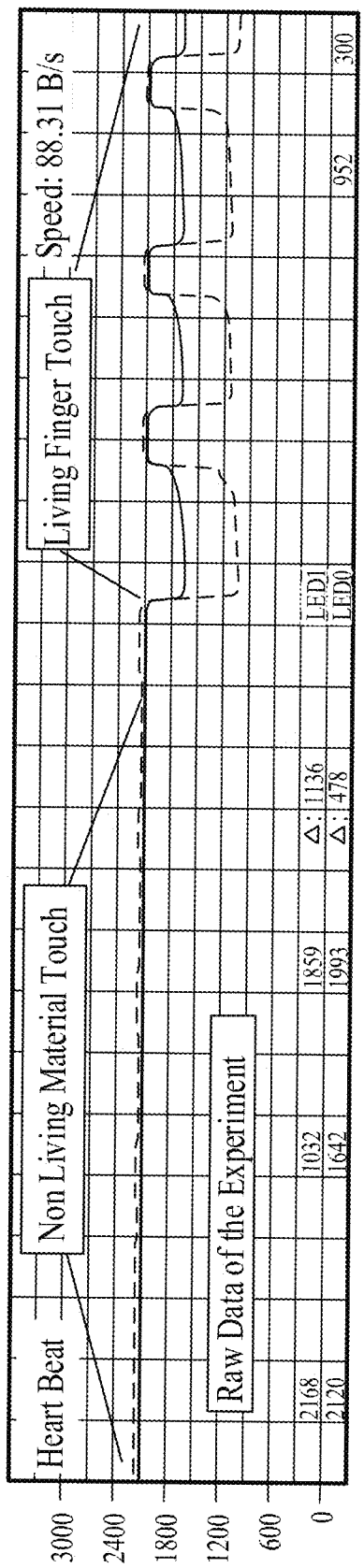

FIG. 15 shows a comparison between optical signal behaviors in the reflected light from a nonliving material (e.g., a fake finger or a spoof device with a fabricated fingerprint pattern) and a live finger. The optical fingerprint sensor can also operate as a heartbeat sensor to monitor a living organism. When two or more wavelengths of the probe light are detected, the extinction ratio difference can be used to quickly determine whether the monitored material is a living organism, such as live fingerprint. In the example shown in FIG. 15, probe light at different wavelengths were used, one at a visible wavelength and another at an IR wavelength as illustrated in FIG. 14.

When a nonliving material touches the top cover glass above the fingerprint sensor module, the received signal reveals strength levels that are correlated to the surface pattern of the nonliving material and the received signal does not contain signal components associated with a finger of a living person. However, when a finger of a living person touches the top cover glass, the received signal reveals signal characteristics associated with a living person, including obviously different strength levels because the extinction ratios are different for different wavelengths. This method does not take long time to determine whether the touching material is a part of a living person. In FIG. 15, the pulse-shaped signal reflects multiple touches instead of blood pulse. Similar multiple touches with a nonliving material does not show the difference caused by a living finger.

This optical sensing of different optical absorption behaviors of the blood at different optical wavelengths can be performed in a short period for live finger detection and can be faster than optical detection of a person's heart beat using the same optical sensor.

In LCD displays, the LCD backlighting illumination light is white light and thus contains light at both the visible and IR spectral ranges for performing the above live finger detection at the optical sensor module. The LCD color filters in the LCD display module can be used to allow the optical sensor module to obtain measurements in FIGS. 14 and 15. In addition, the designated light sources 436 for producing the illumination light for optical sensing can be operated to emit probe light at the selected visible wavelength and IR wavelength at different times and the reflected probe light at the two different wavelengths is captured by the optical detector array 623 to determine whether touched object is a live finger based on the above operations shown in FIGS. 14 and 15. Notably, although the reflected probe light at the selected visible wavelength and IR wavelength at different times may reflect different optical absorption properties of the blood, the fingerprint image is always captured by both the probe light the selected visible wavelength and the probe light at the IR wavelength at different times. Therefore, the fingerprint sensing can be made at both the visible wavelength and IR wavelength.

Figure 16:
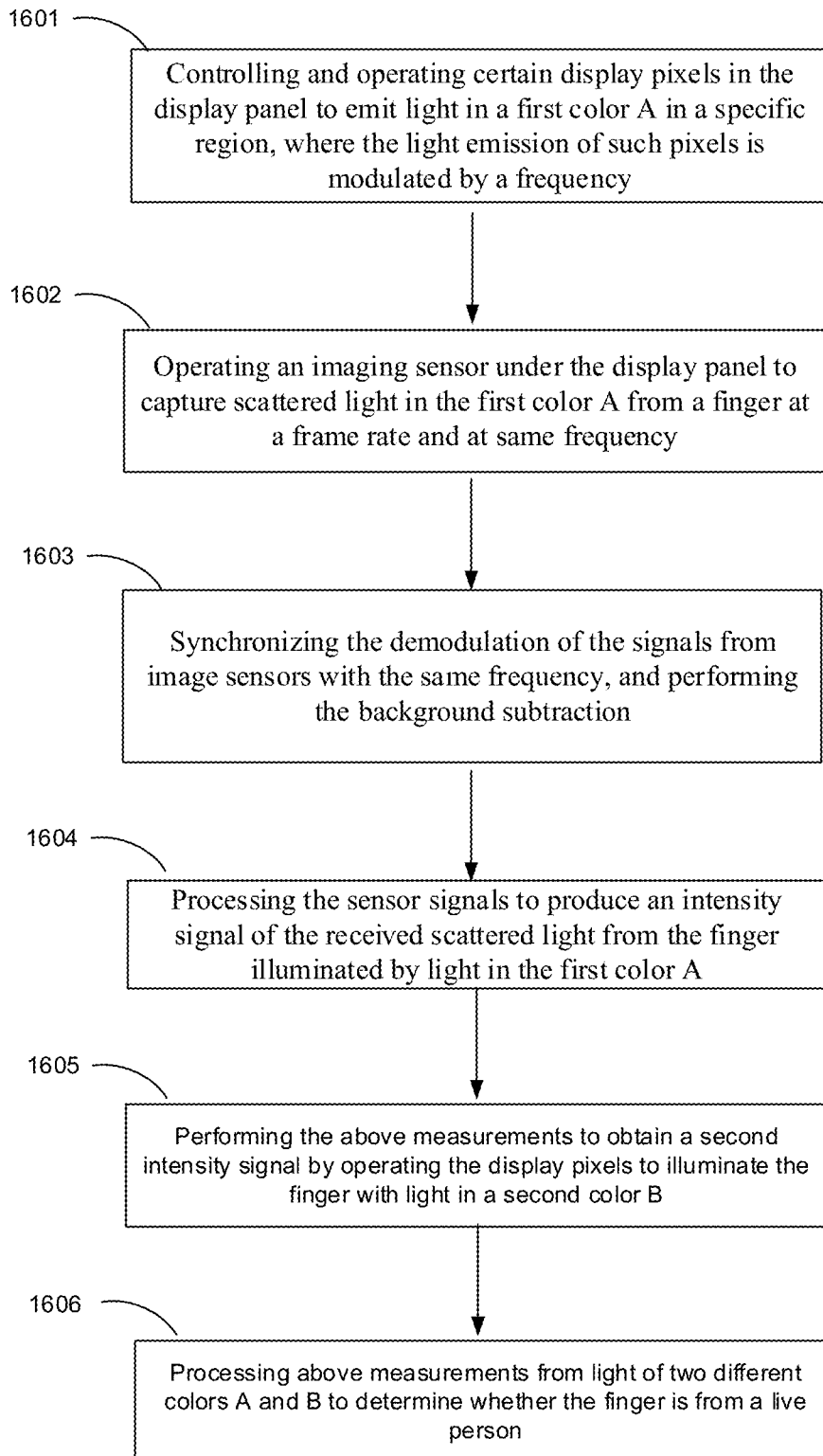

FIG. 16 shows an example of an operation process for determining whether an object in contact with the LCD display screen is part of a finger of a live person by operating the one or more illumination light sources for optical sensing to illuminate the finger with light in two different light colors.

For yet another example, the disclosed optical sensor technology can be used to detect whether the captured or detected pattern of a fingerprint or palm is from a live person's hand by a "live finger" detection mechanism by other mechanisms other than the above described different optical absorptions of blood at different optical wavelengths. For example, a live person's finger tends to be moving or stretching due to the person's natural movement or motion (either intended or unintended) or pulsing when the blood flows through the person's body in connection with the heartbeat. In one implementation, the optical sensor module can detect a change in the returned light from a finger or palm due to the heartbeat/blood flow change and thus to detect whether there is a live heartbeat in the object presented as a finger or palm. The user authentication can be based on the combination of the both the optical sensing of the fingerprint/palm pattern and the positive determination of the presence of a live person to enhance the access control. For yet another example, as a person touches the LCD display screen, a change in the touching force can be reflected in one or more ways, including fingerprint pattern deforming, a change in the contacting area between the finger and the screen surface, fingerprint ridge widening, or a change in the blood flow dynamics. Those and other changes can be measured by optical sensing based on the disclosed optical sensor technology and can be used to calculate the touch force. This touch force sensing can be used to add more functions to the optical sensor module beyond the fingerprint sensing.

In the above examples where the fingerprint pattern is captured on the optical sensor array via an imaging module as in FIG. 4B and FIG. 6B, optical distortions tend to degrade the image sensing fidelity. Such optical distortions can be corrected in various ways. For example, a known pattern can be used to generate an optical image at the optical sensor array and the image coordinates in the know pattern can be correlated to the generated optical image with distortions at the optical sensor array for calibrating the imaging sensing signals output by the optical sensor array for fingerprint sensing. The fingerprint sensing module calibrates the output coordinates referencing on the image of the standard pattern.

In light of the disclosure in this patent document, various implementations can be made for the optical sensor module as disclosed.

For example, a display panel can be constructed in which each pixel emitting lights, and can be controlled individually; the display panel includes an at least partially transparent substrate; and a cover substrate, which is substantially transparent. An optical sensor module is placed under the display panel to sense the images form on the top of the display panel surface. The optical sensor module can be used to sense the images form from light emitting from display panel pixels. The optical sensor module can include a transparent block with refractive index lower than the display panel substrate, and an imaging sensor block with an imaging sensor array and an optical imaging lens. In some implementations, the low refractive index block has refractive index in the range of 1.35 to 1.46 or 1 to 1.35.

For another example, a method can be provided for fingerprint sensing, where light emitting from a display panel is reflected off the cover substrate, a finger placed on top of the cover substrate interacts with the light to modulate the light reflection pattern by the fingerprint. An imaging sensing module under the display panel is used to sense the reflected light pattern image and reconstruct fingerprint image. In one implementation, the emitting light from the display panel is modulated in time domain, and the imaging sensor is synchronized with the modulation of the emitting pixels, where a demodulation process will reject most of the background light (light not from pixels being targeted).

Various design considerations for the disclosed under-screen optical sensor module for optical fingerprint sensing are further described in Attachment 3 entitled "MULTI-FUNCTION FINGERPRINT SENSOR AND PACKAGING" (41 pages in text and 26 sheets of drawings) as part of U.S. Provisional Patent Application No. 62/289,328, and U.S. Provisional Patent Application No. 62/330,833, and International Patent Application No. PCT/US2016/038445, filed on Jun. 20, 2016 (claiming priority from U.S. Provisional Patent Application No. 62/181,718, filed on Jun. 18, 2015, and published under No. WO 2016/205832 on Dec. 22, 2016), and International Patent Application No. PCT/CN2016/104354, filed on Nov. 2, 2016 (claiming priority from U.S. Provisional Patent Application No. 62/249,832, filed on Nov. 2, 2015, and published under No. WO 2017/076292 on May 11, 2017). The entire disclosures of the above-mentioned patent applications are incorporated by reference as part of the disclosure of this patent document.

In various implementations of the under-screen optical sensor module technology for fingerprint sensing disclosed herein, the optical imaging of the illuminated touched portion of a finger to the optical sensor array in an under-screen optical sensor module can be achieved without using an imagine module such as a lens by imaging the returned light from the touched portion of the finger under optical illumination. One technical challenge for optical fingerprint sensing without an imaging module is how to control the spreading of the returned light that may spatially scramble returned light from different locations on the touched portion of the finger at the optical sensor array so that the spatial information of different locations may be lost when such returned light reaches the optical sensor array. This challenge can be addressed by using optical collimators or an array of pinholes to replace the optical imaging module in the under-screen optical sensor module for detecting a fingerprint by optical sensing. A device for implementing such optical fingerprint sending can include a device screen that provides touch sensing operations and includes a display panel structure having light emitting display pixels, each pixel operable to emit light for forming a portion of a display image; a top transparent layer formed over the device screen as an interface for being touched by a user for the touch sensing operations and for transmitting the light from the display structure to display images to a user; and an optical sensor module located below the display panel structure to receive light that is emitted by at least a portion of the light emitting display pixels of the display structure and is returned from the top transparent layer to detect a fingerprint, the optical sensor module including an optical sensor array that receives the returned light and an array of optical collimators or pinholes located in a path of the returned light to the optical sensor array. The array of optical collimators is used to collect the returned light from the display panel structure and to separate light from different locations in the top transparent layer while directing the collected returned light to the optical sensor array.

The imaging by using collimators relies on using different collimators at different locations to spatially separate light from different regions of a fingerprint to different optical detectors in the optical detector array. The thickness or length of each collimator along the collimator can be designed to control the narrow field of optical view of each collimator, e.g., the light from only a small area on the illuminated finger is captured by each collimator and is projected onto a few adjacent optical detectors in the optical detector array. As an example, the thickness or length of each collimator along the collimator can be designed to be large, e.g., a few hundred microns, so that the field of optical view of each collimator may allow the collimator to deliver imaging light to a small area on the optical detector array, e.g., one optical detector or a few adjacent optical detectors in the optical detector array (e.g., an area of tens of microns on each side on the optical detector array in some cases).

Figure 17:
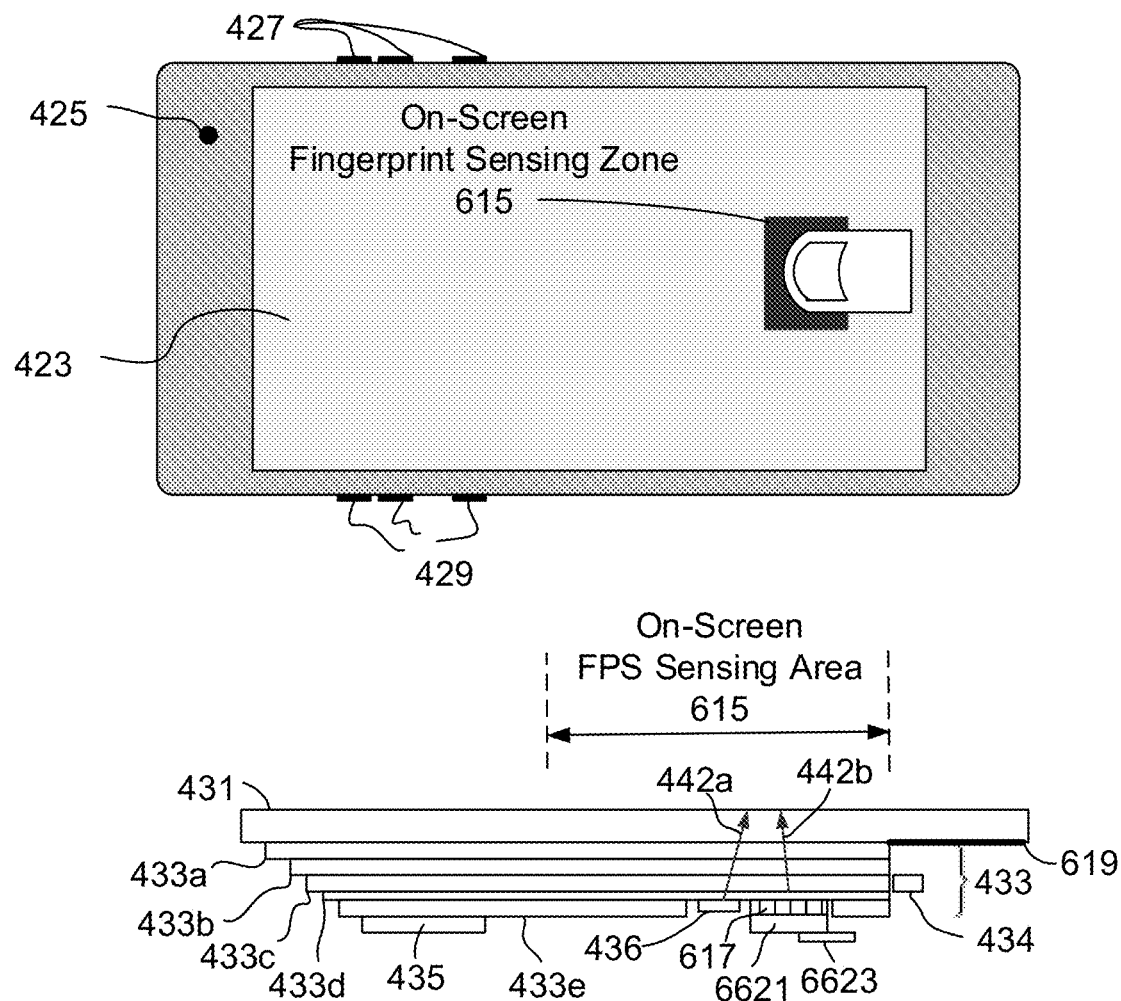
FIG. 17 illustrates an example of various designs for fingerprint sensing using an under-screen optical sensor module.

FIG. 17 shows an example of a smartphone having a liquid crystal display (LCD) display and an under-screen optical sensor module that includes an optical module for collecting and directing light to an optical detector array for optical fingerprint sensing. The LCD-based touch sensing display system 423 implements an optical sensing module with a photo detector array 6621 under the LCD display system 423. The optical module 617 placed between the LCD display screen and the optical sensor array in the under-screen optical sensor module can be configured in various designs to couple desired returned light from the display panel while filtering out background light in the optical detection by the optical sensor array. In some designs, the optical module 617 may include one or more imaging lenses as described in this document, a lens-pinhole assembly as described in this document, or an array of optical collimators or pinholes.

The touch sensing display system 423 is placed under a top cover glass 431 which serves as a user interface surface for various user interfacing operations, including, e.g., touch sensing operations by the user, displaying images to the user, and an optical sensing interface to receive a finger for optical fingerprint sensing and other optical sensing operations where probe light is directed from inside the device to the top cover glass 431 to illuminate the finger. The display system 423 includes a touch sensing structure (having, e.g., a touch-sensing electrode array for sensing touches) and a multi-layer LCD module 433 that is placed underneath the touch sensing structure in many implementations. The multi-layer LCD module 433 includes LCD display backlighting light sources 434 (e.g., LED lights) that provide the white backlighting for the LCD module 433, a light waveguide layer 433c coupled to the LCD display backlighting light sources 434 to receive and guide the backlighting light, LCD structure layers 433a (including, e.g., a layer of liquid crystal (LC) cells, LCD electrodes, transparent conductive ITO layer, an optical polarizer layer, a color filter layer, and a touch sensing layer), a backlighting diffuser 433b placed underneath the LCD structure layers 433a and above the light waveguide layer 433c to spatially spread the backlighting light for illuminating the LCD display pixels in the LCD structure layers 433a, and an optical reflector film layer 433d underneath the light waveguide layer 433c to recycle backlighting light towards the LCD structure layers 433a for improved light use efficiency and the display brightness. When the LCD cells in the sensing window are turned on, most of the LCD structure layers 433a (include liquid crystal cells, electrodes, transparent ITO, polarizer, color filter, touch sensing layer etc.) become partially transparent although the micro structure may extinct partial of the probe light energy. The light diffuser 433b, the light waveguide 433c, the reflector film 433d, and the LCD module frame are treated to hold the fingerprint sensor and provide transparent or partially transparent sensing light path so that a portion of the reflected light from the top surface of the cover glass 431 can reach a photo detector array 621 with an under-LCD-screen optical sensor module for fingerprint sensing and other optical sensing operations. As illustrated, this optical sensor module under the LCD screen includes various fingerprint sensor parts, e.g., an optical module 617 for collecting and directing reflected probe light to the photo detector array 621, and an optical sensor circuit module 6623 that receives and conditions the detector output signals from the photo detector array 6621. The photodiode array 6621 may be a CMOS sensor of CMOS sensing pixels, a CCD sensor array or a suitable optical sensor array that is sensitive to light.

The example illustrates includes an electronics module 435 for the LCD display and touch sensing operations, one or more other sensors 425 such as an optical sensor for monitoring the light level of the surroundings, optional side buttons 427 and 429 for controls of certain smartphone operations.

In the example in FIG. 17, the light sources can include the display back lighting light sources 434 and the extra designated probe light sources 436. The light beams 442*a* from extra designated probe light sources 436 and the light beams 442*b* from the display light sources 434 can be used as the sensor probe light for illuminating a finger in contact with the top glass cover 431 to generate the desired reflected probe light carrying the fingerprint pattern and other information to the optical sensor module.

When the LCD cells in the sensing window are turned on, most of the LCD structure layers 433*a* (include liquid crystal cells, electrodes, transparent ITO, polarizer, color filter, touch sensing layer etc.) become partially transparent although the micro structure may extinct partial of the probe light energy. The light diffuser 433*b*, the light waveguide 433*c*, the reflector film 433*d*, and the LCD module frame are treated to hold the fingerprint sensor and provide transparent or partially transparent sensing light path.

Based on the disclosed under LCD screen optical sensing designs, a person's finger, either in direct touch with the LCD display screen or in a near proximity about the LCD display screen, can produce the returned light back into the LCD display screen while carrying information of a portion of the finger illuminated by the light output by the LCD display screen. Such information may include, e.g., the spatial pattern and locations of the ridges and valleys of the illuminated portion of the finger. Accordingly, the optical sensor module can be integrated to capture at least a portion of such returned light to detect the spatial pattern and locations of the ridges and valleys of the illuminated portion of the finger by optical imaging and optical detection operations. The detected spatial pattern and locations of the ridges and valleys of the illuminated portion of the finger can then be processed to construct a fingerprint pattern and to perform fingerprint identification, e.g., comparing with a stored authorized user fingerprint pattern to determine whether the detected fingerprint is a match as part of a user authentication and device access process. This optical sensing based fingerprint detection by using the disclosed optical sensor technology uses the LCD display screens as an optical sensing platform and can be used to replace existing capacitive fingerprint sensors or other fingerprint sensors that are basically self-contained sensors as "add-on" components without using light from display screens or using the display screens for fingerprint sensing for mobile phones, tablets and other electronic devices.

Notably, an optical sensor module based on the disclosed optical sensor technology can be coupled to the backside of the LCD display screen without requiring a designated area on the display surface side of the LCD display screen that would occupy a valuable device surface real estate in some electronic devices such as a smartphone, a tablet or a wearable device. Such an optical sensor module can be placed under the LCD display screen that vertically overlaps with the display screen area, and, from the user's perspective, the optical sensor module is hidden behind the display screen area. In addition, because the optical sensing of such an optical sensor module is by detecting the light from the LCD display screen and is returned from the top surface of the display area, the disclosed optical sensor module does not require a special sensing port or sensing area that is separate from the display screen area. Accordingly, different from fingerprint sensors in other designs, including, e.g., Apple's iPhone/iPad devices or Samsung Galaxy smartphone models where the fingerprint sensor is located at a particular fingerprint sensor area or port (e.g., the home button) on the same surface of the display screen but located in a designated non-displaying zone that is outside the display screen area, the optical sensor module based on the disclosed optical sensor technology can be implemented in ways that would allow fingerprint sensing to be performed at any location on the LCD display screen by using unique optical sensing designs by routing the returned light from the finger into an optical sensor and by providing proper optical imaging mechanism to achieve high resolution optical imaging sensing. In this regard, the disclosed optical sensor technology provides a unique on-screen fingerprint sensing configuration by using the same top touch sensing surface that displays images and provides the touch sensing operations without a separate fingerprint sensing area or port outside the display screen area.

In addition to fingerprint detection by optical sensing, the optical sensing may be used to measure other parameters. For example, the disclosed optical sensor technology can measure a pattern of a palm of a person given the large touch area available over the entire LCD display screen (in contrast, some designated fingerprint sensors such as the fingerprint sensor in the home button of Apple's iPhone/iPad devices have a rather small and designated off-screen fingerprint sensing area that is highly limited in the sensing area size not suitable for sensing large patterns). For yet another example, the disclosed optical sensor technology can be used not only to use optical sensing to capture and detect a pattern of a finger or palm that is associated with a person, but also to use optical sensing or other sensing mechanisms to detect whether the captured or detected pattern of a fingerprint or palm is from a live person's hand by a "live finger" detection mechanism based on the fact that a live person's finger tends to be moving or stretching due to the person's natural movement or motion (either intended or unintended) or pulsing when the blood flows through the person's body in connection with the heartbeat. In one implementation, the optical sensor module can detect a change in the returned light from a finger or palm due to the heartbeat/blood flow change and thus to detect whether there is a live heartbeat in the object presented as a finger or palm. The user authentication can be based on the combination of the both the optical sensing of the fingerprint/palm pattern and the positive determination of the presence of a live person to enhance the access control. For yet another example, the optical sensor module may include a sensing function for measuring a glucose level or a degree of oxygen saturation based on optical sensing in the returned light from a finger or palm. As yet another example, as a person touches the LCD display screen, a change in the touching force can be reflected in one or more ways, including fingerprint pattern deforming, a change in the contacting area between the finger and the screen surface, fingerprint ridge widening, or a change in the blood flow dynamics. Such changes can be measured by optical sensing based on the disclosed optical sensor technology and can be used to calculate the touch force. This touch force sensing adds more functions to the optical sensor module beyond the fingerprint sensing.

With respect to useful operation or control features in connection with the touch sensing aspect of the LCD display screen, the disclosed optical sensor technology can provide triggering functions or additional functions based on one or more sensing results from the optical sensor module to perform certain operations in connection with the touch sensing control over the LCD display screen. For example, the optical property of a finger skin (e.g., the index of refraction) tends to be different from other artificial objects. Based on this, the optical sensor module may be designed to selectively receive and detect returned light that is caused by a finger in touch with the surface of the LCD display screen while returned light caused by other objects would not be detected by the optical sensor module. This object-selective optical detection can be used to provide useful user controls by touch sensing, such as waking up the smartphone or device only by a touch via a person's finger or palm while touches by other objects would not cause the device to wake up for energy efficient operations and to prolong the battery use. This operation can be implemented by a control based on the output of the optical sensor module to control the waking up circuitry operation of the LCD display screen which, for example, may include designed extra light sources for optical sensing and the designed extra light sources may turned on in a flash mode to intermittently emit flash light to the screen surface for sensing any touch by a person's finger or palm while the LCD display screen can be placed in a sleep mode to save power. In some implementations, the wake-up sensing light can be in the infrared invisible spectral range so a user will not experience any visual of a flash light.

An optical sensor module based on the disclosed optical sensor technology can be coupled to the backside of the LCD display screen without requiring creation of a designated area on the surface side of the LCD display screen that would occupy a valuable device surface real estate in some electronic devices such as a smartphone, a tablet or a wearable device. This aspect of the disclosed technology can be used to provide certain advantages or benefits in both device designs and product integration or manufacturing.

In some implementations, an optical sensor module based on the disclosed optical sensor technology can be configured as a non-invasive module that can be easily integrated to a LCD display screen without requiring changing the design of the LCD display screen for providing a desired optical sensing function such as fingerprint sensing. In this regard, an optical sensor module based on the disclosed optical sensor technology can be independent from the design of a particular LCD display screen design due to the nature of the optical sensor module: the optical sensing of such an optical sensor module is by detecting the light from the LCD display screen and is returned from the top surface of the display area, and the disclosed optical sensor module is coupled to the backside of the LCD display screen for receiving the returned light from the top surface of the display area and thus does not require a special sensing port or sensing area that is separate from the display screen area. Accordingly, such an optical sensor module can be used to combine with LCD display screens to provide optical fingerprint sensing and other sensor functions on a LCD display screen without using a specially designed LCD display screen with hardware especially designed for providing such optical sensing. This aspect of the disclosed optical sensor technology enables a wide range of LCD display screens to be used in smartphones, tablets or other electronic devices with enhanced functions from the optical sensing of the disclosed optical sensor technology.

For example, for an existing phone assembly design that does not provide a separate fingerprint sensor as in the Apple iPhones or Samsung models, such an existing phone assembly design can integrate the under-screen optical sensor module as disclosed herein without changing the touch sensing-display screen assembly to provide an added on-screen fingerprint sensing function. Because the disclosed optical sensing does not require a separate designated sensing area or port as in the case of the Apple iPhones/Samsung phones with a front fingerprint sensor outside the display screen area, or some smartphones with a designated rear fingerprint sensor on the backside like in some models by Huawei, Xiaomi, Google or Lenovo, the integration of the on-screen fingerprint sensing disclosed herein does not require a substantial change to the existing phone assembly design or the touch sensing display module that has both the touch sensing layers and the display layers. Simply put, no external sensing port and no extern hardware button are needed on the exterior of a device for adding the disclosed optical sensor module for fingerprint sensing. The added optical sensor module and the related circuitry are under the display screen inside the phone housing and the fingerprint sensing is conveniently performed on the same touch sensing surface for the touch screen.

For another example, due to the above described nature of the optical sensor module for fingerprint sensing, a smartphone that integrates such an optical sensor module can be updated with improved designs, functions and integration mechanism without affecting or burdening the design or manufacturing of the LCD display screens to provide desired flexibility to device manufacturing and improvements/upgrades in product cycles while maintain the availability of newer versions of optical sensing functions to smartphones, tablets or other electronic devices using LCD display screens. Specifically, the touch sensing layers or the LCD display layers may be updated in the next product release without adding any significant hardware change for the fingerprint sensing feature using the disclosed under-screen optical sensor module. Also, improved on-screen optical sensing for fingerprint sensing or other optical sensing functions by such an optical sensor module can be added to a new product release by using a new version of the under-screen optical sensor module without requiring significant changes to the phone assembly designs, including adding additional optical sensing functions.

The above and other features of the disclosed optical sensor technology can be implemented to provide a new generation of electronic devices with improved fingerprint sensing and other sensing functions, especially for smartphones, tablets and other electronic devices with LCD display screens to provide various touch sensing operations and functions and to enhance the user experience in such devices.

The optical sensor technology disclosed herein can be implemented in certain configurations that use the light for displaying images in a display screen that is returned from the top surface of the device display assembly for fingerprint sensing and other sensing operations where the returned light carries information of an object in touch with the top surface (e.g., a finger) and the capturing and detecting this returned light constitute part of the design considerations in implementing a particular optical sensor module located underneath the display screen. The top surface of the touch screen assembly is used as a fingerprint sensing area and the optical image of this touched area can be captured by an optical imaging sensor array inside the optical sensor module with a high image fidelity to the original fingerprint for robust fingerprint sensing. The optical sensor module can be designed to achieve this desired optical imaging by properly configuring optical elements for capturing and detecting the returned light.

In designing optical sensor modules under LCD display modules, various technical features or properties of LCD display modules should be considered and factored into the overall optical sensor module designs to improve the optical sensing operation. The following sections described several design examples.

One common component in various LCD display modules is a light diffuser which may a sheet that diffuses the incident light to different directions to achieve a large viewing angle and the spatial uniformity of the display. The presence of this LCD diffuser layer, however, can degrade the optical detection by the under-LCD optical sensor module.

Figure 18A:
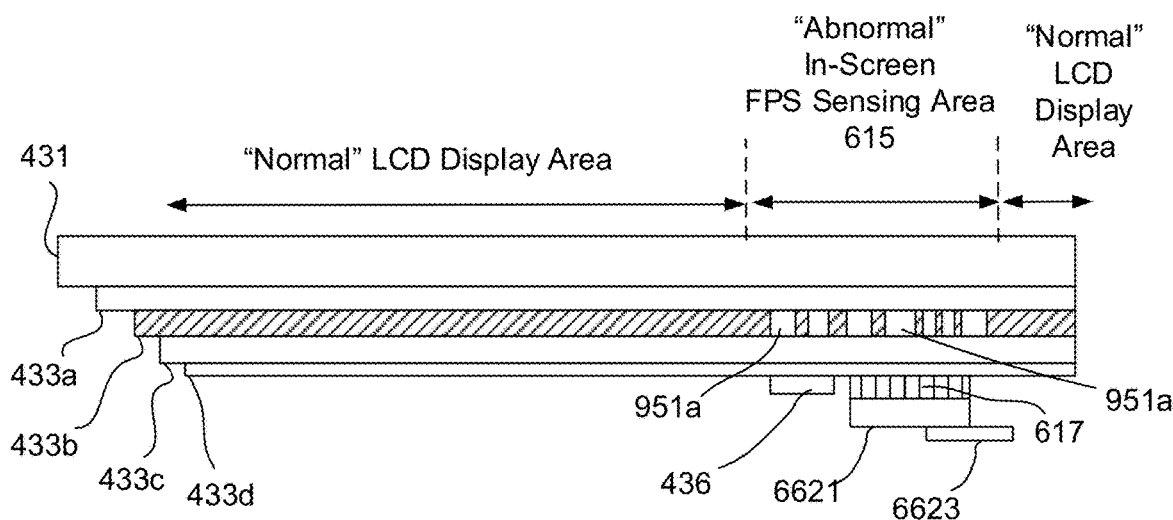
FIGS. 18A, 18B and 18C show examples of LCD diffuser designs for improved under-LCD optical sensing.
Figure 18B:
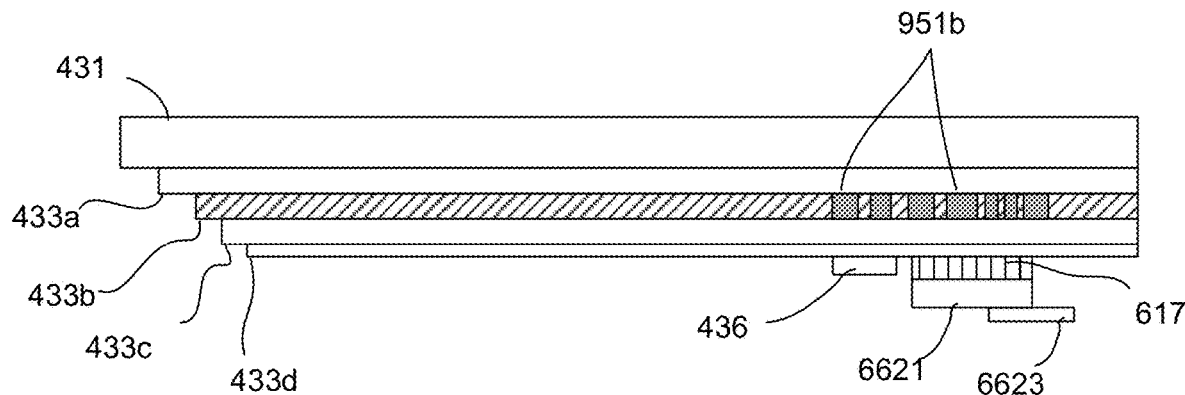

FIGS. 18A and 18B show a LCD light diffuser layer 433b located between the LCD waveguide layer 433c and other LCD layers 433a. In some LCD assemblies, the cover glass layer 431 may be separated by a distance from the underlying diffuser sheet 433b (e.g., several millimeters in some LCD devices), and the optical module 617 is separated from the diffuser sheet 433b by the light waveguide board 433c (which may be sub mini-meters thick). Under this structure, the strong diffusion in the diffuser sheet 433b can significantly reduce the signal contrast in the signal light that passes through the LCD display module 433 to reach the optical detector array 6621. The light diffusion at the LCD diffuser layer 433b, although desirable for display operations, degrades the fingerprint detection performance.

This undesired effect of the LCD diffuser layer 433b may be mitigated by using different techniques. Two examples are illustrated in FIGS. 18A and 18B.

FIG. 18A shows one example in which holes 951a can be made in the corresponding area or all over the diffuser sheet 433b in the LCD display module in the section of the diffuser sheet 433b above the optical sensor module to improve the transmission of the returned light from the top cover glass 431 to the optical detector array 6621. The hole sizes, shapes and distribution can be selected based on the specific design needs. For example, the hole size may be larger than the probe light wave lengths so as to avoid strong diffraction. The inclusion of the holes 951a in the LCD diffuser layer 433b in this design is to prove optical transmission paths to the optical sensor module.

FIG. 18B shows another example where the diffuser sheet can be structured to include low diffusion optical transparent spots 951b where the light diffusion is weak in the region above the optical sensor module to improve the transmission of the light to the optical sensor module at such low diffusion optical transparent spots 951b. The sizes, shapes and distribution of such lower diffusion transparent spots 951b can be selected based on the specific design needs. For example, the hole size may be larger than the probe light wave lengths so as to avoid strong diffraction, and the spot distribution be such that to allow efficient reception of the returned light from the top cover glass 431 through the LCD display layers. If the diffuser sheet is made of a rough surface material that diffracts or diffuses light, a selected material can be selectively applied to the rough surface to provide some transparent material to reduce the original optical diffusion of the rough surface. Examples for suitable materials include epoxy, wax, or oil and can effectively modify the diffusion.

For a given LCD diffuser layer, a long wavelength light source may be selected to generate the probe or illumination light so that the scattering for such light by the diffuser layer is weak so that more light can pass through the diffuser layer to reach the optical sensor module for optical sensing.

For another example, referring to FIGS. 18A and 18B, various LCD display modules include an optical reflector layer or film 433d in LCD below the LCD waveguide layer 433c to reflect the unused light back to the LCD layers for enhancing the display brightness. However, the presence of this optical reflector film 433d can block most of the light from reaching the optical sensor module under the LCD and thus can adversely affect the optical fingerprint sensing. This optical reflector layer can be modified in a way that maintains the desired optical reflection under the LCD waveguide layer in most locations while allowing for desired optical transmission at the location of the under-LCD optical sensor module. In some implementations, the optical module 617 for the optical sensor module under the LCD can be fixed to touch the reflector film 433d.

Figure 18C:

FIG. 18C shows another example for providing transparent light paths for guiding light from one or more illumination light sources 436 to improve the fingerprint sensing of the detection module without significant diffusion by the diffusion layer. For example, holes 969 may be selectively formed in the light diffuser film 433b to improve light transmission to the under-LCD optical fingerprint sensor. To reduce the impact to the display performance by the holes 969, the light path holes 969 may be tilted relative to the normal direction of the light diffuser film 433b to maintain sufficient level of light diffusion in the area of the holes 969 for producing desired display quality while providing some transmission of light for the under-LCD optical sensing. In addition, such holes 969 may be designed to be small, e.g., 0.3 mm or less, to further enhance diffusion of the backlighting light while still providing improved optical imaging at the under-LCD optical fingerprint sensor. In implementations, the light path holes may be empty with air, may be filled with a transparent material.

In some designs, the light path holes 969 may not be limited at a certain area but may be distributed all over the light diffuser film 433b, e.g., the holes 969 may be evenly distributed in the entire film 433b. This design eliminates the undesired spatial non-uniform illumination created by the selected holes 969 in certain area but not in other areas. In some designs, the light path holes 969 may be distributed in a spatial gradient pattern so that any change in the LCD illumination caused by the holes 969 would be gradual and less visible.

Figure 19A:
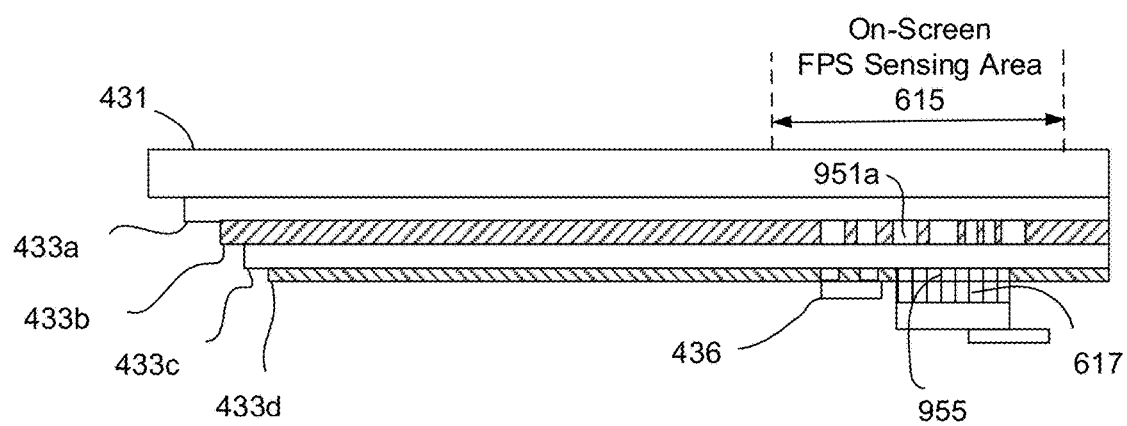
FIGS. 19A and 19B show examples of LCD reflector designs for improved under-LCD optical sensing.

FIG. 19A shows one example for modifying the optical reflector layer by including or forming light-transmitting holes 955 in the region of the optical sensor module location in the optical reflector film 433d to allow optical reflection for LCD display in most parts of the optical reflector film while providing the optical module 617 with transparent light paths for receiving light reflected from the finger on top of the LCD. The hole sizes, shapes and distribution of the holes 955 in the reflector film 433d can be configured to meet the needs of optical sensing. For example, the hole size may be larger than the probe light wave lengths so as to avoid strong diffraction. For example, the collimator unit aperture may be around 40 microns in diameter and the diffuser sheet hole size may be 5 microns, 10 microns, 30 microns, 40 microns, or 100 microns and so on. Each collimator unit aperture may have one or multiple holes 955 in the optical reflector layer 433*d* to provide desired light paths for optical sensing. The spatial non-uniformity in the detection caused by the presence of such light-transmitting holes 955 in the reflector layer 433*d* can be calibrated. If the collimator unit apertures are discrete with large pitch distance (for example 1 mm or so), the holes in the reflector film may be drilled with the same pitch distance.

Figure 19B:
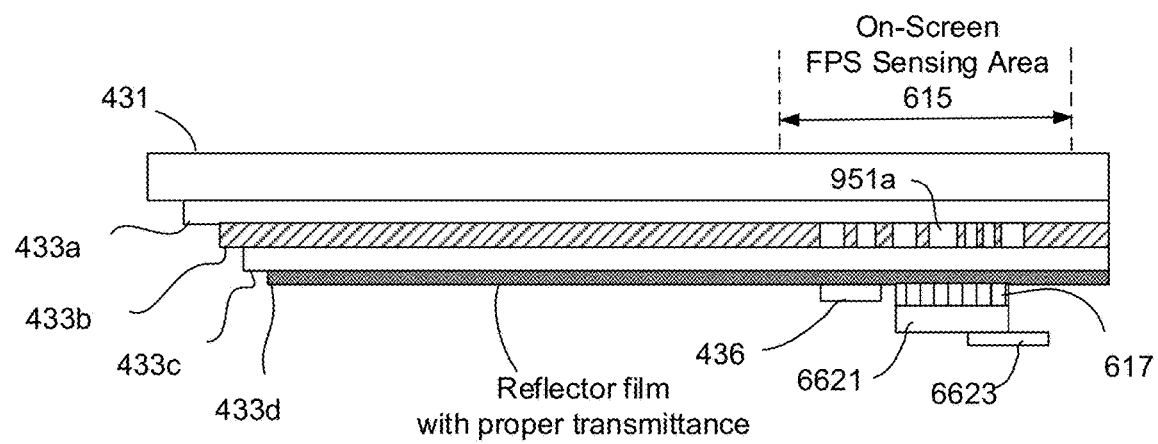

FIG. 19B shows another example for modifying the optical reflector layer in the LCD in which the optical reflectance of the optical reflector film in the on-screen optical sensing area 615 may be modified to allow for some degree of optical transmission for optical sensing by the underlying optical sensor. Various commercial LCD reflector films use flexible plastic materials as the substrate and the optical transmittance of such plastic materials may be sufficient for transmitting sufficient light to the optical sensor module for fingerprint sensing.

In the above designs for the LCD diffuser layer and LCD reflector layer, the holes may be formed in a region where the one or more illumination light sources are located to allow sufficient transmission of the illumination light to pass through the LCD display module layers to reach the top cover glass for illuminating a finger for the optical sensing operation.

Figure 20:
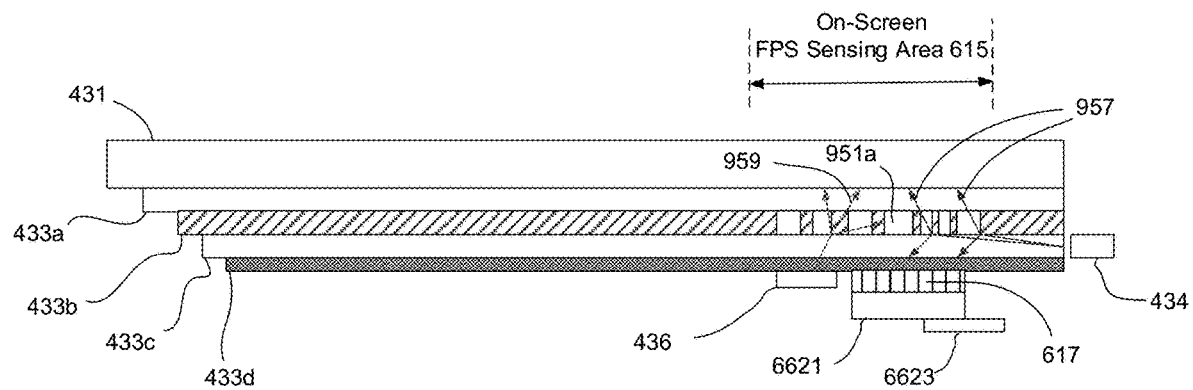
FIG. 20 shows an example of a LCD light source design for improved under-LCD optical sensing.

In the above designs, the optical sensor module is located underneath the LCD display module and thus is under the LCD waveguide layer which is designed to guide the backlighting light from the backlighting light source to the LCD display area. As shown in FIG. 20, the backlighting light from the display light sources 434 (e.g., LEDs) is guided by the waveguide 433*c* and is diffused by the LCD diffuser layer to leave the waveguide 433*c* to provide the needed backlighting for the LCD. The light may be uniformly leaked from one side surface of the waveguide 433*c* and is then diffused by the diffuser sheet 433*b* above the waveguide 433*c* as the diffused light 957 going up to illuminate the LCD pixels for displaying images. In some LCDs, about one half of the diffused light 957 may propagate directly towards the optical module 617 without reaching to the top sensing area 615 and thus becomes part of the undesired background light in the optical sensing detection.

One or more extra light sources 436 can be provided in connection with the optical sensor module: to illuminate the finger and to provide the light carrying the fingerprint pattern information to the optical sensor module underneath the LCD. Due to the location of the illumination light sources 436 (e.g., below the reflector film 433*d* next to or adjacent to the optical sensor), the light guide function of the waveguide 433*c* can be structured by design as an effective waveguide for the backlighting light but is not effective to the light from the illumination light sources 436 so that the light from the 436 can be more efficiently reach the top surface of the LCD panel for illuminating a finger.

In addition, the illumination light sources 436 can be designed to emit illumination at one or more optical wavelengths different from the LCD display illumination light wavelengths from the LCD display backlighting light sources 434. The illumination light sources 436 can be used for both fingerprint sensing and other sensing functions.

The above designs for selecting the illumination light at one or more optical wavelengths that are different from the optical wavelength of the backlighting light for the LCD display may be used to reduce power consumption. Using the display backlighting light sources for the fingerprint detection requires the display backlighting light sources to be turned on for performing optical fingerprint sensing. This design consumes more power when compared to the above design where the illumination light for optical sensing is different from the backlighting light in optical wavelength in part to allow for optical sensing operation without turning on the LCD backlighting light. The above design for selecting the illumination light at one or more optical wavelengths that are different from the optical wavelength of the backlighting light for the LCD display enables flexible selection of the illumination light sources to gain additional advantages. For example, infrared light can be used as the illumination sources 436 so that the LCD diffuser layer becomes more transparent to the IR illumination light for desired higher transmission of the IR illumination light. For another example, the illumination light sources can be selected to provide multiple wavelengths for other functions such as anti-spoof liveness sensing, heartbeat sensing etc.

In designing an optical sensor module under LCD, the locations and spatial distribution of the illumination light sources 436 can be used to adjust the observing angle so as to optimize the sensing quality.

In placing an optical sensor module under a LCD module, additional optical designs may be used to enhance the delivery of the backlighting light from the waveguide layer into the LCD layers while maintaining sufficient delivery of the illumination light for optical sensing to the optical sensor module.

FIGS. 21A-21D show examples of enhancement structures that include two or more layers of backlight enhancement films such as 433*px* and 433*py* as part of the LCD layer structure shown as 433*a*. The backlight enhancement films 433*px* and 433*py* are formed on top of the light diffuser layer 433*b*.

Figure 21A:
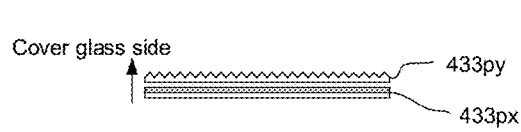
FIGS. 21A-21D show examples of enhancement features for improved under-LCD optical sensing.

In the example in FIG. 21A, each of the enhancement films 433*px* and 433*py* includes a polarized prism structure. The prism groove directions of the two enhancement films 433*px* and 433*py* are substantially perpendicular to each other to collectively form a pair of enhancement films to improve delivery of the illumination light to the LCD panel. However, this function of the enhancement films may adversely affect optical imaging of the under-LCD optical fingerprint sensor module 621U if not properly configured.

Figure 21B:
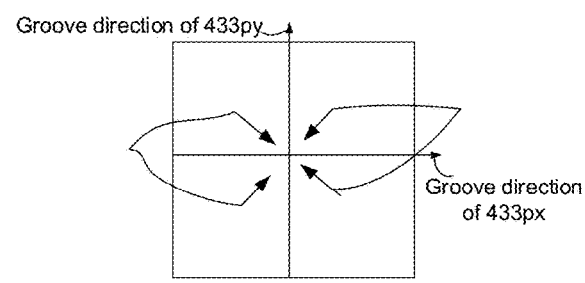
Figure 21C:
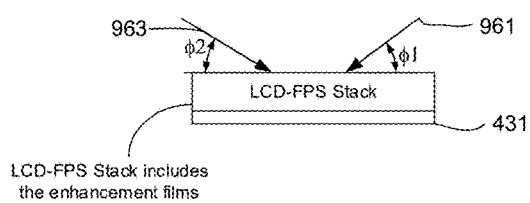

As shown in the examples in FIGS. 21B and 21C, the extra light source illumination direction and the detector viewing direction can be specifically configured not to be along the prism groove directions of the enhancement films 433*px* and 433*py* to reduce the adverse imaging impact of the enhancement films for optical fingerprint sensing. This design is to get a clear image without forming light-transmitting holes in the enhancement films. The viewing angle φ1 and the illumination angle φ2 should be adjusted according to the design of the enhancement films.

Figure 21D:
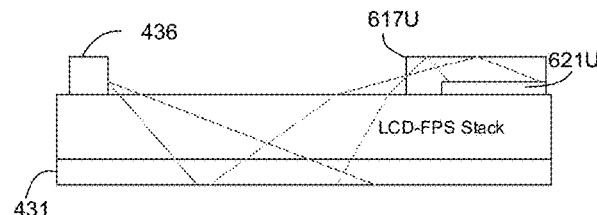

The example in FIG. 21D shows a particular design of the optical unit 617U and a photodetector array unit 621U. The optical unit 617U is used to provide an imaging function that is realized by a micro lens, pinholes or a combination of a micro lens and pinholes. A larger sensing area at the photodetector array unit 621U can be realized by optimizing the single detection unit design or by using multiple detection units.

Figure 22:
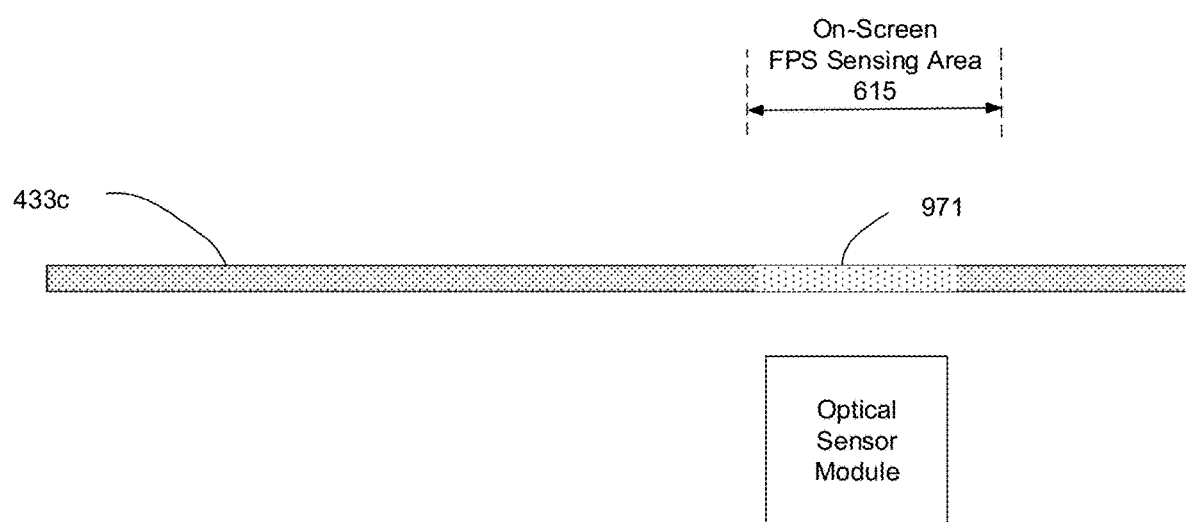
FIG. 22 shows an example of a LCD waveguide design for improved under-LCD optical sensing.

FIG. 22 shows an example of a light waveguide layer in the LCD module to include a partially transparent section in the detection light paths for an under-LCD optical sensing module to allow for improved optical transmission of the illumination light for optical sensing to pass through the waveguide layer.

Figure 23A:
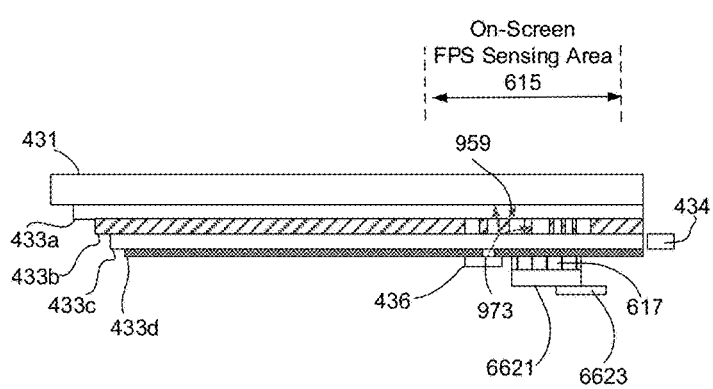
FIGS. 23A-23C show examples of LCD backlighting light source and illumination light source for improved under-LCD optical sensing.
Figure 23B:
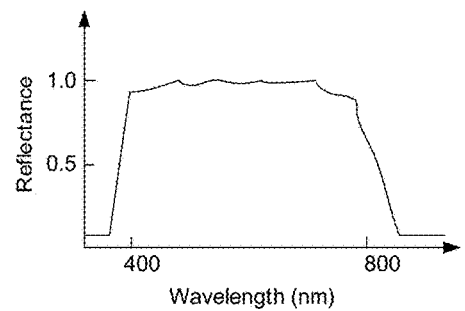
Figure 23C:
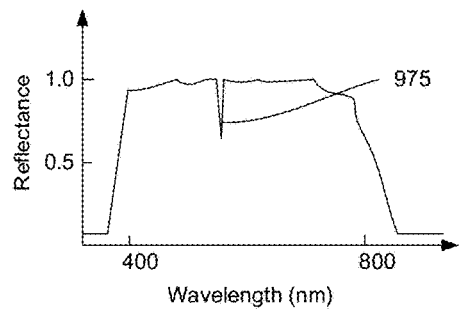

FIGS. 23A-23C show examples for designing an illumination light source for the optical sensing in an optical sensor module under the LCD display module. In a LCD display module, the optical reflector layer enhances the LCD display brightness by recycling unused backlighting light back to the LCD layers 433*a*. In this regard, a defect in the optical reflectivity along the optical reflector film 433*d*, e.g., a mechanical defect in the optical reflector film 433*d*, can cause a visible change in the brightness of the LCD display and thus is undesirable. FIGS. 39A-39C illustrate design features for reducing the adverse effect of defects in the reflector layer or film.

FIG. 23A shows an example in which micro holes 973 can be provided in the reflector layer 433*d* at the location of the illumination light sources 436 for the visible light component in the illumination light. This visible light component is used to provide illumination in a limited area of the display to show essential text or sign information without turning on the display back light.

FIG. 23B shows an example of another solution by selecting the illumination light source wavelengths to be out of the reflector film's working band which is generally in the visible band. The illumination light sources 436 for optical sensing may be outside the reflection spectral range of the reflector film, e.g., a short wavelength range below 400 nm (e.g., 380 nm) or a long wavelength range beyond the visible red range (e.g., 780 nm, 900 nm, 940 nm, etc.) so that the illumination light can pass through the reflector film or layer 433*d* without the need to form holes in the reflector film.

FIG. 23C shows yet another example where the reflector film 433*d* is a spatially uniform structure and is structured to include a narrow band transmission window 975 for transmitting the illumination light for optical detection. For example, this narrow transparent or transmission window 975 in the reflector film 433*d* may be between 525 nm and 535 nm.

Portable devices such as mobile phones or other devices or systems based on the optical sensing disclosed in this document can be configured to provide additional operation features.

For example, the LCD display panel can be controlled to provide a local flash mode to illuminate the fingerprint sensing area by operating selected LCD display pixels underneath the sensing area. This can be provided in an optical sensor module under the LCD display panel, e.g., FIGS. 4A and 4B based on an optical imaging design or FIG. 25 based on optical imaging via an assembly of a lens and a pinhole. In the event of acquiring a fingerprint image, the LCD display pixels in the sensing window area and the illumination light sources can be turned on momentarily to produce high intensity illumination for optical sensing of a fingerprint, and, at the same time, the photo detection sensor array is turned on to capture the fingerprint image in sync with the turning on of the illumination light. The time to turn on the illumination light can be relatively short but the emission intensity can be set to be high. For this reason, this mode for optical fingerprint sensing is a flash mode that enable the photo detector sensor array to detect a larger amount of light to improve the image sensing performance.

The optical sensors for sensing optical fingerprints disclosed above can be used to capture high quality images of fingerprints to enable discrimination of small changes in captured fingerprints that are captured at different times. Notably, when a person presses a finger on the device, the contact with the top touch surface over the display screen may subject to changes due to changes in the pressing force. When the finger touches the sensing zone on the cover glass, changes in the touching force may cause several detectable changes at the optical sensor array: (1) fingerprint deforming, (2) a change in the contacting area, (3) fingerprint ridge widening, and (4) a change in the blood flow dynamics at the pressed area. Those changes can be optically captured and can be used to calculate the corresponding changes in the touch force. The touch force sensing adds more functions to the fingerprint sensing.

Figure 24:
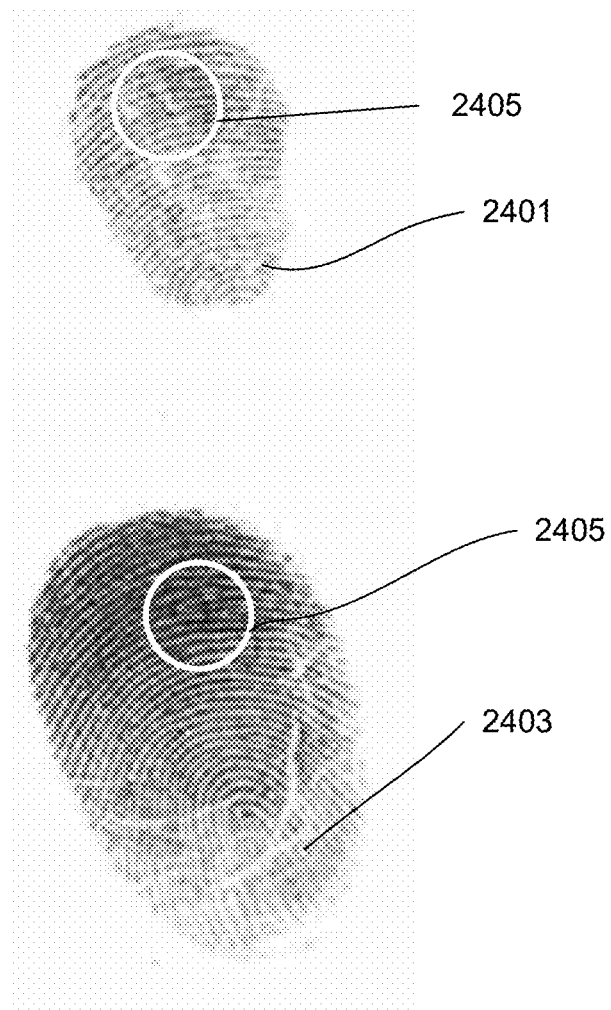
FIG. 24 shows two different fingerprint patterns of the same finger under different press forces: the lightly pressed fingerprint and the heavily pressed fingerprint.

Referring to FIG. 24, the contact profile area of a finger is shown to increase with an increase in the press force, meanwhile the ridge-print expands with the increase in the press force. Conversely, the contact profile area decreases with a decrease in the press force, meanwhile the ridge-print contracts or shrinks with the decrease in the press force. FIG. 24 shows two different fingerprint patterns of the same finger under different press forces: the lightly pressed fingerprint 2401 and the heavily pressed fingerprint 2403. The returned probe light from a selected integration zone 2405 of the fingerprint on the touch surface can be captured by a portion of the optical sensors on the optical sensor array that correspond to the selected integration zone 2405 on the touch surface. The detected signals from those optical sensors are analyzed to extract useful information as further explained below.

When a finger touches the sensor surface, the finger tissues absorb part of the light so that the total amount of the receiving power integrated over the photo diode array in the under-LCD optical sensor module is reduced. Especially in the case of a total internal reflection mode that does not sense the low refractive index materials (water, sweat etc.), the sensor can be used to detect whether a finger touches the sensor or something else touches the sensor accidentally by analyzing the dynamics of the change in the receiving power change, i.e., the temporal change or the trend in the detected optical power at the optical detector array. Based on this sensing process, the sensor can decide whether a touch is a real fingerprint touch and thus can detect whether to wake up the mobile device. Because the detection is based on integration power detection, the light source for optical fingerprint sensing can be operated at a lower power level that is sufficient for the integrated sensing operation or in a power saving mode.

In the detailed fingerprint map, when the press force increases in pressing a finger on the top sensing surface 615, the fingerprint ridges expand, and more light is absorbed at the touch interface by the expanded fingerprint ridges. Therefore, within a relatively small observing zone 2405, the integrated received light power change reflects the changes in the press force. Based on this, the press force can be detected or measured.

Accordingly, by analyzing the integrated received probe light power change within a small zone, it is possible to monitor time-domain evolution of the fingerprint ridge pattern deformation. This information on the time-domain evolution of the fingerprint ridge pattern deformation can then be used to determine the time-domain evolution of the press force on the finger. In applications, the time-domain evolution of the press force by the finger of a person can be used to determine the dynamics of the user's interaction by the touch of the finger, including determining whether a person is pressing down on the touch surface or removing a pressed finger away from the touch surface. Those user interaction dynamics can be used to trigger certain operations of the mobile device or operations of certain apps on the mobile device. For example, the time-domain evolution of the press force by the finger of a person can be used to determine whether a touch by a person is an intended touch to operate the mobile device or an unintended touch by accident and, based on such determination, the mobile device control system can determine whether or not to wake up the mobile device in a sleep mode.

In addition, under different press forces, a finger of a living person in contact with the touch surface can exhibit different characteristics in the optical extinction ratio obtained at two different probe light wavelengths as explained with respect FIGS. 14 and 15. Referring back to FIG. 24, the lightly pressed fingerprint 2401 may not significantly restrict the flow of the blood into the pressed portion of the finger and thus produces an optical extinction ratio obtained at two different probe light wavelengths that indicates a living person tissue. When the person presses the finger hard to produce the heavily pressed fingerprint 2403, the blood flow to the pressed finger portion may be severely reduced and, accordingly, the corresponding optical extinction ratio obtained at two different probe light wavelengths would be different from that of the lightly pressed fingerprint 2401. Therefore, the optical extinction ratios obtained at two different probe light wavelengths vary under different press forces and different blood flow conditions. Such variation is different from the optical extinction ratios obtained at two different probe light wavelengths from pressing with different forces of a fake fingerprint pattern of a man-made material.

Therefore, the optical extinction ratios obtained at two different probe light wavelengths can also be used to determine whether a touch is by a user's finger or something else. This determination can also be used to determine whether to wake up the mobile device in a sleep mode.

For yet another example, the disclosed optical sensor technology can be used to monitor the natural motions that a live person's finger tends to behave due to the person's natural movement or motion (either intended or unintended) or pulsing when the blood flows through the person's body in connection with the heartbeat. The wake-up operation or user authentication can be based on the combination of the both the optical sensing of the fingerprint pattern and the positive determination of the presence of a live person to enhance the access control. For yet another example, the optical sensor module may include a sensing function for measuring a glucose level or a degree of oxygen saturation based on optical sensing in the returned light from a finger or palm. As yet another example, as a person touches the display screen, a change in the touching force can be reflected in one or more ways, including fingerprint pattern deforming, a change in the contacting area between the finger and the screen surface, fingerprint ridge widening, or a change in the blood flow dynamics. Those and other changes can be measured by optical sensing based on the disclosed optical sensor technology and can be used to calculate the touch force. This touch force sensing can be used to add more functions to the optical sensor module beyond the fingerprint sensing.

IV. Lens-Pinhole Imaging Designs for Under-Display Optical Sensing

In various implementations of the under-screen optical sensor module technology for fingerprint sensing disclosed herein, an imagine module having at least one imaging lens can be used to achieve the optical imaging of the illuminated touched portion of a finger onto the optical sensor array in the under-screen optical sensor module. The lensing effect of the imaging module is in part for controlling the spatial spreading of the returned light that may spatially scramble returned light from different locations on the touched portion of the finger at the optical sensor array so that the spatial information on the returned light corresponding to the fingerprint pattern on a finger can be preserved by the imaging lens with a desired spatial imaging resolution when the imaging lens directs the returned light to reach the optical sensor array. The spatial imaging resolution of an imaging module having a single imaging lens or an assembly of two or more imaging lenses is proportional to the numerical aperture of the imaging module. Accordingly, a high-resolution imaging lens requires a large numerical aperture and thus a lens with a large diameter. This aspect of a lens-based imaging module inevitably requires a bulking lens system to produce a high-resolution imaging system. In addition, a given imaging lens has a limited field of view which increases as the focal length decreases and decreases as the focal length increases.

In many fingerprint sensing applications such as optical fingerprint sensors implemented under a display screen in a mobile device, it is desirable to have a compact imaging system with a high spatial imaging resolution and a large field of view. In view of the trade-offs in various imaging features of a lens-based imaging system discussed above, a compact optical imaging system for optical fingerprint sensing is provided below by combining a lens and a pinhole as a lens-pinhole imaging system where the lens is used to form a lens-based imaging system to achieve a high spatial imaging resolution via the lens and a reduced size in the captured image at the optical detector array to reduce the size the optical detector array via the same lens and the pinhole is placed in front of the lens to produce a large field of view in optical imaging by effectuating a pinhole camera without requiring a lens of a large diameter. A conventional pinhole camera can include a small aperture for optical imaging and can produce a large field of view while suffering a limited image brightness due to the small aperture and a low spatial imaging resolution. A combination of an imaging lens and a pinhole camera, when properly designed, can benefit from the high spatial imaging resolution of the imaging lens and the large field of view of the pinhole camera.

Figure 25:
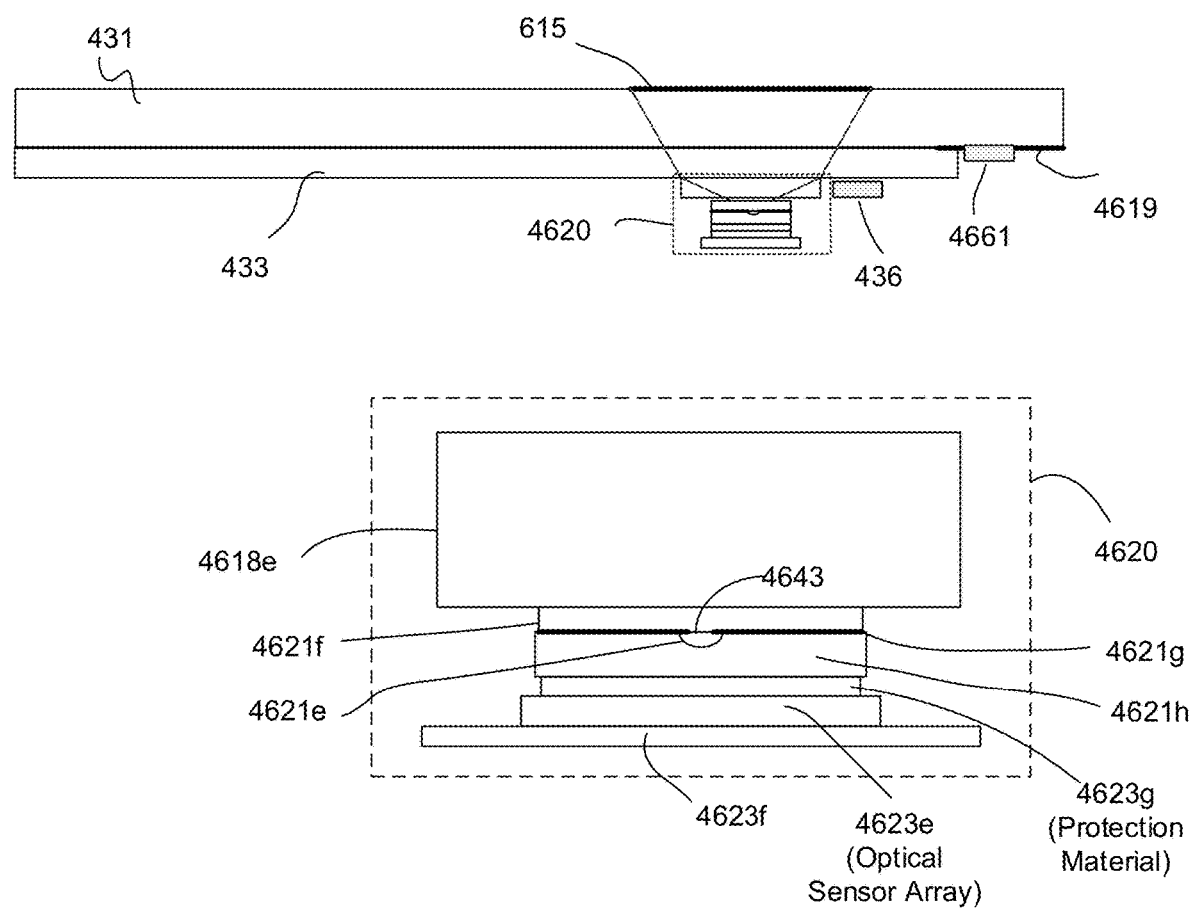
FIGS. 25-31 show examples and operations of an under-screen optical sensor module based on a pinhole-lens assembly.

FIG. 25 shows one example of an optical sensor module 4620 placed under an LCD display screen where a pinhole and a lens are used to form the optical imaging system for the optical sensor module 4620. One or more illumination light sources 436 are provided at a location under the LCD display module 433 to produce illumination light to pass through the LCD display module 433 and the top transparent layer 431 which includes a sensing zone 615 on the top surface of the transparent layer 431. One or more illumination light sources 4661 are provided under the top transparent layer 431 provided to produce illumination light to sensing zone 615 on the top surface of the transparent layer 431. The one or more illumination light sources 436 may be located in or next to the optical sensor module 4620 to provide, in addition to providing illumination for fingerprint sensing, a breathing light indicator to indicate that the optical fingerprint sensing is in progress or the optical sensor module 4620 is turned on or activated.

In the illustrated example in FIG. 25, the optical sensing module 4620 is a compact module by using a micro lens 4621e with a small diameter that can be about the same size of the pinhole so slightly larger than the pinhole. The micro lens 4621e is engaged to a pinhole structure 4621g that is optically opaque and may be a layer of a blackened or metal material formed on a surface of a pinhole substrate 4621f of an optically transparent material with an opening as the pinhole 4643. The micro lens 4621e is placed on the lower side of the pinhole substrate 4621f. In operation, the optical layers above the pinhole 4643 in the pinhole structure 4621g are structured to produce a large optical field of view in collecting the returned light from the LCD display panel and to transmit the collected light towards the optical sensor array 4623e. The optical detectors in the optical sensor array 4623e respond to the received optical pattern to produce detector signals and a detector circuitry module 4623f is coupled to the optical sensor array 4623e to receive and process the detectors signals. The detector circuitry module 4623f may include, in some implementations, a flexible printed circuit (FPC). The micro lens 4621e receives the transmitted light from the pinhole and to focus the received light onto the optical sensor array 4623e for optical imaging at an enhanced spatial imaging resolution at the optical sensor array 4623e when compared to a lower spatial imaging resolution of the pinhole in projecting light onto the optical sensor array 4623e without the micro lens 4621e. In this design, the low resolution of the pinhole is compensated by using the micro lens 4621e and the limited field of view of the micro lens 4621e is compensated by the large field of view of the assembly of the low-index layer 4618e, a high-index layer 4621f and the pinhole 4643.

In the illustrated example of using the pinhole-lens assembly for optical imaging in FIG. 25, the object plane of the pinhole-lens assembly is near the top effective sensing zone 615 on the top surface of the transparent layer 4431 used as a cover glass for the touch sensing LCD display panel and the imaging plane of the pinhole-lens assembly is the receiving surface of the optical detectors of the optical sensor array 4623e. In addition to the pinhole substrate 4621f, an optically transparent spacer 4618e with a refractive index lower than that of the pinhole substrate 4621f is provided between the pinhole substrate 621f and the LCD display panel. This use of a lower index material above the pinhole substrate 4621f is part of the optical design to achieve a large field of view for receiving light from the LCD display panel. In some implementations, the lower-index spacer 4618e may be an air gap. This design provides an optical interface of two different optical materials between lower-index spacer 4618e and the higher-index pinhole substrate 4621f and the optical refraction at this interface converts a large field of view (FOV) (e.g., around 140 degree in some cases) of incident light from the LCD display panel in the lower-index spacer 4618e into a smaller FOV in the higher-index pinhole substrate 4621f. Accordingly, the output light rays produced by the pinhole-lens assembly have a relatively small FOV.

This design of reducing the FOV can be advantageous in several aspects. First, the optical input FOV in the lower-index spacer 4618e of the optical sensor module 4620 allows the input to have a large FOV. Second, the actual FOV handled at by the pinhole-lens assembly located below the higher-index pinhole substrate 4621f is a reduced FOV with respect to the optical input FOV so that light rays with large incident angles are limited by this reduced FOV. This is beneficial because image distortions caused by light rays at large incident angles at the pinhole-lens assembly are reduced by this reduced FOV. In addition, this reduced FOV at the pinhole-lens assembly reduces the undesired pinhole shading effect that would distort the brightness distribution of the image at the optical sensor array.

Different from a convention pinhole camera with uses a pinhole with a diameter around 40 microns in some pinhole camera designs, the pinhole 4643 formed in the opaque layer 4621g is designed to have a diameter much larger than the typical size of a pinhole in a pinhole camera, e.g., greater than 100 microns, or 200 microns (e.g., 250 microns) in some designs. In this combination of the lens and the pinhole, the use of the high-index material for the pinhole substrate 4612f just above the pinhole 4643 and the use of the lower-index layer 4618e above the pinhole substrate 4612f allows the pinhole 4643 to have a diameter much larger than the typical size of a pinhole in a pinhole camera while still achieving a large FOV. For example, in some implementations, the diameter of the pinhole 4643 may be about the same as or similar to the radius of curvature of the curve surface of the lens 4621e when structured as a half ball lens with a flat surface facing the pinhole 4643 and a partial spherical surface that directs the light from the pinhole 4643 towards the photodetector array 4621e.

Additional design features can also be implemented to improve the overall optical performance and the compactness of the optical imaging system based on the pinhole-lens assembly. For example, as illustrated in FIG. 25, additional optical layers can be placed between the lens-pinhole assembly and the photodiode array 4623e. In this example, an optically transparent spacer 4621h and a protection material 4623g are provided in the light path from the pinhole-lens assembly to the optical sensor array 4623e. In some implementations, the spacer 4621h may be a low-index layer such as an air gap, and the protection material 4623g may be a layer covering the top of the optical detectors of the optical sensor array 4623e and having a refractive index higher than that of the spacer 4621h. The layers 4621h and 4623g can be structured to reduce or eliminate the imaging distortion at the optical sensor array 4623e. When light is refracted at media interfaces, the nonlinearity in the directions of refracted rays exists and creates image distortions at the optical sensor array 4623e. Such distortions become more pronounced when the incident angles are large. To reduce such distortions, the optical thickness ratio of spacer 4621h and 4623g can be selected in light of the optical structure of the pinhole-lens assembly and the optical objective field of the pinhole-lens assembly (e.g., the optical layers from the top sensing surface of the top glass layer 4431 to the pinhole substrate 4621f).

Optical distortions occur at each interface of different optical materials along the optical path of light from the top of the LCD display panel to the optical sensor array 4623e. One design technique for reducing such optical distortions is to provide optically matching structures on lower side of the pinhole-lens assembly (i.e., the optical layers on the imaging side of the pinhole-lens assembly) to corresponding to optical structures on the upper side of the pinhole-lens assembly (i.e., the optical layers on the object side of the pinhole-lens assembly) so that an optical distortion incurred at one interface along the optical path from the LCD panel to the pinhole-lens assembly in the object side of the pinhole-lens assembly is countered or offset by optical refraction at a matching interface along the optical path from the pinhole-lens assembly to the optical sensor array 4623e in the imaging side of the pinhole-lens assembly. The optical matching layers in the imaging side of the pinhole-lens assembly are designed by taking into account of the optical power of the lens in the pinhole-lens assembly. In a pinhole imaging system with the pinhole 4643 alone without the lens 4621e, optical distortions are present when the media are not matched between the object and the image fields. Such optical distortions may be in form of a barrel distortion when the FOV is large by using a grid pattern placed over the top sensing surface to test the distortions. The barrel distortions caused by the un-matched optical layers between the object and the image fields of the pinhole 4643 is undesirable because they directly impact the accuracy of the fingerprint pattern captured by the optical sensor array 4623e. It is noted that the level of such distortions is usually higher in the central part of the imaging field at the optical sensor array 4623*e* than the peripheral part.

To mitigate such distortions, material layers below the pinhole 4643 and the lens 4621*e* in the imaging field can be structured in terms of their refractive indices and thickness values to reverse the distortions introduced by the material layers in the object side. This is achieved by matching the refraction behavior at large incident angles so as to correct the image to be linearly formed on the detector surface. For example, in a pinhole imaging system with an imaging magnification at ⅕, if there are a glass layer of 2 mm thick and an air gap layer of 1 mm thick above the pinhole 4643, a glass layer of 0.4 mm thick and an air gap of 0.25 mm thick can be provided below the pinhole 4643 and above the optical sensor array 4623*e* to reduce the optical distortions at the optical sensor array 4623*e*. This technique can be applied to provide matching layers below the pinhole 4643 for complex material layers above the pinhole 4643.

Figure 26:
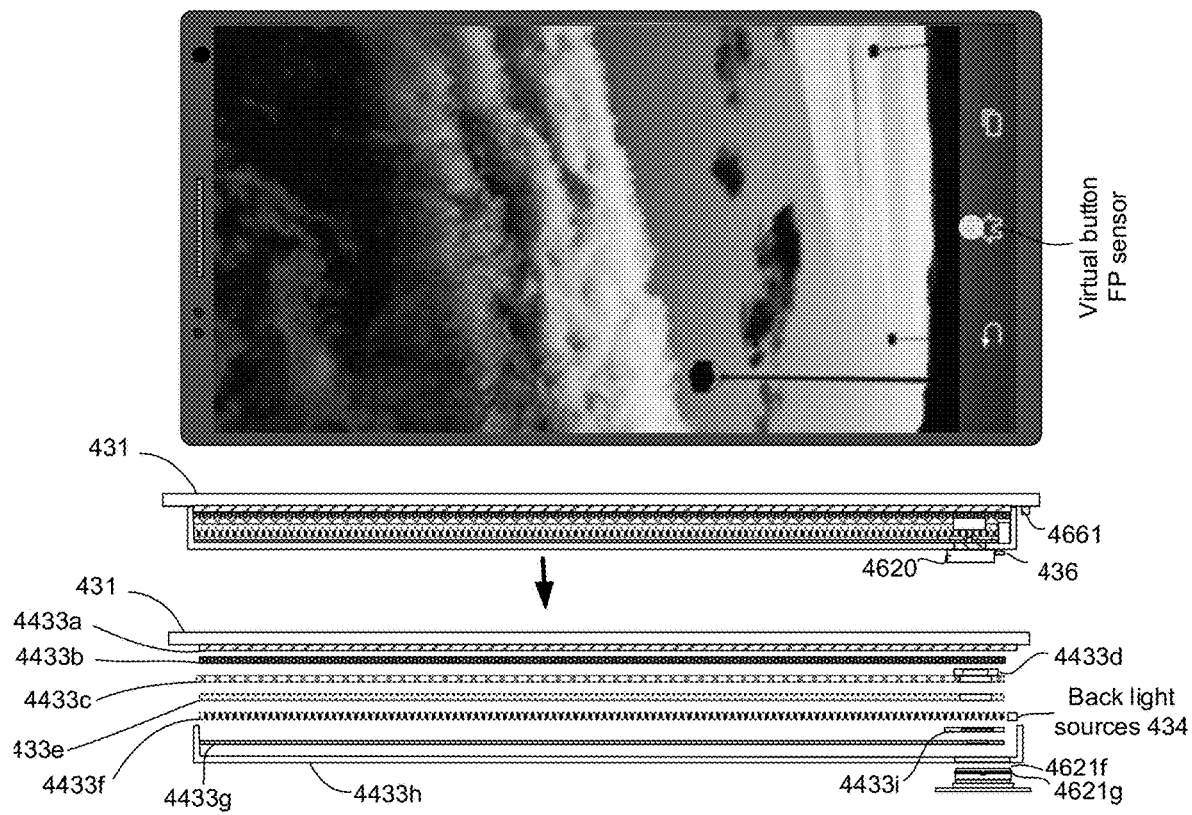

FIG. 26 shows an example of different layers in the LCD display module above the optical sensor module. In this embodiment, the sensor module 4620 is integrated under the LCD display module. Illumination light sources 4661 and extra light sources 4664 are also integrated in or close to the sensor module 4620. The virtual button for the optical fingerprint (FP) sensing shown within the LCD display screen near the edge is virtual because it is on an area of the contiguous top surface across the entire display (there is no separate physical button for fingerprint sensing) and is a displayed area that is indicated as the effective sensing zone 615 (FIG. 25) for fingerprint sensing.

In the example in FIG. 26, the materials in the LCD backlighting components of the LCD display module are designed to provide optical transmission paths to allow returned probe light from the top sensing zone to reach the underlying optical sensor module below the LCD display module. Light transmitting holes or slits can be formed in such materials. To modify the appearance of the display at the optical sensor position to make the optical sensor less visible, a diffuser film 4433*d* may be integrated with the prisms 4433*c* above the backlighting waveguide layer 4433*f* to diffuse the light towards the LCD pixels for uniform illumination, and additional diffuser 4433*i* may be integrated with the mirror film 4433*g* that is below the backlighting waveguide layer 4433*f* and reflects or recycles backlighting light back to the LCD layers to improve the illumination efficiency. In some implementations, the additional diffuser films 4433*d* and 4433*i* may be shaped as stripes around edges around the optical sensor module to diffuse the light scattered in the light paths so that the light path edges around the optical sensor module under the LCD display module are hidden and or less visible.

Figure 27:
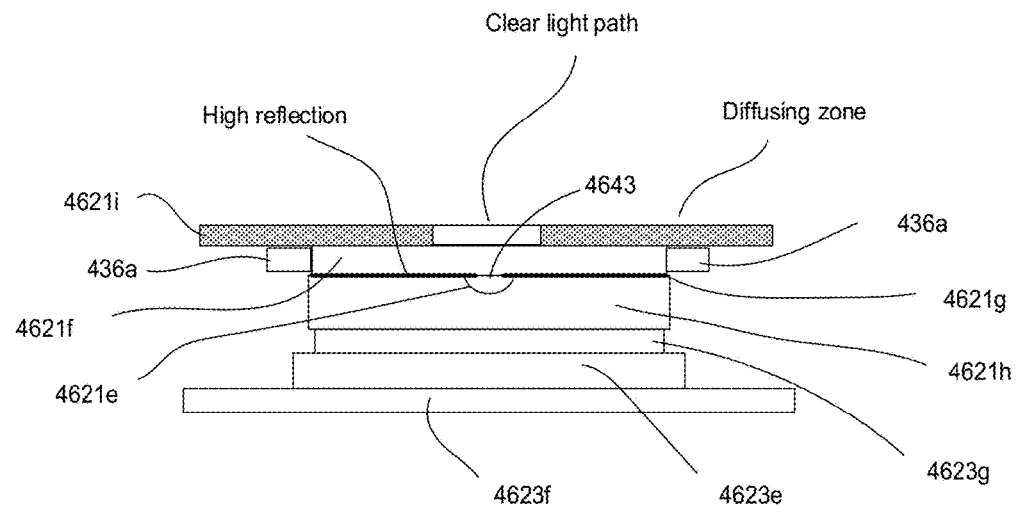

FIG. 27 shows an example implementation of the design in FIG. 25 where the pinhole layer coating 4621*g* on the bottom surface of the pinhole substrate 4621*f* is structured to have a high optical reflection at its upper side facing the pinhole substrate 4621*f*. This feature is used to compensate the regional reflection of the mirror film hole or the optical reflector layer or diffusion layer in the LCD layers above the optical sensor module 4620.

In some implementations, an additional diffuser layer 4621*i* may be applied on top of the pinhole substrate 4621*f* as shown in FIG. 27 to cause optical diffusion and the central part of the additional diffuser layer 4621*i* can include a clear light path to receive the returned light from the LCD display module for optical sensing.

Furthermore, FIG. 27 shows an example location of one or more extra light sources 436*a* installed under the additional diffuser layer 4621*i*. The light emitted from the extra light sources 436*a* is scattered by the diffuser 4621*i*. The extra light sources 436*a* may emit light of different optical wavelengths, e.g., including wavelengths for finger illumination and other wavelengths for other functions, such as breathing light function etc.

Figure 28:
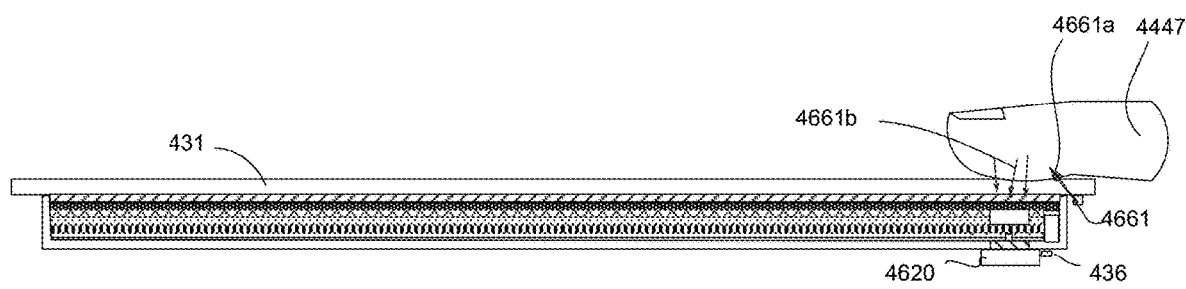

FIG. 28 shows an example where one or more under cover glass light sources 4661 are provided to illuminate the touching finger 4447 for optical sensing. The light produced by one or more under cover glass light sources 4661 is represented by light 4661*a* and can transmit into the finger tissues or propagate through the corneum of the finger skin. For example, when light 4661*a* transmits through the finger skin and penetrates into the finger tissues, the light is scattered by the finger tissues. A part of the scattered light comes out as the signal light 4661*b* carrying the fingerprint information including information on topological inner tissue structures associated with the external fingerprint pattern and is detected by the optical sensor module 4620. The signal light 4661*b* is incident to the sensing zone on the top glass at a large angle can capture and carry the fingerprint information when the skin is wet or dry. Hence, using the one or more under cover glass light sources 4661 can improve the sensor's detection performance and reliability.

Figure 29:
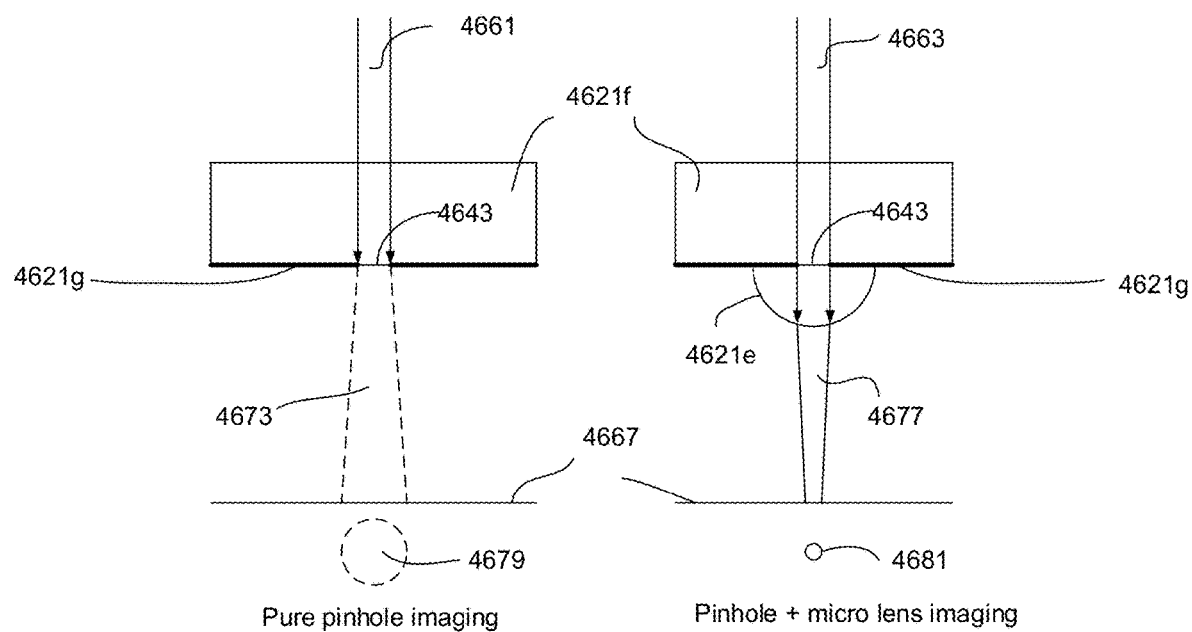

The pinhole-lens assembly for optical imaging in the example in FIG. 25 can achieve a higher spatial imaging resolution to capture fine features in the captured images beyond the spatial imaging resolution of the system with the pinhole 4643 alone without the lens 4621*e*. This higher spatial imaging resolution is a result of having the lens 4621*e*. FIG. 29, including FIGS. 29A and 29B, illustrates the imaging operation of the pinhole alone and the imaging operation of the pinhole-lens assembly.

Referring to FIG. 29A of FIG. 29 showing a pinhole imaging system without the lens, the pinhole 4643 diffracts the incident light beam 4661 to produce a diffracted the output light beam 4673 that is divergent due to the diffraction by the pinhole 4643. This divergent light beam 4673 forms an image light spot 4679 at the imaging plane 4667 that reflects the resolution of this imaging system.

FIG. 29B in FIG. 29 shows a micro lens 4621*e* is added under the pinhole 4643. As a result of this combining the micro lens 4621*e* and the pinhole 4643, the curvature of the micro lens 4621*e* modifies the wave-front of the light beam diffracted by the pinhole 4643 to produce a light spot 4681 at the imaging plane 4667 which is smaller than the light spot 4679 produced by the pinhole 4643 alone without the lens 4621*e*.

Figure 30:
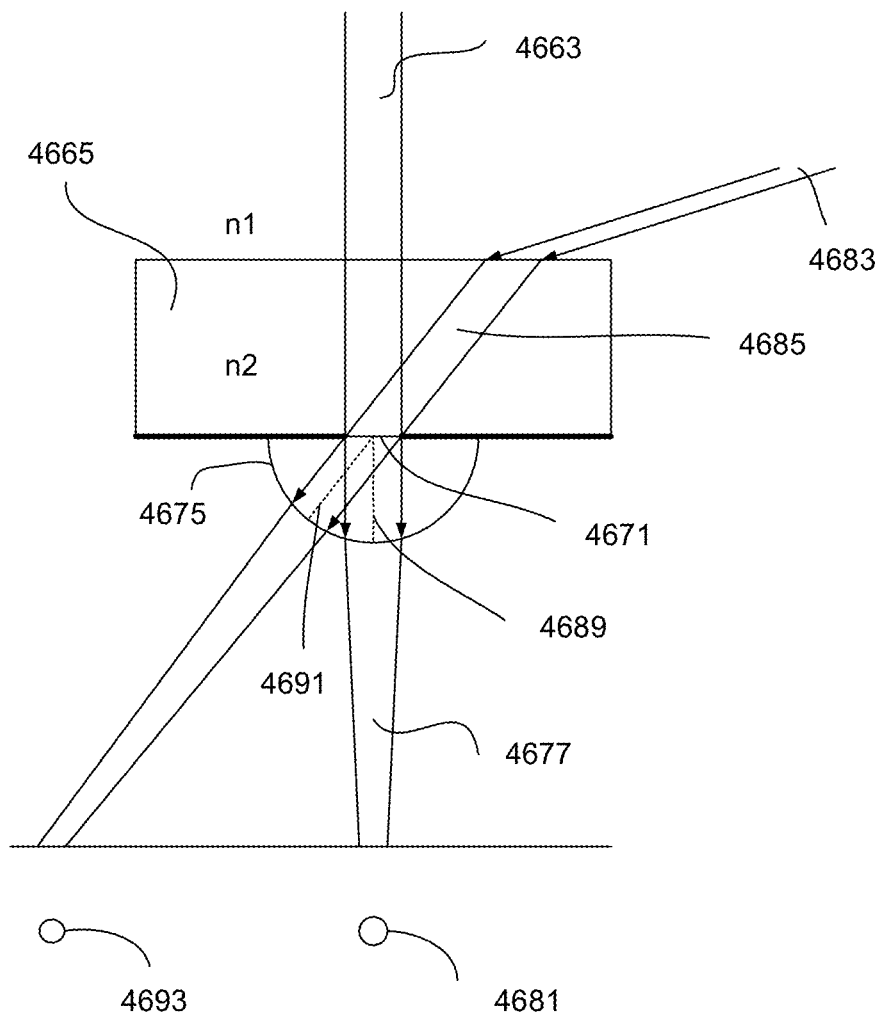

The pinhole-lens assembly can be implemented to provide a compact optical sensor module 4620 in the example in FIG. 25. Due to the refraction at the media interfaces, the light propagation angle can be controlled by using different optical materials. For example, as shown in FIG. 30, if the refractive index n1 in the media above the pinhole substrate 4621*f* is lower than the refractive index n2 of the pinhole substrate 4621*f*, a light beam 4683 with a large incident angle is bent to a beam 4685 with a smaller angle after entering the pinhole substrate 4621*f*. Therefore, an extremely large field of view can be realized for receiving input light at the object side of the pinhole-lens assembly by using a higher index material for the pinhole substrate 4621*f*. In some implementations, a large FOV (e.g., close to or above 140 degrees) may be achieved by using a high-index material for the pinhole substrate 4621*f* to create a sufficiently large difference between the refractive indices the pinhole substrate 4621*f* and the layer above the pinhole substrate 4621*f*.

The above design for achieving a large diffraction bending of light rays at the top surface of the pinhole substrate 4621*f* can be used to reduce the thickness of the optical sensor module by incorporating some low refractive index gaps (such as air gaps) in the light path. In addition, the image uniformity of the image from the pinhole-lens assembly can be improved because the tilting angles of light rays entering the lens underneath the pinhole substrate are reduced with a smaller FOV due to the large refraction on the top of the pinhole substrate 4621*e*.

In the pinhole-lens assembly, the micro lens is placed underneath the pinhole 4643 and thus the optical aperture of the micro lens is small due to the small opening of the pinhole 4643. As such, the micro lens exhibits lower aberrations because light rays from the pinhole 4643 collected by the micro lens generally are close to the axis of the curved surfaces of the micro lens.

In implementing this pinhole-lens assembly, the center of the pinhole 4643 is placed at or close to the center of the surface of the micro lens 4621*e*. In the example in FIG. 30, a half ball lens is shown as an example and is engaged onto (e.g., being glued) a pinhole board to achieve this configuration. The flat surface of the half ball lens 4621*e* faces up to engage to the pinhole 4671 and the center of the flat surface of the half ball lens 4621*e* is at or near the center of the pinhole 4643. Under this design, incident light, at both small or large incident angles to the flat surface of the half ball lens 4621*e* via the pinhole 4643, would have its light ray direction to coincide with a radial direction of the half ball lens 4621*e* which is the optical axis of the lens in that direction. This configuration reduces optical aberrations. For light beams 4663 and 4683 with different incident angles at the top of the pinhole substrate 4621*f*, their light paths are modified after entering the pinhole substrate 4621*f* to be close to the respective optical axes 4689 and 4691 of the half ball lens surface. Therefore, under this specific design, the image light spots 4681 and 4693 formed by the light beams 4663 and 4683 exhibit low optical aberrations although they have different incident angles.

Figure 31:
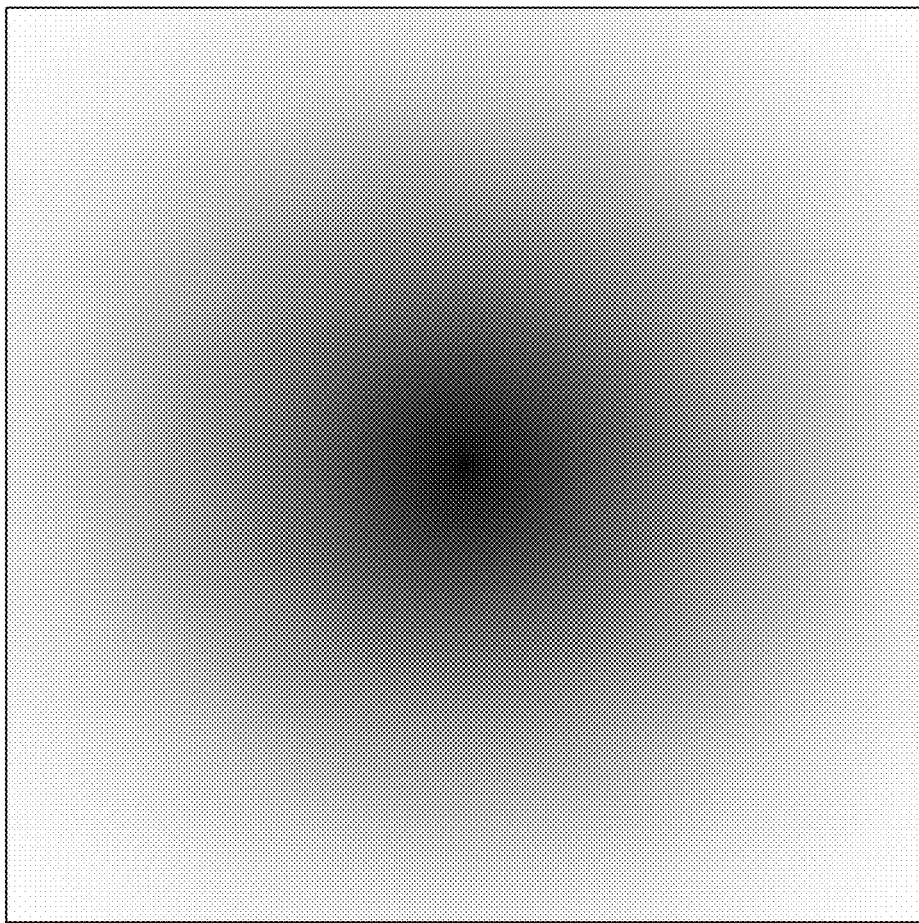

The pinhole-lens assembly is subject to an aperture shading effect which causes the final image at the imaging plane (the optical sensor array 4623*e*) to appear brighter in the center and darker in the peripheral area with a gradual change in brightness along the radial direction from the center towards the peripheral area. This effect degrades the image captured at the optical sensor array 4623*e* and can be reduced by using a corrective optical filtering that modifies the spatial brightness distribution. For example, an optical filter with a spatial gradient transmission profile can be inserted in the optical path of the light received by the optical sensor module, e.g., a location between the OLED display panel and the optical sensor array. This gradient transmission filter is structured to exhibit a high optical attenuation at or near a center of the pinhole and a decreasing optical attenuation from the center of the pinhole radially outward to counter a spatial variation of an optical intensity distribution of light caused by the pinhole. FIG. 31 shows an example of an optical attenuation profile for such a gradient transmission filter with a radial gradient attenuation that decreases from the center towards the edge.

In implementations, the gradient transmission filter may include one or more coatings may be made on a surface of the light path to correct the image brightness non-uniformity, e.g., the display bottom surface, the module parts surface, or top surface of the optical sensor array. In addition to countering the spatial un-uniformity by the aperture shading effect, the filter may be further configured to correct other types of brightness non-uniformity and may also include features that can reduce other optical distortions and optical aberrations.

The above disclosed optical sensor modules that uses a pinhole-lens assembly for optical imaging onto an optical sensor array may also be used to construct optical sensor modules located under a top glass cover but is placed next to an LCD display screen that is placed under the same top glass cover. Such optical sensor modules can be placed next to an LCD display screen under the same top glass cover to allow for a common and contiguous top surface above the LCD display and the optical sensor module and several examples are provided in the subsection VIII entitled "Optical Fingerprint Sensors on One Side of LCD Displays."

V. Invisible Under-LCD Optical Fingerprint Sensor Designs

In principle, designs of an optical sensor module under the LCD display screen, due to their optical sensing configurations, provide some flexibility in placing the optical fingerprint sensing region in the LCD screen almost anywhere in the LCD screen. Since the fingerprint sensing area 615 is within the LCD screen display area and is used along with other parts of the LCD screen for displaying images during the normal operation of the device, the LCD screen display area that corresponds to the fingerprint sensing area 615 can be controlled to display an image in the area or the boundary of the fingerprint sensing area 615 so that the fingerprint sensing area 615 is visibly marked for the user to place a finger for performing a fingerprint sensing operation. When one or more extra illumination light sources 4663 or 4661 are implemented for the under-LCD optical sensing, the one or more extra illumination light sources 4663 or 4661 may be used to illuminate the fingerprint sensing area 615 to mark the area to be visible for the fingerprint sensing without turning on the LCD screen, or in other implementations, with the LCD screen to turn on to use the LCD pixels at the fingerprint sensing area 615 to mark the fingerprint sensing area 615.

One of challenges for placing an optical sensor module under the LCD display screen is to obtain sufficient optical transmission for the probe light used for optical sensing to pass through the LCD display screen such that there is sufficient light carrying the fingerprint information from the fingerprint sensing area 615 on the top surface of the top transparent layer 4431. This can be important for optical sensing because insufficient optical transmission of probe light through the LCD displays screen may adversely affect the optical sensing sensitivity, the optical imaging contrast and the signal-to-noise ratio of the optical detection at the under-LCD-screen optical sensor module.

As described in examples illustrated in FIGS. 18A through 23C, various layers in the LCD screen stack can be modified to improve the optical transmission of the probe light at the optical sensor module and the image contrast of the optical sensing. For example, transmissive features or regions may be formed in the path leading to the under-LCD optical module in the LCD diffusion layer above the LCD backlighting waveguide layer and/or the reflector film or layer below the LCD backlighting waveguide layer. However, such transmissive features or regions in the in the LCD screen stack may cause an undesired visual effect in the appearance of the displayed images by the LCD screen.

Referring to FIG. 18A, for example, the inclusion of the holes 951*a* in the LCD diffuser layer 433*b* for enhancing the local optical transmission in the LCD screen at the optical sensor module 6621 can reduce the local optical diffusion while increasing the local optical transmission at the holes 951*a* so that the LCD display in the region of the holes 951*a* appears to be slightly brighter than the surrounding LCD display regions without the holes 951*a* in their LCD diffuser layer 433*b*.

As labeled in FIG. 18A, the in-screen fingerprint sensing (FPS) area 615 contains local holes 951*a* are somewhat "abnormal" in its display appearance but the surrounding screen areas are "normal" display areas without such holes 951*a* that appear to be slightly dimmer than the in-screen FPS sensing area 615 when the LCD screen is operated to display images in normal screen operations. In examples in FIG. 19A and in FIG. 22, transmissive features or regions may also be formed in the reflector film or the backlighting waveguide in the LCD screen stack and localized in the region where the optical sensor module is.

Therefore, the localized presence of the transmissive features or regions in the LCD screen stack in the region where the under-LCD optical sensor module may render this region in the LCD screen to appear to have a slightly different screen brightness from the remainder parts of the LCD screen without such transmissive features or regions, specially the surrounding areas in the LCD screen. Accordingly, this visual difference in the screen brightness at the region where the under-LCD optical sensor module renders the in-screen FPS sensing area 615 visible to users although this difference may be less noticeable to some users. Although this visual difference for the in-screen FPS sensing area 615 is acceptable or even helpful during the optical fingerprint sensing operation, this visual difference is not desirable when the LCD screen is operated for normal display operations in displaying video, images, graphics or texts.

One aspect of the technology disclosed in this patent document is to design the under-LCD optical sensing module and associated features to reduce this difference in the appearance of the displayed images in the in-screen FPS sensing area 615 and other "normal" regions in the LCD screen so that the in-screen FPS sensing area 615 completely or substantially blends with other "normal" regions in the LCD screen and thus is "invisible" to a user when the LCD screen is operated to use the in-screen FPS sensing area 615 and other "normal" regions in the LCD screen for normal display operations.

Since the transmissive features or regions in the LCD screen above the optical sensor module are needed for better optical sensing operation, one way to improve the local optical transmission of the LCD screen for the under-LCD optical sensing without making such a region to be visible to a user is to place such the transmissive features or regions in the LCD screen above the optical sensor module at a location that is not visible to a user when viewing the LCD screen.

In many commercially produced LCD screens, an optically opaque border is present in the peripheral sides of the LCD screen, like a peripheral opaque border frame surrounding the central area of the LCD screen. FIG. 32A in FIG. 32 illustrates a top view of the LCD display screen where a peripheral opaque border frame 3220 is formed on the four sides of the LCD screen and block the LCD display pixels in the border regions on the four sides of the LCD screen so that only the central LCD display area 3210 exposed by the opening of the peripheral opaque border frame 3220 is visible to a user during the display operation.

Accordingly, as illustrated in FIGS. 32A and 32B in FIG. 32, the under-LCD optical sensor module can be placed under the LCD screen near or within the area covered by the peripheral opaque border frame 3220 so that the LCD screen portion 3230 under the peripheral opaque border frame 3220 above the optical sensor module can be modified to provide one or more desired localized transmissive features or regions in the LCD screen stack for directing probe light carrying the fingerprint information to the optical sensor module.

FIG. 32B shows a cross section view of the different layers under the marked circular region in FIG. 32A. The LCD screen portion 3230 with optical transmissive features or regions for directing light to the optical sensor module is placed under the peripheral opaque border frame 3220 and thus is largely invisible to the user when viewing the LCD-displayed images because the peripheral opaque border frame 3220 is above and conceals the LCD screen portion 3230 from the view of the user. Notably, different from some other examples of under-LCD optical sensing designs, the center of the in-screen FPS sensing area 615 is spatially offset from the center of the LCD screen portion 3230 with optical transmissive features or regions. Accordingly, the location of the underlying optical sensor module is spatially shifted in position off the in-screen FPS sensing area 615 because the underlying optical sensor module is placed under the peripheral opaque border frame 3220 rather than being directly underneath the in-screen FPS sensing area 615.

This design of placing the LCD screen portion 3230 with optical transmissive features or regions either partially or entirely under the peripheral opaque border frame 3220 for directing probe light into the under-LCD optical sensor module is referred to as an "invisible" optical sensor design. This design can conceal both the localized transmissive features or regions in the LCD screen portion 3230 of the LCD screen stack and the underlying optical sensor module from being visible even when one or more extra illumination lights 4663 or 4661 are provided for illuminating the area above the in-screen FPS sensing area 615 where a user is to place a finger for optical fingerprint sensing and other optical sensing operations.

Under this arrangement, the in-screen FPS sensing area 615 can no longer be placed anywhere in the LCD screen but should be in the LCD screen near the location of the LCD screen portion 3230 having localized transmissive features or regions so that a portion of the light from the in-screen FPS sensing area 615 that reaches the LCD screen portion 3230 under the peripheral opaque border frame 3220 can be directed through the LCD screen to reach the underlying optical sensor module for optical sensing. In various implementations of this design, the LCD screen portion 3230 having localized transmissive features or regions is designed to provide one or more light receiving paths (at least partially covered by the peripheral opaque border frame 3220) from the in-screen FPS sensing area 615 to the under-LCD optical sensor module to improve the optical detection performance while the illumination of the in-screen FPS sensing area 615 can be implemented independent of this special design. For example, the one or more extra illumination lights 4663 or 4661 can be placed at desired locations to direct illumination light to the in-screen FPS sensing area 615 without necessarily going through the LCD screen portion 3230 having localized transmissive features or regions to reach the in-screen FPS sensing area 615. Some examples are provided with reference to FIGS. 38, 39 and 40.

The above described design of placing the LCD screen portion 3230 having localized transmissive features or regions to be at least partially covered by the peripheral opaque border frame 3220 can be applied to various configurations of the under-LCD optical sensor module for implementing the design in FIG. 32. For example, the under-LCD optical sensor module using a projector system for collecting light from the in-screen FPS sensing area 615 in FIG. 4B, or an imaging system having a lens located below the LCD screen in an optical path to the optical sensor array to collect the probe light from the in-screen FPS sensing area 615 and to project the collected probe light towards the optical sensor array in FIGS. 6B, 7, 8A, 9 and 10A, or a lens-less optical system by using an array of optical collimators or pinholes to collect the probe light from the in-screen FPS sensing area 615 and to project the collected probe light towards the optical sensor array as shown in FIG. 17, or a combination of a pinhole and a lens downstream from the pinhole to receive the transmitted probe light from the pinhole and to focus the received probe light onto the optical sensor array for optical imaging as shown in FIGS. 25 through 31.

Figure 33A:
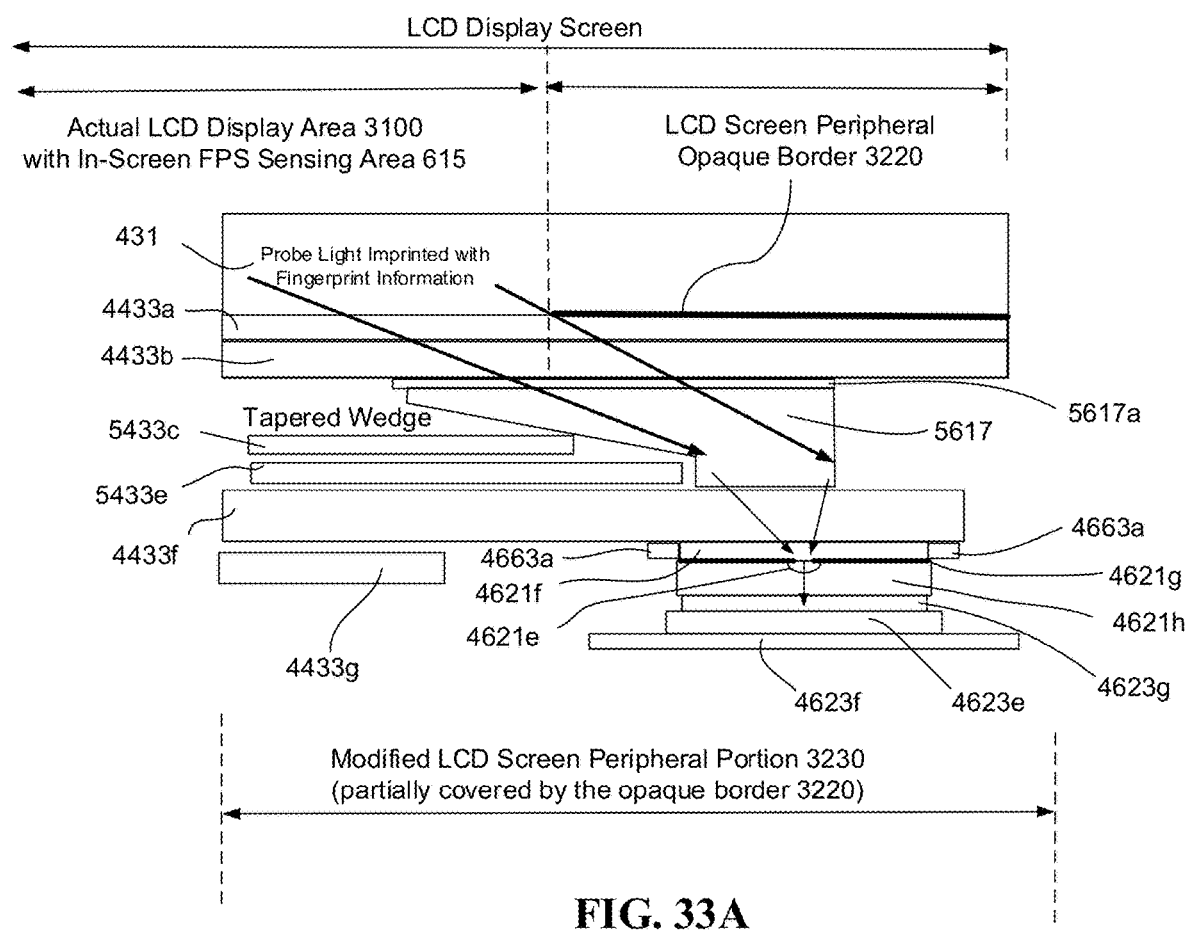
Figure 33B:
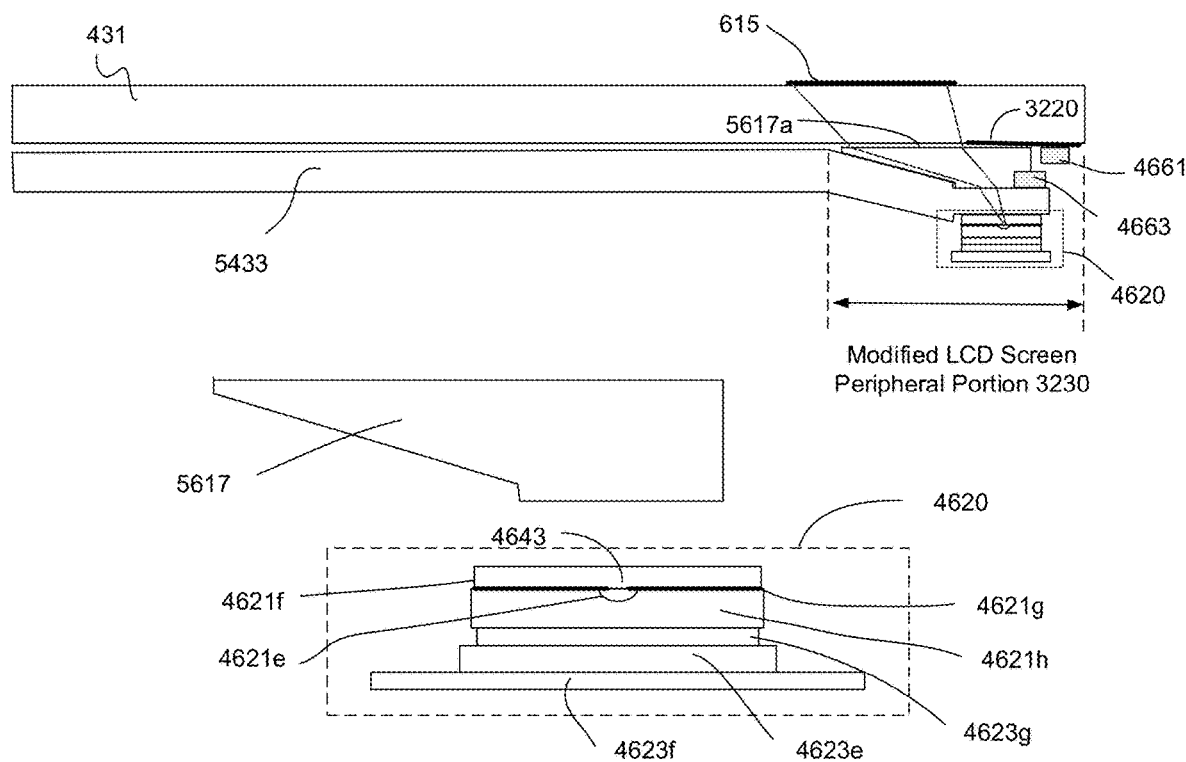
Figure 33C:
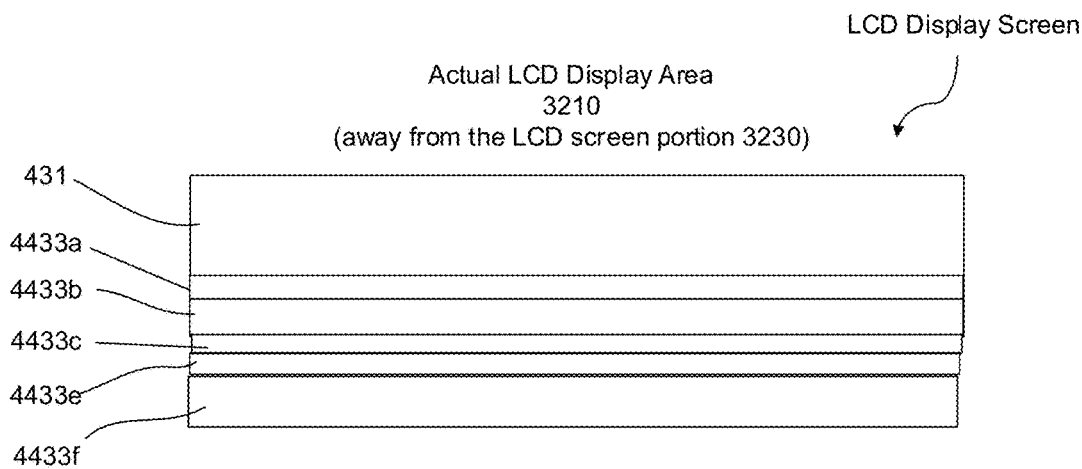

Referring back to FIG. 32, the LCD screen portion 3230 having localized transmissive features or regions that is partially or entirely covered by the peripheral opaque border frame 3220 can be use various designs to increase the optical transmission of the LCD screen portion 3230 in addition to forming transmission holes or more transmissive regions than the other parts of the LCD screen. FIGS. 33A, 33B and 33C show one specific example where a peripheral segment of the LCD screen is modified to form the LCD screen portion 3230 by providing improved optical transmission in the modified LCD screen portion 3230 in which the underlying optical sensor module 4620 as shown uses a combination of a pinhole and a lens shown in FIG. 25 to collect light for the optical sensor array as an example.

In this design example, as shown in FIGS. 33A and 33B, the under-LCD optical sensor module uses a pinhole 4643 and a micro lens 4621*e* together to form an optical system for collecting light from the FPS sensing area 615 on the top transparent layer 431 and for directing the collected light onto the optical sensor array 4623*e* in the optical sensor module 4620 to achieve a large field of view and a high imaging resolution at the same time. See FIGS. 25 through 31 and associated description for more details. The spacer 4621*h* may be a low-index material layer such as an air gap, and the protection material 4623*g* may be a band pass filter. FIG. 33B shows that one or more under cover glass extra illumination light sources 4661 are provided to illuminate the finger to be detected and to generate probe light in the optical path from the in-screen FPS sensing area 615 to the LCD screen portion 3230 to the optical sensor module. Extra light sources 4663 may be placed adjacent to or just above the optical sensor module 4620 to provide local illumination for finger illumination. These light sources can also function as a breathing light to indicate the operational state of the optical sensor module. As further explained in later sections, other light sources, such as environmental light sources, can also be used as probe light sources for optical sensing.

FIGS. 33A, 33B and 33C show that a peripheral segment of the LCD screen is modified to form the LCD screen portion 3230 by peeling off a small segment of the LCD prism and diffusion films 4433*c* and 4433*e* and the other layers underneath the LCD prism and diffusion films 4433*c* and 4433*e*. The peripheral segments of the LCD prism and diffusion films 4433*c* and 4433*e* are removed to create a void for optical transmission to form modified LCD prism and diffusion films 5433*c* and 5433*e* as shown in FIG. 33A. This void is used to insert an optical coupler 5617 below the LCD layers 4433*b* and above the backlighting waveguide layer 4433*f*. This optical coupler 5617 can be implemented as a wedged optical coupler with a tapered wedge section to extend into the space between the peeled and modified LCD prism and diffusion films 5433*c* and 4433*e* and this tapered wedge section can reach into the LCD screen region 3100 that is not covered by the peripheral opaque border frame 3220 as a light path for better collection of light from the in-screen FPS sensing area 615. Accordingly, the optical coupler 5617 includes a top coupler part that receives the light from the in-screen FPS sensing area 615 and routes the received light from the in-screen FPS sensing area 615 along a slanted optical path to the region underneath the peripheral opaque border frame 3220 where the concealed optical sensor module 4620 is located to collect the received light from the in-screen FPS sensing area 615 for optical sensing. This feature of the optical coupler 5617 only impacts a small area of the LCD screen near the peripheral opaque border frame 3220 so that the impact to the display quality is not pronounced. A thin spacer 5617*a* is formed between the bottom surface of the LCD layers 4433*b* and the top surface of the optical coupler 5617 and may be, e.g., a soft optically clear or transparent adhesive layer. As such, probe light from the in-screen FPS sensing area 615 passes through the thin spacer 5617*a* and is collected and directed by the optical coupler 5617 into the backlighting waveguide layer 4433*f*.

Another modification to the peeled LCD peripheral segment is to remove a small peripheral segment of the optical reflector film layer 4433*g* as a modified optical reflector film layer 5433*g* to expose the bottom surface of the backlighting waveguide layer 4433*f* for placing the optical sensor module 4620. The top surface of the optical sensor module 4620 in this example is the pinhole substrate 4621*f* which is placed against the bottom surface of the backlighting waveguide layer 4433*f* to receive the light directed by the optical coupler 5617. In this example, the optical path from the in-screen FPS sensing area 615 through the top transparent layer 431, through the touch sensing layer 4433*a*, the LCD layers 4433*b*, the spacer 5617*a*, the optical coupler 5617, and the backlighting waveguide layer 4433*f* into the optical sensor module 4620 contains no air gaps. In other implementations, an air gap may be present in the above optical path.

FIG. 33B shows the general geometry of the LCD screen portion 3230 based on the above modification of the peripheral segment of the LCD screen where two types of extra illumination light sources 4661 and 4663 are placed below the top transparent layer 431 and above the backlighting waveguide layer 4433*f*.

FIG. 33C shows that, other than the peripheral segment of the LCD screen portion 3230, other parts of the LCD screen are not modified and are shown in their originally fabricated positions.

Figure 34:
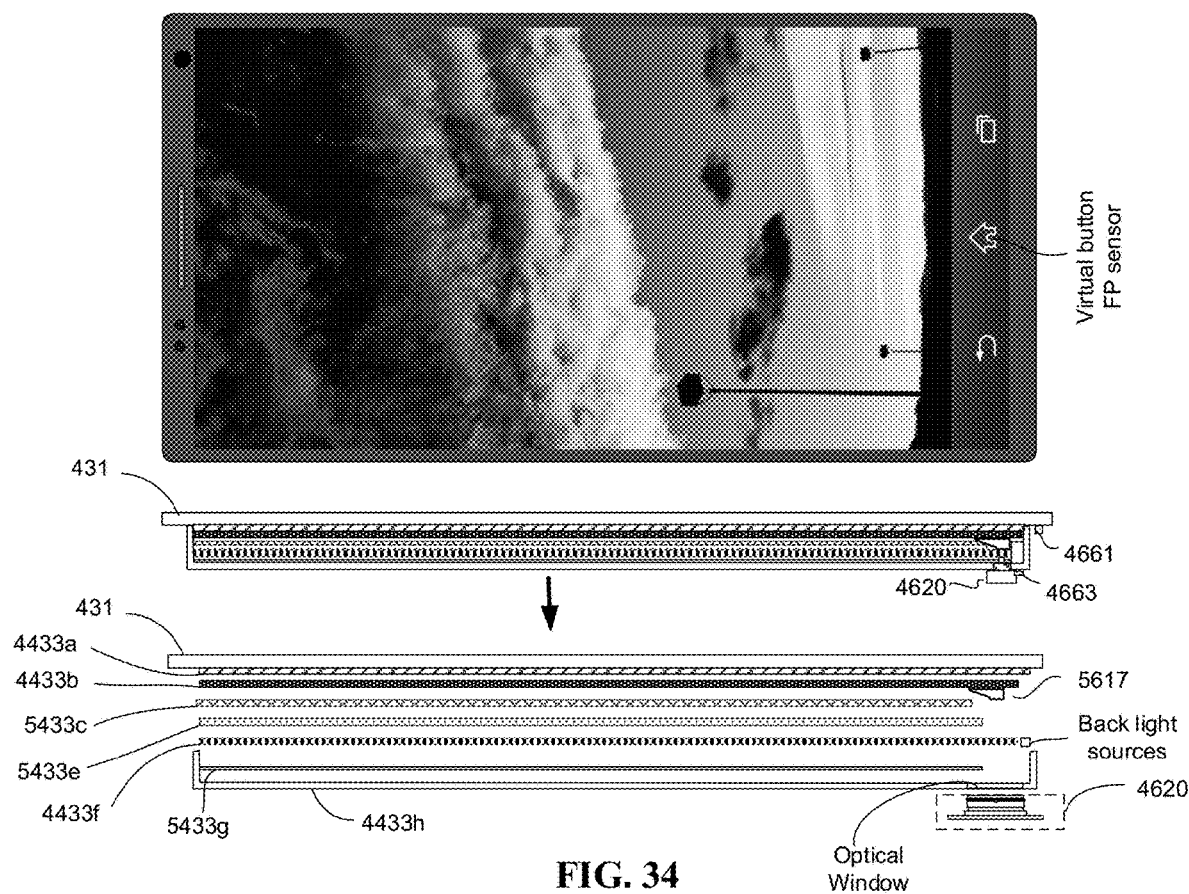

FIG. 34 shows an example of an implementation of the design in FIGS. 33A-33C where the optical sensor module 4620 is integrated under the LCD assembly at a position close to the backlighting light sources 434 at one end of the LCD screen structure. The light path for the optical sensor module 4620 is out of the LCD display's working zone (e.g., the actual LCD display area 3100) so that the optical sensor module 4620 is hidden under the LCD opaque border from the viewer and is substantially invisible. In this example, a LCD housing 4433*h* below the modified LCD reflector film layer 5433*g* is located above the optical sensor module 4620 and has an optical transparent window at the optical sensor module 4620 to allow the collected light to enter the optical sensor module 4620.

In summary, the above invisible optical sensor module design for an electronic device capable of detecting a fingerprint by optical sensing (e.g., smartphones, tablets, and others) is based on a LCD screen that provides touch sensing operations and includes a LCD display panel structure to display images and a peripheral opaque border surrounding a central area of the LCD display panel structure and covering a narrow peripheral border of the LCD display panel structure. The LCD display panel structure includes a backlighting module to produce backlight for illuminating the LCD layers to display images in the central area of the LCD display panel structure within the peripheral opaque border. One or more optical sensing illumination probe light sources are provided to produce probe light to illuminate a sensing area of the top transparent layer for optical sensing. An under-LCD optical sensor module is located below the LCD screen and positioned underneath the peripheral opaque border to be spatially offset from central area of the LCD display panel structure to receive returned probe light that passes through the LCD screen for optical sensing. The LCD display panel structure includes one or more extra transmission holes or regions within an area that is at least partially covered by the peripheral border and is positioned above the optical sensor module to allow probe light to pass through the LCD display panel structure to reach the optical sensor module for optical sensing. The one or more extra transmission holes or regions within the area that is at least partially covered by the peripheral border may include, in some implementations, an optical coupler to transmit the light. In some designs, this optical coupler may be placed below the LCD layer and above the LCD backlighting waveguide layer while the optical sensor module is placed under the LCD backlighting waveguide layer at a location where a portion of the LCD optical reflector film is removed or has an opening or void.

VI. Sensing of Topographical Features Under Finger Skin in Fingerprint Sensing with Under-LCD Optical Fingerprint Sensor In practical implementations of the disclosed under-LCD optical sensing, the performance of optical sensing for fingerprint sensing and other sensing functions in an electronic device equipped with optical fingerprint sensing may be degraded by the presence of undesired background light from the environment where a portion of the background light may enter the optical sensor module. Such background light causes the optical detectors in the under-LCD optical sensor module to produce a noise signal that undesirable reduces the signal to noise ratio of the optical fingerprint sensing detection. In some conditions, such background noise can be high to a degree that may overwhelm the signal level of the useful signal that carries the optical fingerprint information or other useful information (e.g., biometric information) and could potentially cause unreliable optical sensing operation or even malfunction of the optical sensing. For example, one of sources for the undesired background light at the optical sensor module may be from the daylight from the sun and the impact of the sunlight can be particularly problematic for outdoor operations or in a sheltered environment with strong sunlight. For another example, other light sources present at locations at or near the location of the device with the disclosed optical fingerprint sensing may also lead to the undesired background light at the optical sensor module.

The undesired impact of the background light at the optical sensor module may be mitigated by reducing the amount of the undesired background light that can enter the optical sensor module, enhancing the optical signal level of the optical sensing signal carrying the fingerprint or other useful information, or a combination of both background reduction and enhancing optical sensing signal level. In implementations, the background reduction can be achieved by using one or more optical filtering mechanisms in connection with the under-LCD optical sensor module. In enhancing the optical signal level of the optical sensing signal carrying the fingerprint or other useful information, one or more extra illumination light sources may be added to the device to provide optical illumination light that can be separately controlled from the LCD display light from the LCD backlighting illumination light sources.

Using extra illumination light sources for optical fingerprint sensing and other optical sensing functions can also provide independent control over various features in providing illumination light for optical sensing, e.g., the selection of the illumination light wavelengths separate from the LCD display light in terms of the optical transmission property of human tissues, providing illumination for optical sensing operations beyond the spectral range in the LCD display light, controlling the mode of the illumination for optical sensing such as the timing or/and duration of illumination separate from the LCD display light, achieving a sufficiently high illumination level while maintaining an efficient use of power to prolong the battery operating time (an important factor for mobile computing or communication devices), and strategic placing the extra illumination light sources at certain locations to achieve illumination configurations that are difficult or impossible when using the LCD display light for illumination for optical sensing.

In addition, unlike many fingerprint sensing technologies that detect 2-dimensional spatial pattern on an exterior surface of a finger, the disclosed optical fingerprint sensing technology can be implemented to capture not only a 2-dimensional spatial pattern of external ridges and valleys of a fingerprint but also internal topological features fingerprint pattern associated with the external ridges and valleys of a finger under the finger skin. The disclosed optical fingerprint sensing by capturing information on the internal fingerprint pattern associated with the external ridges and valleys of a finger under the finger skin is substantially immune from the contact conditions between the finger and the top touch surface of the device (e.g., dirty contact surface) and the conditions of the external finger skin condition (e.g., dirty, dry or wet fingers, or reduced external variations between ridges and valleys in fingers of certain users such as aged users). Therefore, it can be advantageous to use the disclosed optical fingerprint sensing to provide robust and reliable optical sensing by capturing information on the internal fingerprint pattern associated with the external ridges and valleys of a finger under the finger skin.

In implementations of the disclosed technical features, additional sensing functions or sensing modules, such as a biomedical sensor, e.g., a heartbeat sensor in wearable devices like wrist band devices or watches, may be provided. In general, different sensors can be provided in electronic devices or systems to achieve different sensing operations and functions.

Figure 35:
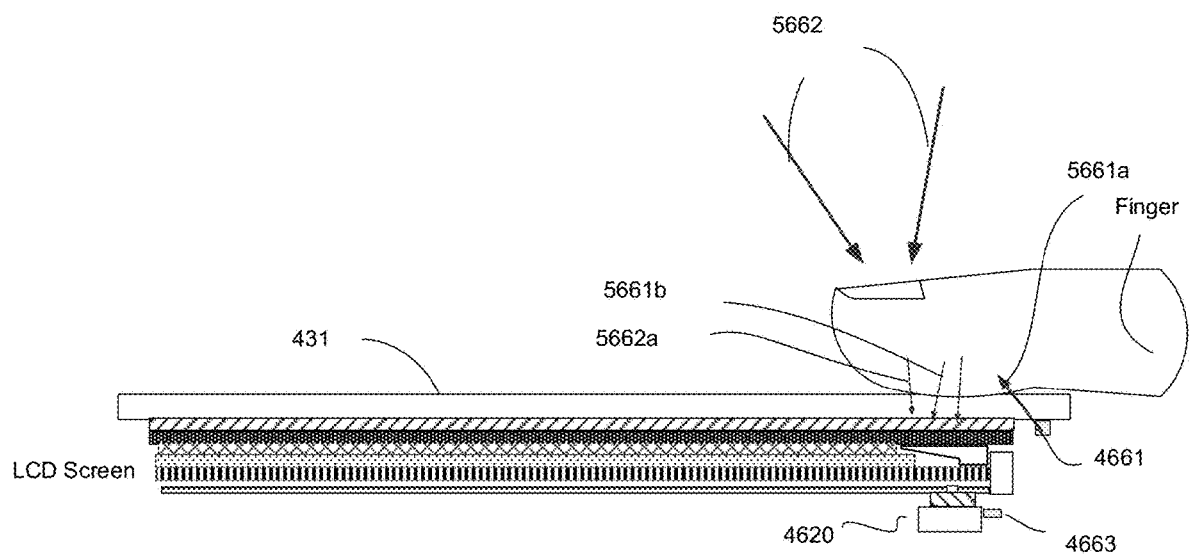

FIG. 35 shows different light signals present in a device that implements the invisible under-LCD optical sensing design disclosed in connection with the examples in FIGS. 32 through 34. In the illustrated example in FIG. 35, one or more extra light sources 4661 are placed at one side of the LCD module near the optical sensing area 615 on the top of the top transparent layer 431 to produce illumination light for optical sensing, e.g., an illumination light beam 5661*a* that passes through the top transparent layer to illuminate a touching finger at the optical sensing area 615. A portion of the light from the illumination light beam 5661*a* can enter the finger and is scattered by the finger tissues. A portion of the scattered light (e.g., 5661b) transmits through the finger to enter the top transparent layer 431 in the FPS sensing area 615 and can be collected by the optical coupler 5617 for sensing by the optical sensor array 4620. As will be explained in detail below, the portion 5661b of the scattered light that comes out of the finger to enter the top transparent layer 431 carries the fingerprint information and thus can be detected to extract the user fingerprint information.

FIG. 35 further shows one or more illumination light sources 4663 that are located adjacent to the optical sensor module 4620 and are under the LCD module. The light for such an illumination light source 4663 can be directed to the top transparent layer 431 by passing through the LCD module. Referring back to FIGS. 5A, 5B and 5C, the light from the illumination light source 4663 at the optical sensing area 615 encounter the finger ridges 61 (e.g., light rays 80, 201) and valleys 63 (e.g., light rays 82, 211 and 212) to cause reflections 181, 205 and 206 from the ridges 61 and reflections 185, 213 and 214 from the valleys 63 from the top surface of the top transparent layer 431 in contact with the finger. The reflection rays from the different locations have different signal amplitudes and thus are imprinted with the fingerprint pattern as a 2-D fingerprint pattern. In addition, part of each of incident light rays from below the top transparent layer 431 enters the finger, e.g., light rays 183 from the light rays 80, light rays 189 from the light rays 82, light rays 203 from light rays 201 and light rays 204 from light rays 202, and is scattered by internal finger tissues to produce scattered light 191 towards the top transparent layer 431 which can be collected by the optical coupler 5617 to be received by the optical sensor module 4610. Similar to the portion 5661b of the scattered light that comes out of the finger to enter the top transparent layer 431 in FIG. 35, the scattered light 191 caused by the scattering in FIGS. 5A and 5B due to illumination light from the illumination light sources 4663 carries the fingerprint information and thus can be detected to extract the user fingerprint information.

In addition to the light from the illumination light sources 4661 and 4663, incident light 5662 at the top side of the finger can come from different light sources, such as the environmental light from the sunlight, the room light by lights or other sources. The incident light 5662 can transmit into the finger tissues or propagate through the corneuem of the finger skin to produce scattered light by scattering from the finger tissues. Partial of such scattered light (e.g., scattered light rays 5662a) propagates to transmit through the finger to enter the top transparent layer 431 and thus carries the fingerprint information.

Therefore, different illumination light beams from different sources can carry fingerprint information and can be detected to extract the fingerprint pattern. As further explained below, the optical signals 5661b and 5662a always carry the fingerprint information under varying skin conditions, e.g., the skin is wet, dirty or dry. Therefore, detection of optical signals 5661b and 5662a at the under-LCD optical sensor array 4620 can improve the performance of the fingerprint detection performance and the reliability of the fingerprint sensing.

When light encounters a finger, the finger tissues show optical transmission to light at certain wavelengths. Therefore, optical signals 5661b and 5662a are generally light at such certain wavelengths.

Figure 36A:
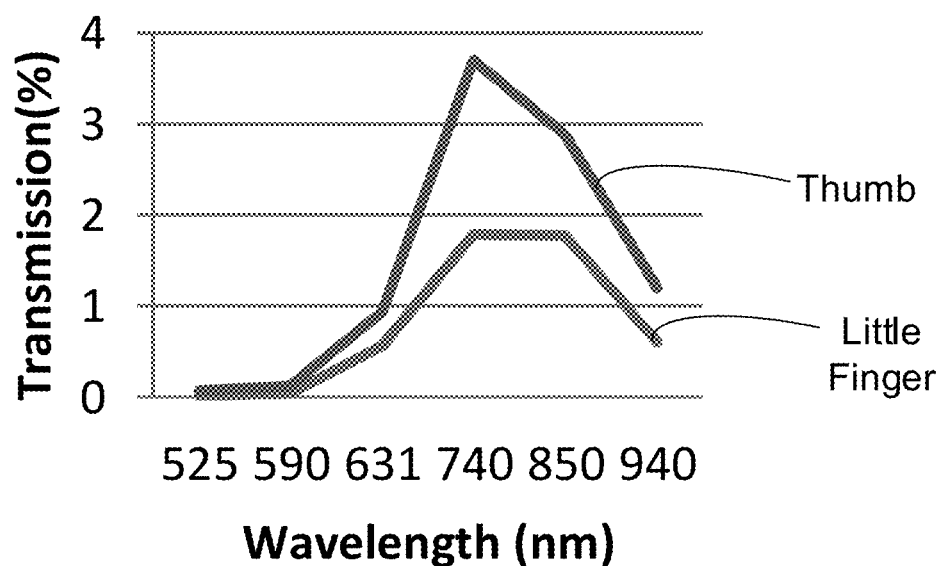

FIG. 36A shows an example of the optical transmission spectral profiles of a typical human thumb and little finger at several different optical wavelengths from around 525 nm to around 940 nm. For short wavelengths, such as wavelengths less than 610 nm, less than 0.5% of the environmental light may pass through the finger. Red light and near IR light have higher transmission. The transmission of the environmental light through a finger goes to a wide range of directions due to scattering by the finger tissues and thus can mix with the signal light to be detected by the under-screen optical sensor module. When operated under the sunlight, the undesired environmental light from the sunlight must be handled carefully due to the high optical power of the sunlight to reduce or minimize the adverse impact to the optical fingerprint sensor performance. Referring back to FIG. 35, the optical signals 5661b and 5662a are within the spectral range between 650 nm and 950 nm where a finger shows more than 1% of optical transmission. Accordingly, the light sources 4661 may be selected to produce light within the spectral range between 650 nm and 950 nm. The light sources 4663 may also be selected within this spectral range.

Therefore, as shown in FIGS. 5A-5C and FIG. 35, incident illumination light rays can produce two types of optical reflection patterns representing the same 2-dimensional fingerprint pattern of a finger: a low contrast optical reflective pattern formed by incident illumination light rays at small incident angles without the total internal reflection at both the finger ridges and valleys and a high contrast optical reflective pattern formed by incident illumination light rays at large incident angles based on a total internal reflection, mostly at the finger alleys.

The transmitted light from internally scattered light, such as the scattered light 191 in FIGS. 5A-5C and the scattered light 5561b and 5662a in FIG. 35, due to their propagation through the internal tissues of the finger and subsequent transmission through the finger skin to enter the top transparent layer 431, can carry an optical transmissive pattern of the finger that contains both (1) a 2-dimensional spatial pattern of external ridges and valleys of a fingerprint (2) an internal fingerprint pattern associated with internal finger tissue structures that give rise to the external ridges and valleys of a finger due to the propagation of the scattered light from the internal side of the finger towards the finger skin and transmits the finger skin. Accordingly, the scattered light inside the finger can be measured by the optical sensor array and the measurements can be processed for fingerprint sensing.

Notably, the internal fingerprint pattern associated with internal finger tissue structures that give rise to the external ridges and valleys of a finger is not substantially affected by the sensing surface condition of the top surface of the top transparent layer 431 or the skin conditions of the finger (e.g., dirty, wet/dry or aged finger patterns) and may still provide sufficient information for fingerprint sensing when the external fingerprint pattern on the external finger skin has a reduced ridge-valley contrast, is somewhat damaged or otherwise is not suitable for providing sufficient fingerprint information in the optical reflective pattern. While the external fingerprint pattern may be duplicated by using artificial materials for invading the fingerprint sensing, the internal fingerprint pattern of a user's finger imprinted in the optical transmissive pattern is extremely difficult to replicate and thus can be used as an anti-spoofing mechanism in the fingerprint sensing.

Figure 36B:
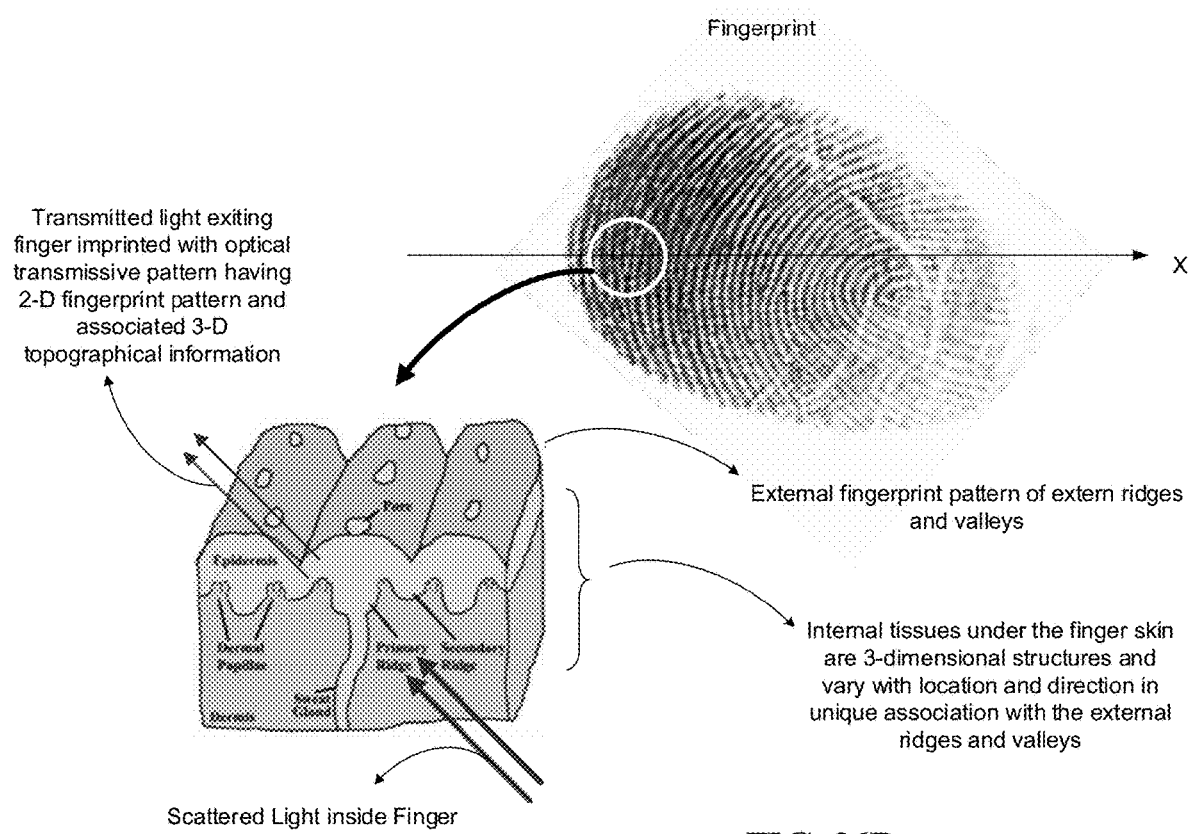

FIG. 36B shows an example of an external fingerprint pattern formed by external ridges and valleys of a person's finger and the internal finger issues that are under the skin and are uniquely associated with the external ridges and valleys. See, e.g., Chapter 2 of "The Fingerprint Sourcebook" by Holder et al. (U.S. Department of Justice, Office of Justice Programs, National Institute of Justice, Washington, D.C., 2011). As illustrated in FIG. 36B, the internal tissues include the papillary layer under the finger skin that has topographical features from which external ridges and valleys are formed as an expression of the underlying topographical features. In addition, the internal tissues also contain additional structures that are not identically replicated on the external ridges and valleys such as the internal primary and secondary ridges, the sweat glands connected to the primary ridges and other internal structures. As illustrated in FIG. 36B, when probe light propagates from the internal side of the finger outward to the finger skin, the probe light interacts with the internal tissues under the finger skin to carry not only the 2-dimensional fingerprint pattern of the papillary layer that is identical to the external fingerprint pattern formed by the external ridges and valleys but also additional topographical information from the internal tissue structures that is not carried by the external ridges and valleys. Such additional topographical information from the internal tissue structures cannot be obtained from the optical reflective pattern obtained from the optical reflection off the external finger skin. The additional topographical information from the internal tissue structures below the finger skin is valuable information for fingerprint sensing and is 3-dimensional since the internal tissue structures vary with both the lateral position under the skin and the depth from the skin surface (topographical information). Such additional topographical information from the internal tissue structures of a finger can be used, for example, to distinguish a natural finger from an artificial object manufactured with similar or identical external fingerprint pattern as the natural finger.

Referring to FIG. 36B, although only one beam of the internally scattered light is shown, different illumination probe light beams go through different parts of the under-skin internal tissue structures and thus are imprinted with different 3-D topographical information associated with the different optical paths in different directions of such illumination probe light beams. Imaging processing techniques can be used to process the optical transmissive patterns carried by such different illumination probe light beams to extract the topographical features associated with the under-skin internal tissue structures. The extracted topographical features can be synthesized to construct a 3-D representation or rendition of the under-skin internal tissue structures associated with the fingerprint pattern and this constructed 3-D representation of the under-skin internal tissue structures associated with the fingerprint pattern can be used as a unique and additional identification for the fingerprint pattern and can be used to distinguish a true fingerprint pattern from a real finger of a user from a fabricated fingerprint pattern that would invariably lack of the underlying internal tissue structures of the real finger. In particular, as the number of the different illumination probe light beams in the different directions increases, the more detailed topographical information on the under-skin internal tissue structures can be captured by the optical sensor module. In using the fingerprint for a secured access to the device, the fingerprint identification process can be designed to combine the identification of the 2-D fingerprint pattern and the additional examination of the extracted 3-D representation or rendition of the under-skin internal tissue structures associated with the fingerprint pattern to determine whether or not to grant the access. The extracted topographical features and the constructed 3-D representation or rendition of the under-skin internal tissue structures associated with the fingerprint pattern can be an anti-spoofing mechanism and can used alone or in combination with other anti-spoofing techniques to enhance the security and accuracy of the fingerprint sensing.

One way for the disclosed optical fingerprint sensing technology to capture additional topographical information from the internal tissue structures of a finger is by directing different illumination probe light beams at different directions to detect the different optical shadowing patterns produced by the internal tissue structures under the finger skin that are superimposed over the 2-dimensional fingerprint pattern that is common to all images obtained from the illumination by the different illumination probe light beams at different directions.

Figure 37A:
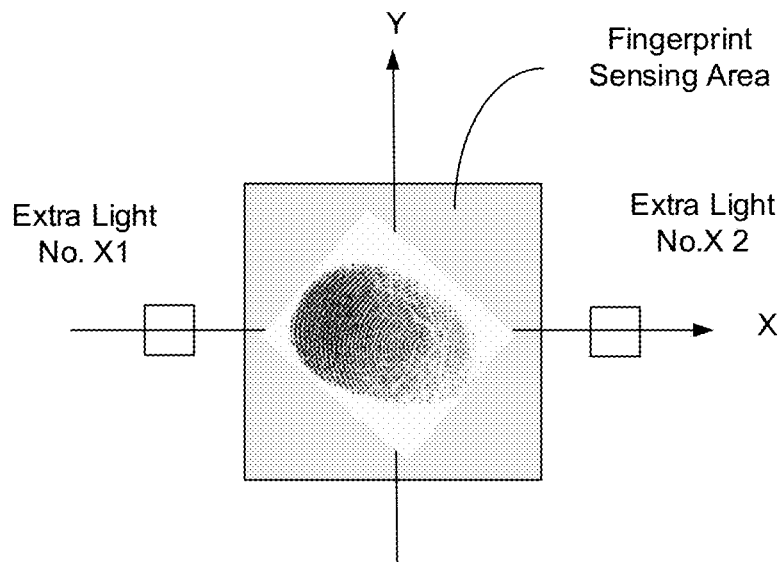

FIG. 37A shows that two extra illumination light sources X1 and X2 are placed on two opposite sides of the fingerprint sensing area on the top transparent layer 431 along the X direction so that they can direct two different illumination probe beams to the finger in opposite directions. The images from both illumination probe beams carry the same 2-D fingerprint pattern but different image shadowing patterns due to their different illumination directions with respect to the internal tissue structures under the finger skin. Specifically, the first extra illumination light source X1 is placed on the left side of the fingerprint sensing area along the X direction so that the first illumination probe beam from the first extra illumination light source X1 is from the left to the right in FIG. 37A.

Figure 37B:
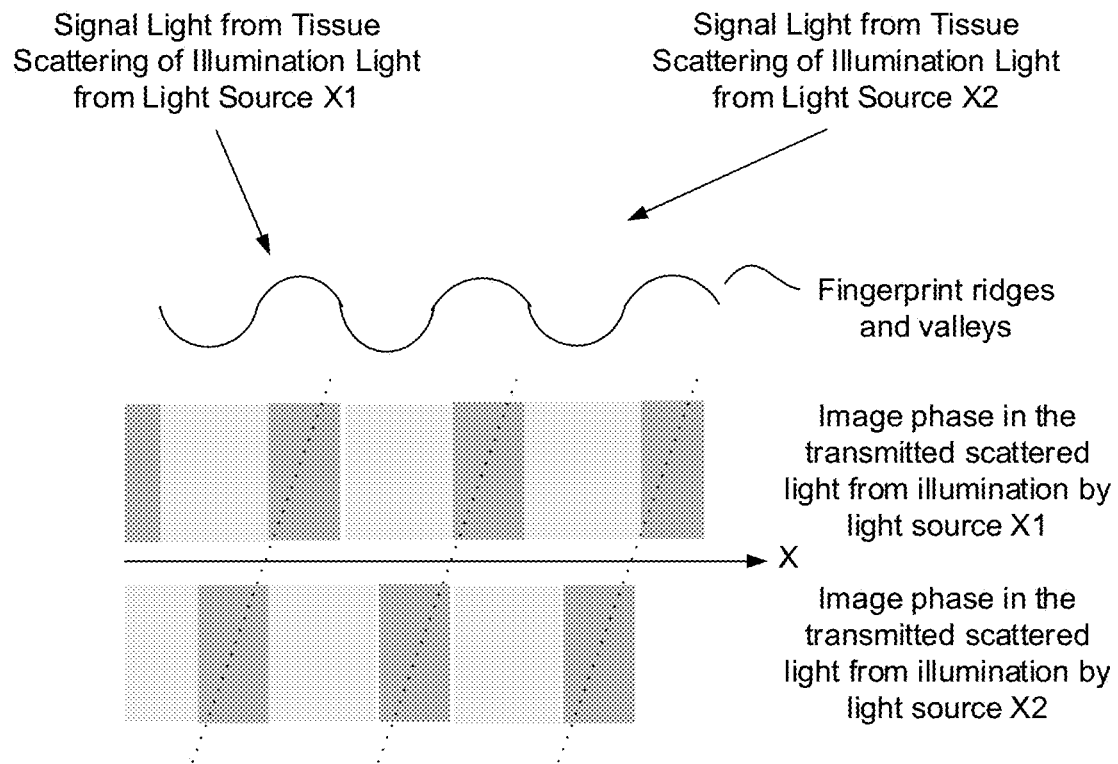

Turning now to FIG. 37B, the illumination by the first extra illumination light source X1 causes a shadowing pattern in the first fingerprint image at the under-OLED optical sensor array due to the interaction with the internal tissue structures under the finger skin and this shadowing pattern is shifted spatially towards the right in the X direction. The illumination by the second extra illumination light source X2 on the right side causes a shadowing pattern in the second fingerprint image at the under-OLED optical sensor array due to the interaction with the internal tissue structures under the finger skin and this shadowing pattern is shifted spatially towards the left in the X direction. In implementation of this technique, additional extra illumination light sources may be added, e.g., in the Y direction or in other directions.

In this example, the first illumination probe beam in the first illumination direction from the first extra illumination light source X1 leads to generation of the first scattered probe light by scattering of tissues inside the finger that propagates the internal tissues associated with ridges and valleys of the finger to carry both (1) a first 2-dimensional transmissive pattern representing a fingerprint pattern formed by bridges and valleys of the finger, and (2) a first fingerprint topographical pattern that is associated with the illumination of internal tissues of ridges and valleys of the finger in the first illumination direction and is embedded within the first 2-dimensional transmissive pattern. Similarly, the second illumination probe beam in the second illumination direction from the second extra illumination light source X2 leads to generation of the first scattered probe light by scattering of tissues inside the finger that propagates the internal tissues associated with ridges and valleys of the finger to carry both (1) a second 2-dimensional transmissive pattern representing the fingerprint pattern formed by bridges and valleys of the finger, and (2) a second fingerprint topographical pattern that is associated with the illumination of internal tissues of ridges and valleys of the finger in the second illumination direction and is embedded within the second 2-dimensional transmissive pattern. The two extra illumination light sources X1 and X2 are turned on sequentially at different times so that the optical sensor array can be operated to detect transmitted part of the first scattered probe light that passes through the top transparent layer and the display panel to reach the optical sensor array so as to capture both the first 2-dimensional transmissive pattern, and the first fingerprint topographical pattern and then the second 2-dimensional transmissive pattern and the second fingerprint topographical pattern. The shadowing patterns shown in FIG. 37B are embedded in the captured 2-D fingerprint patterns and are one form of the fingerprint topographical pattern that is associated with the illumination of internal tissues of ridges and valleys of the finger at a particular direction.

In various implementations, two or more extra illumination light sources can be located outside the optical sensor module at different locations to produce different illumination probe beams to illuminate the designated fingerprint sensing area on the top transparent layer in different illumination directions. Since this technique is based on the ability for the probe light to transmit through the finger tissues, each extra illumination light source should be structured to produce probe light in an optical spectral range with respect to which tissues of a human finger exhibit optical transmission to allow probe light to enter a user finger to produce scattered probe light by scattering of tissues inside the finger that propagates towards and passes the top transparent layer to carry both (1) fingerprint pattern information and (2) different fingerprint topographical information associated with the different illumination directions, respectively, caused by transmission through internal tissues of ridges and valleys of the finger. A probe illumination control circuit can be coupled to control the extra illumination light sources to sequentially turn on and off in generating the different illumination probe beams at different times, one beam at a time, so that the optical sensor module located below the display panel is operable to sequentially detect the scattered probe light from the different illumination probe beams to capture both (1) the fingerprint pattern information and (2) the different fingerprint topographical information associated with the different illumination directions, respectively.

One notable feature of the disclosed technique in FIG. 37B is the simplicity of the illumination arrangement, the optical detection and the signal processing which can lead to compact optical sensor packaging for mobile and other applications that desire compact sensing device packaging, and real-time processing since the detection and the subsequent processing are simple operations that can be achieved at high speed without complex signal processing. Various optical imaging techniques for capturing 3-D images require complex optical imaging systems and complex and time-consuming signal processing, such as optical coherence tomography (OCT) imaging based on complex OCT data processing such as fast Fourier transform (FFT) and others that are not suitable for 3-D optical fingerprint sensing in smartphones and other mobile devices.

In the examples above, the illumination light for obtaining an optical transmissive pattern of a finger can be from illumination light sources that are separate from the LCD display screen. In addition, a portion of the environmental or background light that is within the optical transmission spectral band of a finger (e.g., optical wavelengths between 650 nm and 950 nm) and penetrates through a finger may also be directed into the under-OLED optical sensor array to measure an optical transmissive pattern associated with a fingerprint pattern of the finger. Depending on the intensity of the environmental or background light (e.g., the natural daylight or sunlight), optical attenuation may be provided in the optical path to the optical sensor module to avoid detection saturation at the optical sensor array. In using a portion of the environmental or background light for obtaining the optical transmissive pattern of a finger in optical sensing, proper spatial filtering can be implemented to block the environmental light that does transmits through the finger from entering the optical sensor module since such environmental light does not carry internal fingerprint pattern and can adversely flood the optical detectors in the optical sensor module.

Therefore, the disclosed optical fingerprint sensing can use transmitted light through a finger to capture an optical transmissive pattern of the finger with information on the internal fingerprint pattern associated with the external ridges and valleys of a finger under the finger skin. The transmission of the light is through the finger tissues and the stratum corneum of the finger skin and thus is imprinted with the fingerprint information by the internal structural variations inside the finger skin caused by the fingerprint ridge area and valley area and such internal structural variations manifest light signals with different brightness patterns in different illumination directions caused by the finger tissue absorption, refraction, and reflection, by finger skin structure shading, and/or by optical reflectance difference at the finger skin. This optical transmissive pattern is substantially immune from the contact conditions between the finger and the top touch surface of the device (e.g., dirty contact surface) and the conditions of the external finger skin condition (e.g., dirty, dry or wet fingers, or reduced external variations between ridges and valleys in fingers of certain users such as aged users).

When extra light sources are provided for optical sensing in implementing the disclosed technology, the illumination power for optical sensing is no longer limited by the optical power from the LCD display light. Such extra light sources can be designed to provide sufficient illumination for optical sensing to improve the optical detection signal to noise ration to offset the environmental light influence. In implantations, the extra light sources can be modulated without affecting the display function and lifetime. In addition, the extra light sources can be flashed with high output power for a short time during the fingerprint sensing so as to obtain optimized detection. In addition, the use of extra light sources can provide flexibility in the determination of whether a detected finger is a live finger so that fake fingerprint detection can be avoided. For example, green LEDs and near IR LEDs may be used as extra light sources to also assist the live finger detection as explained with reference to FIGS. 14 and 15 where finger tissues absorb the green light strongly so that the finger image manifests a desired large brightness gradient and the near IR light illuminates all through the finger so that the finger image brightness appears more uniform.

Figure 38:
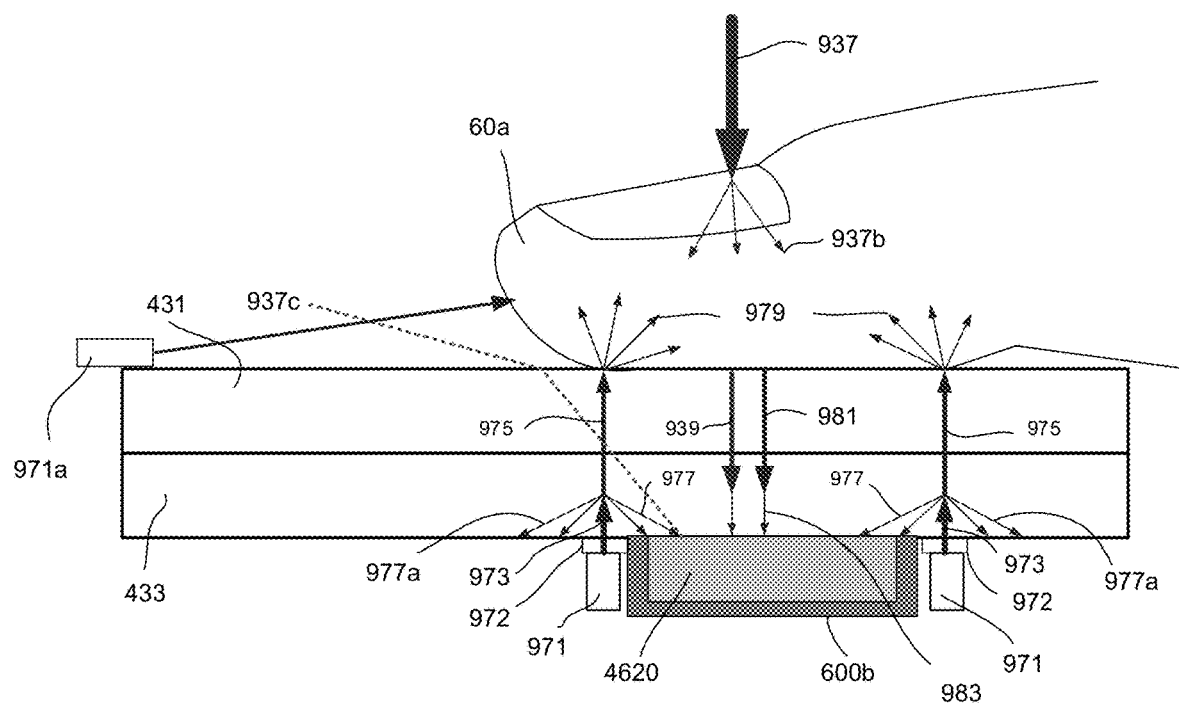
Figure 39:
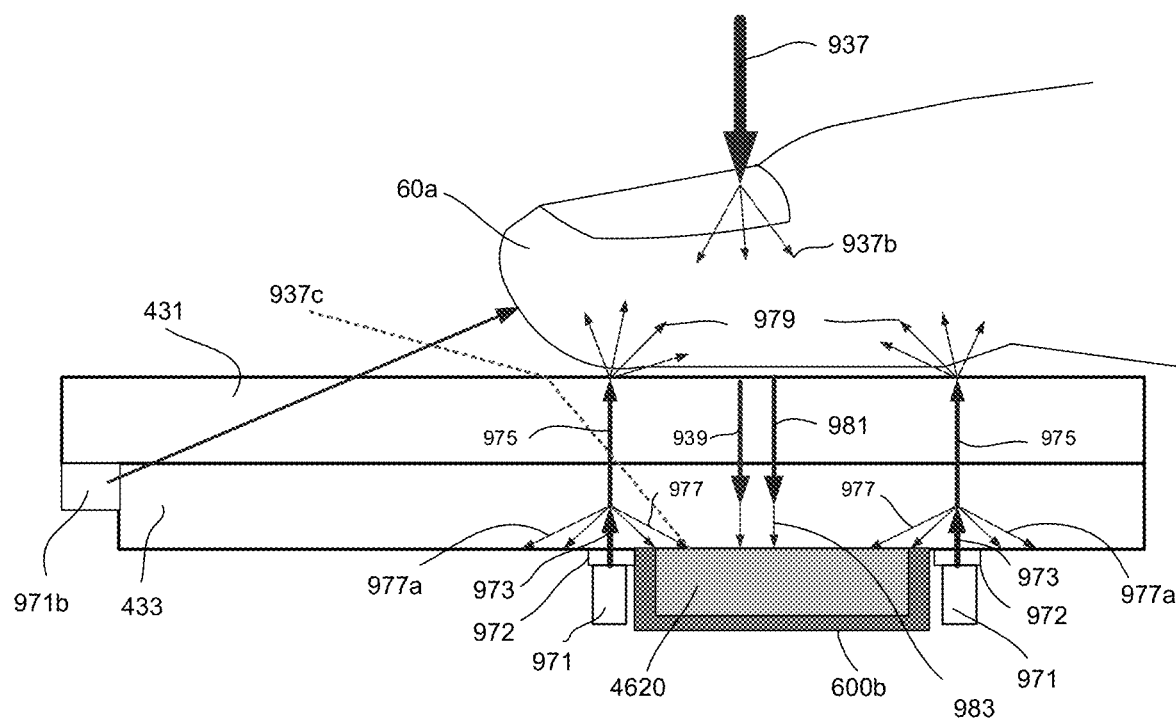
Figure 40:
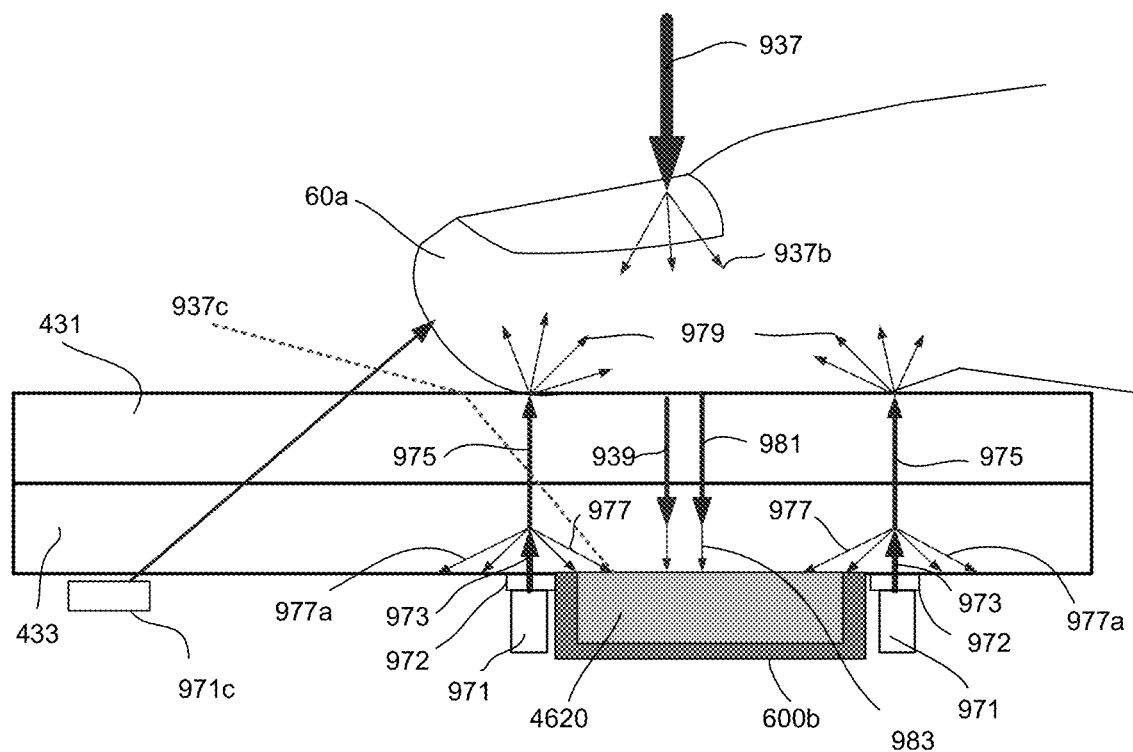

FIGS. 38, 39 and 40 show specific examples for placing illumination light sources for obtaining optical transmissive patterns as illustrated in FIGS. 36A and 36B.

In FIG. 38, at least one extra illumination light source 971a is placed above the display panel and the top transparent layer 431 and is away from the designed fingerprint sensing area to direct the illumination beam 937 to the finger in the designated fingerprint sensing area above the top transparent layer 431 to enter the finger and to cause scattering inside the finger which contributes to the part of the signal 981 with an optical transmissive pattern for the optical fingerprint sensing. Two or more such light sources 971a may be so placed.

Figure 43:
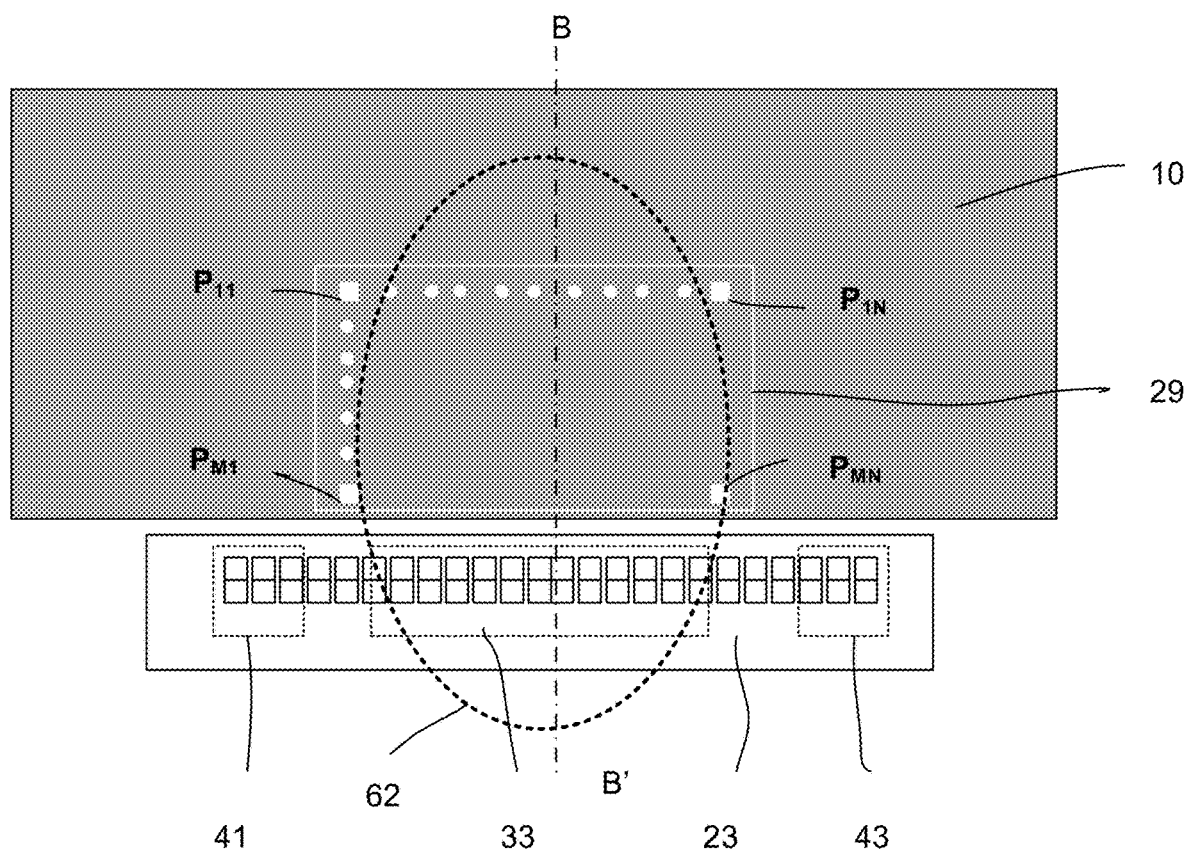

FIG. 43 further shows that extra illumination light sources 971 are also placed under the designated fingerprint sensing area to obtain both optical reflective pattern and contribution to the optical transmissive pattern. The extra light sources 971 are assembled in or adjacent the optical sensor module 4620 and are located generally under the designated fingerprint sensing area provided by the top transparent layer 431. Specifically, in this example, two or more extra light sources 971 are placed outside the optical sensor module 4620 and are outside the packaging walls 600b. Each extra light source 971 may be one light source or include multiple sources, for example, LED light sources. The extra light sources 971 may be operable to emit light at one single wavelength or at multiple wavelengths (for example, green LED, red LED, near IR LED). The extra light sources 971 may be modulated to produce modulated illumination light or be operated to turn on their emission at different phases. At the output port of each extra light source 971, a proper coupling material 972 is provided between each extra light source 971 and the LCD display module. The coupling material 972 may include a suitable optically transparent material to allow the probe light 973 from the extra light source 971 to be coupled into the display towards the finger on the cover 431 surface. In some implementations, it may be desirable to avoid large output angles of the probe light 973 in the display and the coupling material 972 may be configured to limit the probe light's numeral aperture. The coupling material 972 may be a low index material such as an air gap and may be structured to have a desired output aperture that limits the output angle of the probe light 973 in the display.

The LCD display module 433 scatters the probe light beam 973 into various directions. Some scattered light 977 propagates towards the optical sensor module 4620 at large angles and is less likely to enter the optical sensor module due to the absorption or blocking by the small aperture of the receiving optics of the optical sensor module. Some scattered light 977a propagates towards other directions that are away from the aperture of the optical sensor module and thus does not affect the optical sensing. Notably, a portion of the probe light 973 from each extra light source 971 passes through the LCD module 433 as the probe light 975 towards the top surface of the top transparent layer 431. This probe light 975 can interact with the finger over the top cover 431 in two ways for optical fingerprint sensing. First, a portion of the probe light 975 may be reflected back as explained in FIGS. 5A, 5B and 5C to the optical sensor module as an optical reflective pattern representing the external fingerprint pattern formed by the ridges and valleys. Second, another portion of the probe light 975 can be coupled into the finger 60a by optical transmission as explained in FIGS. 5A and 5B with reference to the scattered light 191 towards the under-LCD optical sensor module to carry an optical transmissive pattern associated with the fingerprint pattern and the internal tissue structures as explained in FIGS. 36A and 36B. The tissues in the finger 60a scatter the probe light 975 to produce scattered probe light 979 in various directions, including back scattered probe light 981 with the optical transmissive pattern for optical fingerprint sensing. The back scattered probe light 981 propagates back through the top transparent layer 431 to enter the LCD module 433 towards the optical sensor module. The LCD module 433 refracts or scatters the back scattered probe light 981, a portion of which becomes the probe light component 983 that can be detected by the photo-detector array in the optical sensor module 4620.

FIG. 38 further shows that background light present at the device can generally include two different portions the environmental or background light 937 incident to the finger 60a and environmental or background light 937c incident to the top transparent layer 431 without entering the finger 60a. Since the environmental or background light 937 propagates into finger 60a, the finger tissues scatter the received background light 937 as scattered background light 937b in different directions and mixes with the probe light 979. Some of the scattered light 939 in the scattered background light 937b propagates back towards the optical sensor module 4620 through the finger 60a. A portion of the environmental light 937c that does not go through the finger 60a, if is permitted to enter the optical sensor module 4620, it could adversely impact the optical sensing operation of the optical sensor module 4620. Therefore, it is desirable to reduce or eliminate the amount of the environmental light from entering the optical sensor module 4620 by optical filtering, by the design of the receiving optics or by controlling the operation and signal processing of the optical sensor module.

As exampled with respect to FIG. 36B, the scattered light 939 in the scattered background light 937b propagates towards the optical sensor module 4620 through the finger 60a and thus carries an optical transmissive pattern due to interactions with the finger including internal tissues associated with the external ridges and valleys of the finger. In some implementations, this light 939 from the environmental or background light may be detected for optical fingerprint sensing based on its optical transmissive pattern.

In FIG. 39, at least one extra illumination light source 971b is placed below the top transparent layer 431 and is away from the designed fingerprint sensing area to direct the illumination beam 937 to one side of the finger in the designated fingerprint sensing area above the top transparent layer 431 to enter the finger and to cause scattering inside the finger which contributes to the part of the signal 981 with an optical transmissive pattern for the optical fingerprint sensing. In this example, the one extra illumination light source 971b is placed side by side with the display panel below the top transparent layer 431. Two or more such light sources 971a may be so placed. FIG. 39 further shows that extra illumination light sources 971 are also placed under the designated fingerprint sensing area.

In FIG. 40, at least one extra illumination light source 971b is placed below the display panel and is away from the designed fingerprint sensing area to direct the illumination beam 937 to one side of the finger in the designated fingerprint sensing area above the top transparent layer 431 to enter the finger and to cause scattering inside the finger which contributes to the part of the signal 981 with an optical transmissive pattern for the optical fingerprint sensing. In this example, the one extra illumination light source 971b is placed side by side with the display panel below the top transparent layer 431. Two or more such light sources 971a may be so placed. FIG. 40 further shows that extra illumination light sources 971 are also placed under the designated fingerprint sensing area.

When extra illumination light sources are provided for optical sensing, the illumination power for optical sensing can be independent controlled from by the optical power of the LCD display light from the backlighting sources. Such extra illumination light sources can be designed to provide sufficient illumination for optical sensing to improve the optical detection signal to noise ration to offset the environmental light influence. In implantations, the extra illumination light sources can be modulated without affecting the display function and lifetime. In addition, the extra illumination light sources can be flashed with high output power for a short time during the fingerprint sensing so as to obtain optimized detection. Furthermore, the use of extra illumination light sources can provide flexibility in the determination of whether a detected finger is a live finger so that fake fingerprint detection can be avoided. For example, green LEDs and near IR LEDs may be used as extra light sources to also assist the live finger detection where finger tissues absorb the green light strongly so that the finger image manifests a desired large brightness gradient and the near IR light illuminates all through the finger so that the finger image brightness appears more uniform. For another example, extra illumination light sources can be used to provide optical fingerprint sensing based on optical transmissive patterns by optical transmission of the probe illumination light through the internal tissues associated with the external finger ridges and valleys.

Figure 41A:
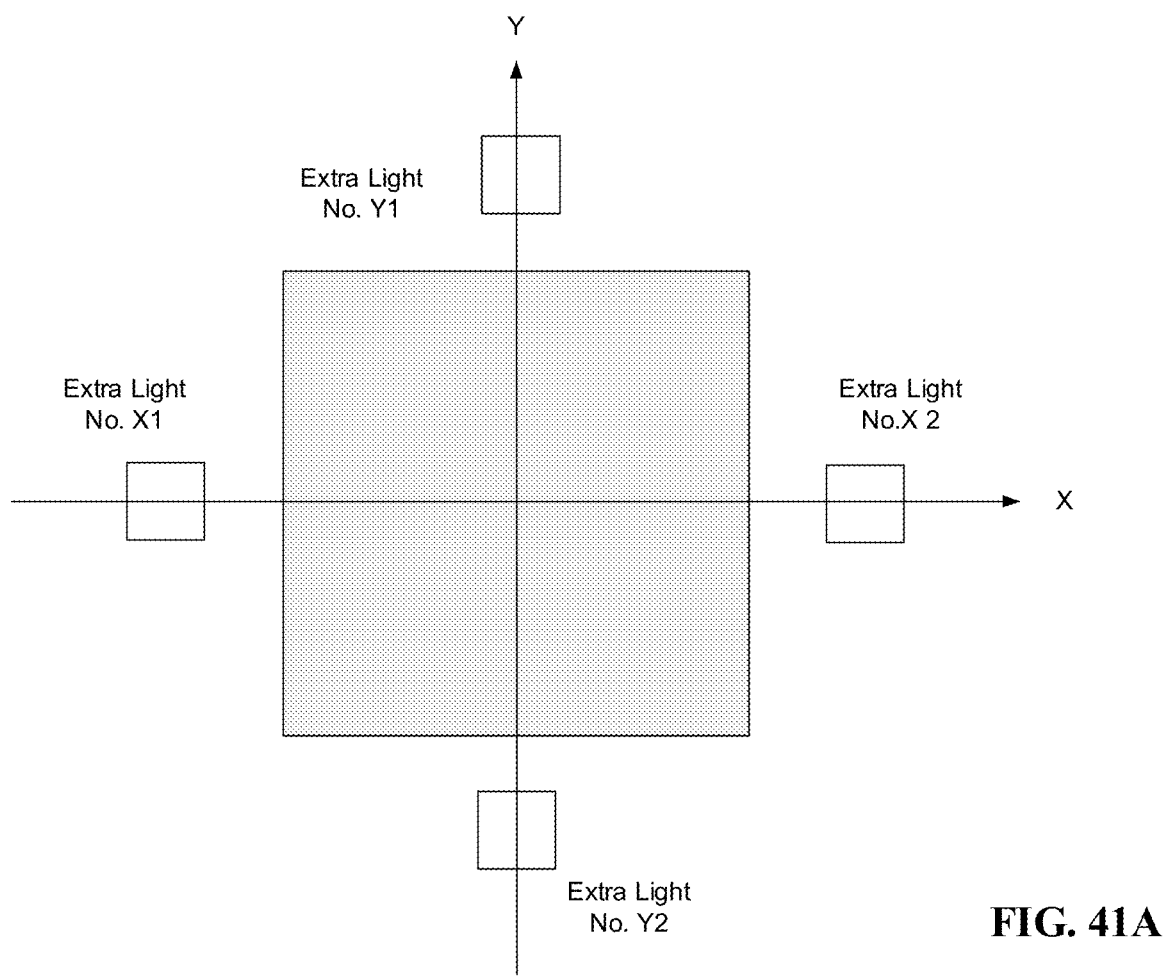

FIG. 41A shows an example for placing 4 extra illumination light sources in two orthogonal directions on opposite sides of the fingerprint sensing area based on the design in FIG. 36B. This example is one implementation of an electronic device capable of detecting a fingerprint by optical sensing that includes a display panel that includes light emitting display pixels operable to emit light for displaying images; a top transparent layer formed over the display panel as an interface for user touch operations and for transmitting the light from the display panel to display images, the top transparent layer including a designated fingerprint sensing area for a user to place a finger for fingerprint sensing; and an optical sensor module located below the display panel and underneath the designated fingerprint sensing area on the top transparent layer to receive light that is emitted by at least a portion of the light emitting display pixels and is returned from the top transparent layer to detect a fingerprint. The optical sensor module includes an optical sensor array of optical detectors to convert the returned light from the display panel that carries a fingerprint pattern of the user into detector signals representing the fingerprint pattern. This device further includes extra illumination light sources located outside the optical sensor module at different locations to produce different illumination probe beams to illuminate the designated fingerprint sensing area on the top transparent layer in different illumination directions. Each extra illumination light source can be structured to produce probe light in an optical spectral range with respect to which tissues of a human finger exhibit optical transmission to allow probe light in each illumination probe beam to enter a user finger over the designated fingerprint sensing area on the top transparent layer to produce scattered probe light by scattering of tissues inside the finger that propagates towards and passes the top transparent layer to carry both (1) fingerprint pattern information and (2) different fingerprint topographical information associated with the different illumination directions, respectively, caused by transmission through internal tissues of ridges and valleys of the finger. A probe illumination control circuit is coupled to control the extra illumination light sources to sequentially turn on and off in generating the different illumination probe beams at different times, one beam at a time, so that the optical sensor module located below the display panel is operable to sequentially detect the scattered probe light from the different illumination probe beams to capture both (1) the fingerprint pattern information and (2) the different fingerprint topographical information associated with the different illumination directions, respectively.

Specific implementations of the extra illumination light sources for obtaining optical transmissive patterns may vary from one design to another. FIG. 41B shows an operational flow for operating various devices with a display panel that may be implemented in various configurations such as OLED, LCD or others. The method or operation in FIG. 42B includes operating an electronic device to detect a fingerprint by optical sensing and the electronic device includes a display panel that displays images, a top transparent layer formed over the display panel as an interface for user touch operations and for transmitting the light from the display panel to display images, and an optical sensor array of optical detectors located under the display panel where the display panel.

FIG. 41B shows that a first illumination probe beam is directed to illuminate a designated fingerprint sensing area over the top transparent layer in a first illumination direction and to enter a user finger over the designated fingerprint sensing area to produce first scattered probe light by scattering of tissues inside the finger that propagates towards and passes the top transparent layer by transmission through internal tissues of ridges and valleys of the finger to carry both (1) a first 2-dimensional transmissive pattern representing a fingerprint pattern formed by bridges and valleys of the finger, and (2) a first fingerprint topographical pattern that is associated with the illumination of internal tissues of ridges and valleys of the finger in the first illumination direction and is embedded within the first 2-dimensional transmissive pattern. While under the illumination by the first illumination probe beam, the optical sensor array is operated to detect transmitted part of the first scattered probe light that passes through the top transparent layer and the display panel to reach the optical sensor array so as to capture both (1) the first 2-dimensional transmissive pattern, and (2) the first fingerprint topographical pattern.

Next, a second illumination probe beam, while turning off the first illumination light source, is directed to illuminate the designated fingerprint sensing area over the top transparent layer in a second, different illumination direction and to enter the user finger to produce second scattered probe light by scattering of tissues inside the finger that propagates towards and passes the top transparent layer by transmission through internal tissues of ridges and valleys of the finger to carry both (1) a second 2-dimensional transmissive pattern representing the fingerprint pattern, and (2) a second fingerprint topographical pattern that is associated with the illumination of the internal tissues of ridges and valleys of the finger in the second illumination direction and that is embedded within the second 2-dimensional transmissive pattern. The second topographical pattern is different from the first topographical pattern due to different beam directions of the first and second illumination probe beams. While under the illumination by the second illumination probe beam, the optical sensor array is operated to detect transmitted part of the second scattered probe light that passes through the top transparent layer and the display panel to reach the optical sensor array so as to capture both (1) the second 2-dimensional transmissive pattern, and (2) the second fingerprint topographical pattern.

Subsequently, a detected fingerprint pattern is constructed from the first and second transmissive patterns and the first and second fingerprint topographical patterns are processed to determine whether the detected fingerprint pattern is from a natural finger.

For invisible under-LCD optical sensor module design in FIGS. 32A and 32B, the in-screen FPS sensing area 615 is at an edge of the LCD display. Accordingly, one way to implement the sensing by sequentially illuminating the finger in different directions based on the design in FIG. 36B is to use two extra illumination light sources in two opposite directions on opposite sides of the fingerprint sensing area. This is shown in FIG. 32A where two illumination light sources X1 and X2 are placed in two sides of the in-screen FPS sensing area 615 to perform the sequential measurements.

VII. Optical Fingerprint Sensors on One Side of LCD Displays

An optical fingerprint sensor package can be used to dispose one or more photodiode arrays of an optical fingerprint sensor on at one or more display side or edge positions outside the display screen area so that the optical fingerprint sensor module is partially or entirely outside the display screen area. A window or a partially transparent coating or cover can be used for the detector arrays in such a visual optical fingerprint sensor package. Several examples of such a design are provided below and can be used to implement various technical features disclosed in this patent document, including, e.g., the lens-pinhole imaging designs.

FIG. 42 shows an example of a visible optical fingerprint sensor package in a mobile device with three different views of features in connection with the visible optical fingerprint sensor package. FIG. 42 includes three different views in FIG. 42A (top view from the display side of the mobile device), 42B (side view along the line B-B' in FIG. 42A to show different layers in the fingerprint sensor) and 42C (showing some details of example of optical detector arrangement of the fingerprint sensor). Referring to FIG. 42A, this example of a mobile device includes a display assembly 10 with an integrated finger property sensor component. The display assembly 10 includes a display screen that can be implemented by a LCD screen, an OLED screen or other display screen designs. The display screen in the display assembly 10 can be a touch sensitive screen to provide a touch sensing user interface in operating the mobile device. Referring to FIG. 42B, the display assembly 10 includes an enhanced cover glass 50 on the top and other display layers 54 for the display screen disposed below the enhanced cover glass 50. As shown in FIG. 42A, reference number 12 indicates one example of a position of another sensor and two or more other sensors can be placed on the mobile device beyond the fingerprint sensor. The mobile device can also include optional user input mechanisms such as side buttons 14, 16 prepared for the smart terminals. Reference number 21 represents the fingerprint sensor zone, where the fingerprint sensor is located. Reference number 23 represents a detector array associated with the fingerprint sensor in some fingerprint sensor implementations (FIG. 42C). The fingerprint sensor zone 21 is located outside the display screen of the display assembly 10 at a selected location to allow the optical detectors within fingerprint sensor zone 21 for capturing fingerprints to be able to receive reflected or scattered light from a user's finger for the fingerprint sensing operations. As shown by the insert drawing in FIG. 42B, disposed above the optical detector array 23 are receiving optics 24 (e.g., optical lenses or optical collimators), which are the optical detectors for detecting light reflected off of a target, such as a finger. The receiving optics 24 above the photodetector array 23 can be in various configurations, e.g., it may include one or more lenses in some designs, optical collimators without lenses, or combining lenses and collimators. A back board 25 with integrated circuitry is disposed below the detector array 23 as shown in FIG. 42B. In some implementations, the detector array 23 can be integrated into the backboard 25. The backboard 25 can be disposed over a flexible printed circuit (FPC) 27. For the specific design shown in FIGS. 42A and 42B where the optical detector array 23 for the optical fingerprint sensing is placed next to one end of the display screen structure 54, a support glass 56 may be disposed at the other side of the optical fingerprint sensor module under the cover glass 50 to strengthen the mechanical strength of the overall assembly at the optical fingerprint sensor module area and to improve the structural integrity of the overall packaging. For devices that use the cover glass 50 with a high strength material or with a sufficient thick glass, this support glass 56 may be eliminated.

Referring back to FIG. 42A, located near the fingerprint sensor zone 21 within the display screen of the display assembly 10 is a specified display zone 29 for fingerprint detection on which a user places a user finger for the fingerprint detection based on optical fingerprint sensing by the underneath fingerprint sensor. This specified display zone 29 for fingerprint detection is part of the display screen and thus is used for both displaying images and for receiving fingerprint patterns from a user's finger. The specified display zone 29 for fingerprint detection as part of the display screen is located adjacent to the fingerprint sensor zone 21 located outside the display screen of the display assembly 10 so that the reflected or scattered light from the illuminated portion of the finger pressed against the display zone 29 can enter the fingerprint sensor zone 21 to reach the optical detector array 23 for optical sensing operations. As shown in FIG. 42B, a light path window 31 is disposed above the receiving optics and near the specified display zone 29 within the device display for fingerprint detection. The detector array 23 includes multiple detector elements arranged in different detector zones including a fingerprint detector zone 33 located in the central area of the detector array 23 for fingerprint and fingerprint property detection and one or more additional detector zones 41 and 43 for other optical sensing functions, where the additional detector zones 41 and 43, as illustrated in FIG. 42C, may be environment and blood flow detector zones 41 and 43 for environment and blood flow speed detection. In addition, reference numbers 37 and 39 represent additional specified zones that may be placed over an enhanced cover glass 50 for other optical sensing operations in some implementations, such as blood flow speed detection. In some implementations, each of the additional sensing zones 37 and 39 may include a patch of display pixels in the display screen structure 54 that can operate to produce desired illumination for the additional optical sensing, e.g., emitting red light or light of a desired spectral range to illuminate a user's finger for sensing blood flow speed or glucose level. This design represents an example where the light-emitting touch screen (e.g., an OLED touch screen) includes a fingerprint sensing zone 29 for a user to touch for fingerprint sensing to generate the returned light received by the optical detector array for detecting a fingerprint, a first optical sensing zone 37 and a second optical sensing zone 39 on two opposite sides of the zone 29 to provide for additional optical sensing beyond the fingerprint sensing.

As shown in FIG. 42B, this particular optical fingerprint sensor design is different from some other fingerprint sensor designs using a separate fingerprint sensor structure from the display screen with a physical demarcation between the display screen and the fingerprint sensor (e.g., a button like structure in an opening of the top glass cover in some mobile phone designs) on the surface of the mobile device. Under the illustrated design in FIG. 42B, the fingerprint sensor zone 21 and the associated optical detector sensor module 23 for detecting fingerprint sensing and other optical signals are located under the top cover glass or layer 50 so that the top surface of the cover glass or layer 50 serves as the top surface of the mobile device as a contiguous and uniform glass surface across both the display screen of the display assembly 10 (containing the specified display zone 29 for fingerprint detection near the edge of the display screen) and the fingerprint sensor zone 21 and the associated optical detector sensor module 23. This design for integrating optical fingerprint sensing and the touch sensitive display screen under a common and uniform surface provides benefits, including improved device integration, enhanced device packaging, enhanced device resistance to failure and wear and tear, and enhanced user experience. This feature is also present in other implementations of the disclosed technology in this document. However, in some implementations of the optical sensing of fingerprints and other sensing operations, the optical sensor module may be packaged in a discrete device configuration in which the optical sensor module is a distinct structure that has a structural border or demarcation with the display screen, e.g., a button like fingerprint sensor structure in an opening of the top glass cover in some mobile phone designs based on all optical sensing or a hybrid sensing with both capacitive sensing and optical sensing.

Such an optical fingerprint sensor can be used in many devices with display or similar light sources. The optical sensing in FIG. 42 is based on illumination of a user's finger. Different illumination mechanisms may be used. For example, in some implementations, the display elements of the display screen that are located within the several zones 29, 37, 39 in FIG. 42A within the display screen for optical sensing can be used to illuminate the user's finger. The light from such display elements of the display screen is used to form part of the displayed images on the display screen as part of the mobile device operation and the light, after transmitting through the top layer of the screen, will illuminate the user's finger to cause reflected or scattered light from the illuminated finger to allow optical sensing by the detector array 23 and other detectors 41, 43, 37 and 39. A suitable display screen for implementing the disclosed optical sensor technology can be based on various display technologies or configurations, including, a display screen having light emitting display pixels without using backlight where each individual pixel generates light for forming a display image on the screen such as an organic light emitting diode (OLED) display screens or electroluminescent display screens. The disclosed optical sensor technology may also be adapted for use with other display screens, such as LCD display screens which use one or more illumination light sources (e.g., LEDs) to produce illumination light in a backlighting or edge lighting configuration to illuminate the LCD display pixels which filter and modulate the illumination light at each LCD pixel to display the images.

When the display illumination light is used to illuminate the user's finger for optical sensing of the user's fingerprint or other biometric parameters, the light from the display, which can be directly emitted by display pixels (e.g., OLED display pixels) or can be optically filtered by the display pixels (e.g., LED display pixels based on backlighting or edge lighting designs), contains different colors, e.g., red (575 nm-660 nm), green (490 nm-575 nm) and blue (410 nm-490 nm) light. For optical sensing other than fingerprints, such as the blood flow speed or heartbeat rate, the optical wavelength for the light that illuminates the user's finger may be selected at certain optical wavelengths, e.g., in the red spectra for sensing a user's blood to obtain the heartbeat rate, the oxygen level, the glucose level and others. In an OLED display screen, each display color pixel includes at least OLED pixels at three different colors and the red light from red color OLED pixels can be to measure the blood information of a user.

Several integrated detector arrays 23, 33, 41, 43 (e.g. photo diodes) can be used to detect the light scattered from the finger tissues and detect the light in the environment. The detector arrays 23, 33, 41, 43 can be placed and packaged close to the specified display zones 29, 37, 39 to enhance the light detection efficiency. Depending on the applications and specific device designs, the positions of the specified display zones shown in FIG. 42 may be modified from the exemplary locations as shown in FIG. 42A and be placed at other suitable locations on the display assembly 10.

In various implementations, one or more other light sources may be used to produce light to illuminate a user's finger for optically sensing the fingerprints or other biometric parameters of the user. Such light for optical sensing is different and separate from the display illumination light that is either emitted by display pixels (e.g., OLED display pixels) or is directed from illumination light sources to the display pixels (e.g., LED display pixels based on backlighting or edge lighting designs). The one or more light sources for optical sensing may be integrated into the display or the mobile device in FIG. 42 to provide special illumination to the user's finger for optical sensing. The optical wavelength of such light sources for optical sensing can be selected to meet the optical sensing requirements. For example, one or more red light sources may be used to illuminate red light onto the user's finger for optical sensing of blood information of the user. The illumination light from such other light sources can be modulated to improve the optical sensing detection. For example, the display light sources can be modulated with a proper pattern so as to reject background light during detection. The sensor module can detect fingerprint, heartbeat, and blood flow speed etc. If specified wavelengths light sources are integrated into the display, the sensor module can monitor other bio-parameters, such as glucose and degree of blood oxygen saturation.

FIG. 43 shows an example of a fingerprint sensing module for a mobile device, such as the mobile device of FIG. 42. The display assembly 10 with the integrated finger property sensor includes a specified display zone 29 for fingerprint detection. Reference number 62 represents a finger pressing on the sensor. Similar to FIG. 42, the detector array 23 disposed near the specified display zone 29 includes multiple detector elements including detector elements in the fingerprint detector zone 33 for fingerprint sensing and fingerprint property detection responsive to the finger 62 pressing on the sensor. The detector array 23 also includes detector elements in the environment and blood flow zones 41 and 43 for environment and blood flow speed detection. Examples of the detector elements of the detector array 23 include optical devices such as photodiodes, CCD sensing pixels or CMOS sensing pixels.

Display elements in the specified zone 29 can be used to provide part of the illumination for fingerprint sensing and the detector elements in zone 33 are used to measure the fingerprint. The detector elements in zone 41 or 43, or both 41 and 43 are used to monitor the environment light illumination. The display elements in the specified zone 29 are formed in one or more patterns appropriate for fingerprint, environment, and blood flow detection. For example, display elements in zone 29 can be divided into small groups, each group having an appropriate number of detector elements. The small groups of detector elements can be turned on in turn to illuminate the finger placed on or close to the sensor zones. The detector elements in the detector array 23 detect the scattered light 91 scattered from the finger. The detector signals from the detector array 23 elements in zone 33 carry the fingerprint information. The detector signals from the detector element sin zone 41, 43, or both are used to calibrate the fingerprint signal from zone 33 so as to eliminate the influence of the environment light including the influence from other display zones.

Figure 44:
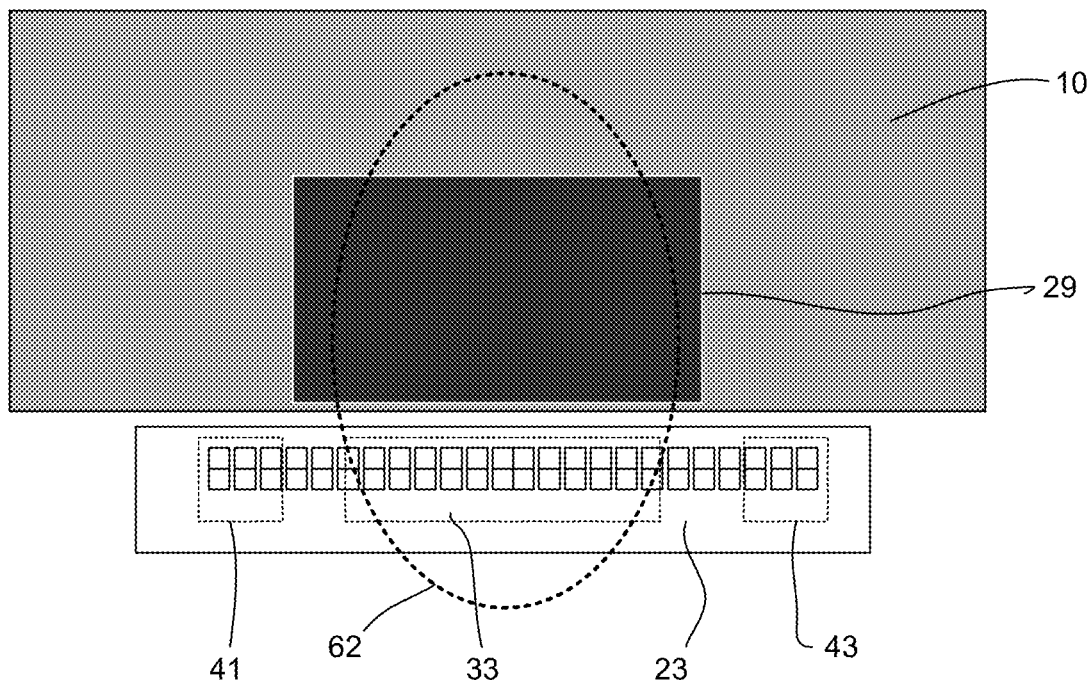

FIG. 44 is a block diagram of an exemplary fingerprint sensing module in a visible package for heartbeat sensing. The fingerprint sensing module includes a display assembly 10 with in integrated finger property sensor component. Detector array 23 is disposed near the display assembly and positioned to receive reflected or scatter light caused by a contact to the top cover surface by a finger 62. A specified display zone 29 for fingerprint detection is designated on the display assembly 10 at a location within the display screen near the detector array 23. In response to a touch, the display pixels in the display zone 29 are turned on to project light towards the top cover surface of the display to illuminate the top cover surface area within the display zone 29 to illuminate the user's finger 62. A portion of the reflected or scattered light from the user's finger 62 in touch with the top cover surface in the display zone 29 can reach the nearby detector array 23. The detector array 23 includes detector elements in the fingerprint detector zone 33 for fingerprint and fingerprint property detection. Detector elements in zones 41 and 43 are for environment and blood flow speed detection.

To detect the heartbeat signals, more display elements are turned on simultaneously so as to generate sufficient incident light power for the optical sensing of the heartbeat signals. The finger tissue light absorption ratio varies with the blood flow which is controlled by the heartbeat. The light absorption fluctuation signal reflects the heartbeat rate. In the disclosed technology, the light wavelength of the light emitted by the display elements may be selected to optimize the detection. Also, the light illumination may be modulated at a frequency so as to further reduce the influence of the environment. For example, the specified display zone can be operated at a very high frame rate so as to realize the modulation. In some implementations, the light sources of the display can be modulated. In some implementations, extra modulated light sources can be integrated into the display assembly 10. Performing heartbeat sensing simultaneously with the fingerprint acquiring can greatly improve the secure access of the mobile device by differentiating between a fake fingerprint and a fingerprint from a live finger.

Figure 45:
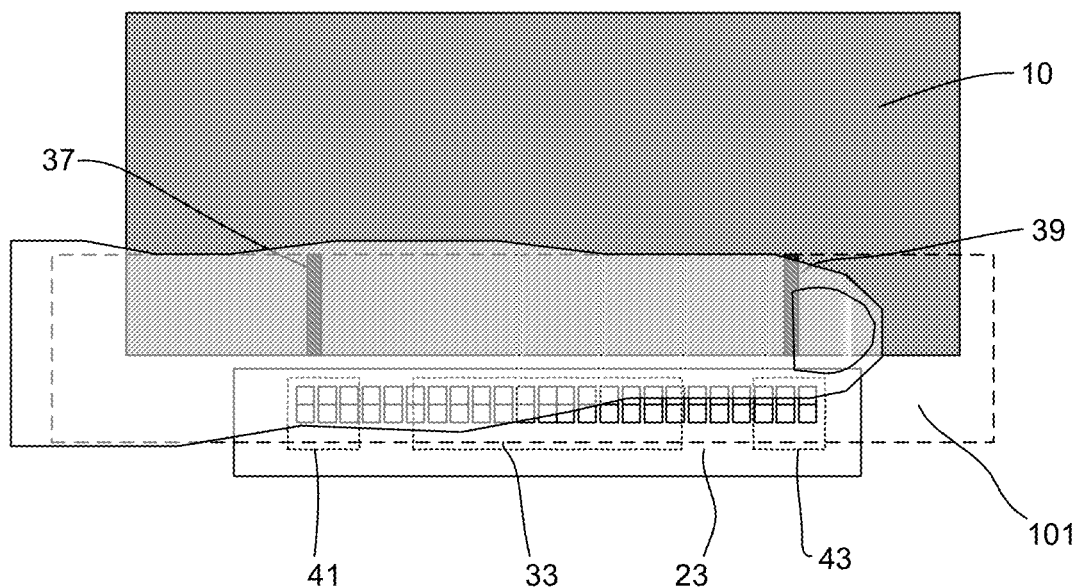

FIG. 45 shows an exemplary fingerprint sensing module in a visible package for blood flow speed sensing. The fingerprint sensing module includes a display assembly 10 with in integrated finger property sensor component. Detector array 23 is disposed near the display assembly and positioned to receive a finger to be monitored. The detector array 23 includes detector elements in the fingerprint detector zone 33 for fingerprint and fingerprint property detection. Detector elements in zones 41 and 43 are for environment and blood flow speed detection. The display assembly 10 also includes specified zones 37 and 39 within the display screen area for blood flow speed detection.

In FIG. 45, the fingerprint sensor assembly is structured to receive the finger on the sensor area 101, with one side overlapping with display elements in zone 37 and 39 and the other side overlapping with the detectors (e.g., photodiodes) in zone 41 and 43 respectively. Display elements in zone 37 and detectors in zone 41 cooperate to measure the pulse signals at one position of the finger. Display elements in zone 39 and detectors in zone 43 cooperate to measure the pulse signals at the other position of the finger. The pulsation signal is generated in the arteries. In operation, a finger can be placed along the direction of the two zones 37 and 39 as illustrated. The blood flowing in the arteries is detected at the left zone 37 and the right zone 39 representing the blood flowing across the zones from the left zone 37 to right zone 39. When the blood flows back from the right zone 39 to the left zone 37, the blood flows in the veins and no pulsation signal is obvious. By comparing the pulsation delay time between the two locations 37 and 39, the blood flow speed information can be acquired. Because blood pressure is correlated with blood flow speed, the sensor shown in FIG. 45 can also monitor the blood pressure.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. An optical sensor module for detect a fingerprint pattern of a finger placed above an LCD panel structure, the optical sensor module comprising:
    an optical sensor array of optical detectors for converting returned light carrying fingerprint information into detector signals representing a fingerprint pattern, wherein the returned light is generated when the finger is illuminated by probe light provided by an illumination probe light source, and the returned light is transmitted through the LCD panel structure;
    a pinhole structure for collecting the returned light and to transmit the returned light towards the optical sensor array, wherein the pinhole structure is configured to produce an increased optical field of view in collecting the returned light; and
    a lens unit located between the pinhole structure and the optical sensor array, the lens unit being configured to receive the returned light from the pinhole structure and to transmit the returned light onto the optical sensor array.

2. The optical sensor module as in claim 1, further comprising:

an illumination probe light source configured for producing the probe light to illuminate a sensing area of the LCD panel structure; the sensing area is provided such that the finger placed thereon is capable of being illuminated to generate the returned light.

3. The optical sensor module as in claim 2, wherein the illumination probe light source is arranged adjacent to an edge of the LCD panel structure.

4. The optical sensor module as in claim 1, wherein the pinhole structure comprises a pinhole, a center of the pinhole and a center of the lens unit are aligned along each other.

5. The optical sensor module as in claim 1, wherein the lens unit comprises at least one lens for optical imaging at an enhanced spatial imaging resolution when focusing the returned light onto the optical sensor array.

6. The optical sensor module as in claim 1, further comprising:
an optically transparent structure located between the lens unit and the optical sensor array to direct the returned light from the lens unit to the optical sensor array and structured to have a refractive property and a thickness to reduce an optical distortion at the optical sensor array.

7. The optical sensor module as in claim 6, wherein the optically transparent structure between the lens unit and the optical sensor array includes an optically transparent spacer layer and an optically transparent protection layer formed over the optical detectors of the optical sensor array.

8. The optical sensor module as in claim 7, wherein the optically transparent protection layer comprises an optical bandpass filter that configured for transmitting the returned light while blocking light at other wavelengths.

9. The optical sensor module in claim 1, further comprising:
a first optically transparent layer to be located between the LCD panel structure and the pinhole structure; and
a second optically transparent layer to be located below the lens unit and above the optical sensor array;
wherein a refractive index and a thickness value of the second optically transparent layer are selected based on both a refractive index and a thickness value of the first optically transparent layer, and an optical power of the lens unit so as to reduce an optical distortion in an optical image captured at the optical sensor array.

10. The optical sensor module in claim 1, further comprising:
an optically transparent layer to be located between the LCD panel structure and the pinhole structure, and being in contact with the pinhole structure, wherein the pinhole structure has a refractive index higher than a refractive index of the optically transparent layer in contact with the pinhole layer.

11. The optical sensor module in claim 1, further including:
a gradient transmission filter to be located between the LCD panel and the optical sensor array to modify a spatial optical intensity distribution of light received at the optical sensor array after passing through the pinhole structure and the lens unit;
wherein the gradient transmission filter is structured to exhibit a high optical attenuation at or near a center of the pinhole and a decreasing optical attenuation from the center of the pinhole radially outward to counter a spatial variation of an optical intensity distribution of light caused by the pinhole.

12. The optical sensor module in claim 1, wherein the pinhole structure, the lens unit and the optical sensor array are configured for being arranged at a peripheral opaque border of the LCD panel structure, so as to be spatially offset from a central area of the LCD panel structure for receiving the returned light that passes through the LCD panel structure.

13. The optical sensor module in claim 12, wherein the LCD panel structure comprises an LCD assembly that includes an LCD layer and additional layers to form LCD pixels for displaying images, and an LCD illumination light module to provide backlighting light to the LCD assembly for displaying images; wherein the pinhole structure, the lens unit and the optical sensor array are structured to be arranged under the LCD assembly and above the LCD illumination light module.

14. The optical sensor module in claim 13, wherein the LCD panel structure are configured for being covered with a top transparent layer, the top transparent layer are configured to provide an interface for user touch operations; wherein the illumination probe light source for providing the probe light is arranged under an edge of the top transparent layer, and to illuminate a sensing area within a main display area of the LCD panel structure.

15. The optical sensor module in claim 1, further comprising:
extra illumination light sources located at different locations to produce different illumination probe beams to illuminate a sensing area of the LCD panel structure in different illumination directions,
wherein each illumination light source is structured to produce light in an optical spectral range with respect to which tissues of a human finger exhibit optical transmission to allow each illumination probe beam to enter a user finger over the sensing area on the top transparent layer to produce scattered probe light by scattering of tissues inside the finger that propagates towards and passes the top transparent layer to carry both fingerprint pattern information and different fingerprint topographical information associated with the different illumination directions, respectively, caused by transmission through internal tissues of ridges and valleys of the finger.

16. The optical sensor module in claim 1, further comprising:
a probe illumination control circuit coupled to control the extra illumination light sources to sequentially turn on and off in generating the different illumination probe beams at different times, one beam at a time, so that the optical sensor module located below the display panel is operable to sequentially detect the scattered probe light from the different illumination probe beams to capture both the fingerprint pattern information and the different fingerprint topographical information associated with the different illumination directions, respectively.

17. An electronic device capable of detecting a fingerprint by optical sensing, comprising:
a liquid crystal display (LCD) screen that provides touch sensing operations and includes an LCD panel structure to display images;
an illumination probe light source that produces probe light to illuminate a sensing area of the LCD panel structure for optical sensing; and
an optical sensor module for receiving returned light that passes through the LCD panel structure for optical sensing, wherein the optical sensor module comprises:
an optical sensor array of optical detectors for converting returned light carrying fingerprint information into detector signals representing a fingerprint pattern, wherein the returned light is generated when the finger is illuminated by the probe light, and the returned light is transmitted through the LCD panel structure;

a pinhole structure for collecting the returned light and to transmit the returned light towards the optical sensor array, wherein the pinhole structure is configured to produce an increased optical field of view in collecting the returned light; and a lens unit located between the pinhole structure and the optical sensor array, the lens unit being configured to receive the returned light from the pinhole structure and to transmit the returned light onto the optical sensor array.

18. The electronic device as in claim 17, wherein the LCD screen further comprises a backlighting module for producing backlight for enabling the LCD panel structure to display the images, wherein the backlighting module comprises:

a light diffuser layer that diffuses the backlight, and the light diffuser includes at least a hole formed at a selected area above the optical sensor module to allow the returned light to be transmitted to reach the optical sensor module.

19. The electronic device as in claim 18, wherein the backlighting module further comprises:

an optical reflector layer formed on a bottom region of the LCD screen to reflect the backlight back to the LCD panel structure; and at least a hole is formed in a selected area of the optical reflector layer above the optical sensor module to allow the returned light to be transmitted to reach the optical sensor module.

20. The electronic device as in claim 17, wherein the optical sensor module is positioned underneath a peripheral opaque border to be spatially offset from a central area of the LCD panel structure to receive returned light that passes through the LCD screen;

wherein the LCD panel structure includes one or more extra transmission holes or regions within an area that is at least partially covered by the peripheral border and is positioned above the optical sensor module to allow probe light to pass through the LCD panel structure to reach the optical sensor module for optical sensing.

* * * * *